US005760558A

United States Patent [19]

Popat

[11] Patent Number: 5,760,558

[45] Date of Patent: Jun. 2, 1998

[54] SOLAR-POWERED, WIRELESS, RETROFITTABLE, AUTOMATIC CONTROLLER FOR VENETIAN BLINDS AND SIMILAR WINDOW CONVERINGS

[76] Inventor: Pradeep P. Popat, 1515 S. Jefferson Davis Hwy., Apt. 1321, Arlington, Va. 22202

[21] Appl. No.: 505,845

[22] Filed: Jul. 24, 1995

[51] Int. Cl.$^6$ .......... G05B 5/00

[52] U.S. Cl. .......... 318/480; 318/469; 318/17; 160/168.1; 160/188

[58] Field of Search .......... 318/480, 17, 254, 318/439, 138, 469; 160/168.1, 176.1, 176 R, DIG. 17, 188, 6, 7; 136/243, 244, 252

[56] References Cited

U.S. PATENT DOCUMENTS

| | | | |
|---|---|---|---|
| 3,249,148 | 5/1966 | King et al. | 160/3 |
| 3,308,873 | 3/1967 | Dotto | 160/176 |
| 3,559,024 | 1/1971 | Marder | 318/467 |
| 3,646,985 | 3/1972 | Klann | 160/168 |
| 3,809,143 | 5/1974 | Ipekgil | 160/168 |
| 4,096,903 | 6/1978 | Ringle | 160/176 R |
| 4,173,721 | 11/1979 | Louis | 307/115 |
| 4,255,899 | 3/1981 | Braithwaite | 49/2 |
| 4,492,908 | 1/1985 | Stöckle et al. | 160/DIG. 17 X |
| 4,550,759 | 11/1985 | Archer | 160/176 R |
| 4,644,990 | 2/1987 | Webb | 160/5 |
| 4,706,726 | 11/1987 | Nortoft | 160/168 R |
| 4,712,104 | 12/1987 | Kobayashi | 340/825.52 |
| 4,807,686 | 2/1989 | Schnebly et al. | 160/84.1 |
| 4,914,360 | 4/1990 | Hsieh et al. | 318/16 |
| 4,956,588 | 9/1990 | Ming | 318/16 |
| 5,029,428 | 7/1991 | Hiraki | 52/788 |
| 5,038,087 | 8/1991 | Archer et al. | 318/469 |
| 5,040,585 | 8/1991 | Hiraki | 160/188 |
| 5,081,402 | 1/1992 | Koleda | 318/16 |
| 5,134,347 | 7/1992 | Koleda | 318/16 |
| 5,170,108 | 12/1992 | Peterson et al. | 318/469 |
| 5,221,363 | 6/1993 | Gillard | 136/243 X |
| 5,275,219 | 1/1994 | Giacomel | 160/6 |
| 5,413,161 | 5/1995 | Corazzini | 160/7 |
| 5,495,153 | 2/1996 | Domel | 318/17 |

OTHER PUBLICATIONS

Advertisement for the Mariposa™ solar collector assembly manufactured by Solardyne Corporation, 20 South Main Street, Gainesville, FL, 32601 USA, (904) 372–0333, appearing in *Solar Today*, vol. 9, No. 6, Nov./Dec. 1995, p. 12. Shows patent–pending solar collector assembly which includes an array of rectangular, copianar photovoltaic regions, with non–coplanar reflectors interspersed between the regions.

(List continued on next page.)

*Primary Examiner*—Karen Masih

[57] ABSTRACT

A system for automatic operation of venetian blinds and similar window coverings. A preferred embodiment, system 30, can be retrofitted to any conventional venetian blind without tools, removal of the blind, or installation of wiring (FIG. 10A). System 30 is attached to a blind 15 by a bracket 80, which engages a headrail 16 of blind 15, and is secured by a thumbscrew 84 (FIG. 4C). System 30 includes a gearmotor 85 which drives a coupling tube 91; coupling tube 91 is attached to a tilt-adjustment shaft 18 of blind 15 (FIG. 3A). The mechanical coupling between gearmotor 85 and coupling tube 91 includes a flexible coupling and an extensible coupling, which enable gearmotor 85 to rotate shaft 18 over a wide range of sizes and configurations of blind 15 (FIGS. 5A and 5B). System 30 also includes a photovoltaic source 31 mounted on a flexible member 99. Member 99 provides electrical connections to source 31, and supports it in an advantageous position to receive solar radiation (FIGS. 8B and 8C), regardless of the size and mounting arrangement of blind 15. System 30 also includes four momentary-contact electrical switches 38 to 41 and an actuating body 94, to which a tilt-control wand 19 of blind 15 can be attached. Together, actuating body 94 and switches 38 to 41 enable system 30 to be conveniently controlled by rotary and axial movements of wand 19 (FIG. 10A).

12 Claims, 29 Drawing Sheets

OTHER PUBLICATIONS

Negovetich, Nancy, 1988, "Solar-Powered Sunshades", *Popular Science*, vol. 232, No. 2, Feb. 1988, p. 88. Describes Comfortex Corp. Smart Shade™.

"Buying Guide 1989", *Electronic House*, vol. 4, No. 4, Summer 1989, pp. 51 to 53. Presents a listing of manufacturers of motorized window coverings and windows.

Brown, Linda R., 1994, "SERF: A Landmark in Energy Efficiency", *Solar Today*, vol. 8, No. 3 May/Jun. 1994, p. 24. Small picture on p. 25 (and accompanying text), shows a roller-type solar-powered sun shade, with a photovoltaic device mounted at bottom of movable shade.

Johnson, Lawrence B., 1993, "An Open and Shut Case", *Audio/Video Interiors*, vol. 5 No. 9, Sep. 1994, p. 31. Presents an overview of available motorized window coverings.

"Resource Guide", *Electronic House*, vol. 9, No. 5, Sep./Oct. 1994, pp. 61 to 63. Presents a listing of current manufactures of motorized window coverings.

"Solar Roll", Science & Technology Department, *Popular Science*, vol. 246, No. 1, Jan. 1995, p. 26. Describes potential applications of a flexible, photovoltaic film (author unknown), including roll-up awnings and shades.

McKinney, Herbert Jr., 1995, "The Blind Robot," *Circuit Cellar Ink*, Issue No. 57, Apr. 1995, p. 69. Discusses the design and construction of a remote-controlled, tilt-only venetian blind control system installed in the headrail of a host blind.

Home Automation Laboratories (HAL) Catalog, Winter 1994, p. 31. Shows "Drape Boss" and Nightwood Mfg. systems for automaton of draperies and vertical blinds.

Bautex USA Window Automation™ Brochure (full-page format). Page 4 and 5 briefly describe manufacturer's automated window products.

Bautex USA Window Automation™ Brochure (small-size format). Presents a brief overview of manufacturer's products; table lists key specifications.

SM Automatic Co., 1992 Dealer Catalog. Many pages are of interest but page 19, showing Model 8000 and Model 8500, is of particular relevance.

Solartronics Inc. Motorized Window Coverings Catalog. Many pages are of interest but page 6 (showing model SD-1000), page 16 (showing model SD-2004), page 18 (showing model MB-1000), and page 20 (showing model MB-2000) are of particular relevance.

SOLAR-POWERED, WIRELESS, RETROFITTABLE, AUTOMATIC CONTROLLER FOR VENETIAN BLINDS AND SIMILAR WINDOW CONVERINGS

BACKGROUND—FIELD OF INVENTION

This invention relates to window coverings, specifically to a device for the motorized, automatic operation of conventional horizontal Venetian blinds and similar window coverings.

BACKGROUND—DESCRIPTION OF PRIOR ART

Overview of Venetian Blinds and Pleated Shades

A horizontal venetian blind consists of an array of horizontal slats or louvers suspended, via lifting cords, from a headrail which is mounted near the top of a window. The lifting cords are attached to a bottom rail located beneath the bottom-most louver. The amount of light passing through the blind can be controlled in either of two ways. First, the tilt angle of the louvers can be adjusted. In most modern blinds, this is done by manually twisting a tilt-control wand which, in turn, rotates a tilt-control shaft projecting from the front of the headrail. This tilt adjustment requires little effort and provides a fine degree of illumination control. Second, the louvers can be drawn up toward the headrail, exposing the window. This lifting operation is typically done by manually pulling the free ends of the lifting cords; cord locks are provided to secure the louvers in any desired position. Releasing the cord locks allows gravity to pull the louvers down to the original position. In large blinds, this lifting operation can require substantial physical effort, but exposes the entire window for maximum illumination and view.

Other types of venetian blind are also in use. In an earlier type of horizontal venetian blind, the louver tilt is adjusted by pulling cords, rather than by twisting a wand. In a vertical venetian blind, louvers are suspended vertically from a headrail; two separate cords are typically provided for independently adjusting louver tilt and for moving the louvers together horizontally. However, the wand-actuated horizontal venetian blind is currently the dominant type of venetian blind, with an installed base of many millions of units. In some applications, particularly in commercial office buildings, it dominates all other types of window coverings in number of installed units. This popularity is largely due to its relatively low cost.

Recently, pleated shades have also become extremely popular. Pleated shades are similar in construction to horizontal venetian blinds, except that a sheet of pleated or folded shading material is used instead of an array of horizontal louvers. Like venetian blinds, the pleated shades include a headrail, a bottom rail, lifting cords, and cord locks; however, no tilt-control shaft or wand is necessary, as there are no louvers to tilt. The bottom rail of a pleated shade can be drawn up toward the headrail—exposing the window—by pulling on the free ends of the lifting cords; this causes the bottom rail to rise, resulting in an accordion-like collapsing of the pleated shading material. Thus, operation of pleated shades is very similar to operation of the lifting function of venetian blinds. However, much less effort is required, due to the relatively light weight of the pleated shading material.

Prior-Art Approaches for Motorized and Automatic Operation

Benefits of Automatic Or Motorized Operation

Automation of venetian blind tilt and lift functions can provide substantial benefits in increased convenience and utility. In residential applications, automatic operation can save considerable time and effort, especially when many blinds must be adjusted or when blinds are mounted in hard-to-reach locations. For the physically-challenged, automatic operation of venetian blinds can provide a meaningful improvement in the ability to independently control the living environment. In commercial applications, automatic operation can help save energy and improve security; for example, studies sponsored by the US Department of Energy have shown that automatic adjustment of louver tilt can save up to ten percent of the heating and cooling costs in commercial office buildings. This is an important benefit, since many millions of horizontal venetian blinds are in commercial use.

Cost Constraints

However, many of these applications are cost-sensitive. Since low cost is a key feature of horizontal venetian blinds, widespread automation of blinds will not be practical unless the cost of automation is also low. This cost includes two primary components: purchase cost of the automation equipment, and installation costs. If the automation equipment is not compatible with the existing window coverings, then three additional costs are included: the lost investment in purchase and installation of the existing window coverings, the costs of their removal, and the costs of new compatible blinds. In most applications, automation will not be cost-effective if the sum of these costs substantially exceeds the purchase cost of standard venetian blinds. However, prior art approaches for venetian blind automation involve net costs of between four and fourteen times the cost of standard venetian blinds.

Automatic Systems Using Mechanical Energy Storage

SYSTEM OF KING ET AL.

An early approach for venetian blind automation is disclosed in U.S. Pat. No. 3,249,148 to King et al. (1966), which describes a system which can automatically close a blind previously opened by hand. This system requires no electric motor; instead, it makes use of mechanical energy stored during manual opening of the blind to both lower the blinds and tilt the louvers to the closed position. The mechanism is contained entirely within the headrail of the host blind, and includes a spring (for mechanical energy storage), as well as an electromagnetic linear actuator (to release the stored mechanical energy and close the blinds).

However, the inability of this system to automatically open the blinds renders it useless in many applications. Moreover, although a cited object of this system was to provide an apparatus which could be retrofitted to existing blinds, such a retrofit would entail removal, disassembly, and extensive modification of the host blind, as well as installation of power and control wiring (to energize the electromechanical release means). Estimated net cost of this system, including installation and costs of modification of the host blind, is approximately four times that of a standard venetian blind.

SYSTEM OF WEBB

Another system which stores mechanical energy during manual operation—for subsequent automatic closure—of a venetian blind is shown in U.S. Pat. No. 4,644,990 to Webb (1987). Webb's system also uses a spring for mechanical energy storage, and includes solenoid-operated release means. However, Webb's system is well-suited for retrofit to existing blind designs, since it is located external to the headrail of the host blind. The system also includes an electrical switch, operated by a control wand, to trigger the solenoid release means and thereby provides a means of local control which does not require installation of control wiring.

However, like the system of King et al., Webb's system is incapable of automatically opening the host blind. Webb does not teach a structure which supports convenient attachment of the system to the host headrail; to the contrary, Webb shows an attachment which requires installation of threaded fasteners to the bottom of the host headrail. Moreover, Webb's system requires installation of a separate photosensitive energy conversion element. While there is no need for installation of control wiring, wiring must be installed between the main apparatus (mounted to the headrail) and this separate photosensitive energy conversion element (located in an unspecified location facing the window). Finally, Webb's system is mechanically complex and relatively expensive to manufacture. Estimated net cost of this system, including installation, is approximately three times that of a standard venetian blind.

Thermally Actuated Systems of Braithwaite and Giacomel

U.S. Pat. No. 4,255,899 to Braithwaite (1981) shows a thermal actuator for automatic, temperature-sensitive operation of a louver-type window. This system uses the change in density of a thermally expansible material contained in a cylinder to actuate a piston which, in turn, operates the window louvers. Braithwaite's system could also be adapted for use with a louver-type window covering, but retrofit to a conventional venetian blind would require major modifications to the construction of the blind. Another serious disadvantage is that the position of the louvers is a fixed function of temperature; there is no capability to vary the temperature thresholds, to reverse the direction of operation (e.g., for changing seasons), or to disable the automatic operation and instead control the system remotely.

A thermally actuated system better suited for venetian blinds is shown in U.S. Pat. No. 5,275,219 to Giacomel (1994). This system uses thermally sensitive springs of shape-memory alloy, which—via a rack-and-pinion mechanism—actuate the louvers of a vertical or horizontal venetian blind. The system is completely contained within the headrail of the host window covering. Giacomel discloses a completely passive, temperature-sensitive system, as well as a system incorporating electrical heating of the shape-memory springs to provide electronic control. Giacomel's system is designed to be simple, inexpensive, quiet, and suitable for retrofit into existing, conventional window coverings.

However, while the mechanism shown by Giacomel's system is small and potentially inexpensive enough to be practically used with many standard window coverings, retrofit of Giacomel's system into a conventional blind would require removal, modification, and reinstallation of the blind. Moreover, like Braithwaite's system, the completely passive embodiment of Giacomel's system suffers from an inability to vary the temperature thresholds, to reverse the direction of operation, or to disable the automatic operation and instead control the system remotely. Further, the automatic embodiment of Giacomel's system requires installation of power and control wiring, which could require the services of a professional electrician.

While the critical elements (the shape-memory alloy springs and the rack-and-pinion mechanism) of Giacomel's system may be relatively inexpensive, the costs of removal, modification, and reinstallation of the host blind, along with the costs of installation of power and control wiring for the electronically-controlled embodiment of Giacomel's system, would dominate the net installed cost in a retrofit application. If the system is compatible with the host blind, then the estimated net installed cost of Giacomel's system would be approximately three times that of a standard venetian blind. If the host blind is not compatible and must be replaced, then the estimated net cost would be approximately four times that of a standard venetian blind (assuming the critical elements of Giacomel's system are built-in during the manufacture of the replacement blind, and not added-on afterwards).

Single-Motor, Lift-Only System of Marder

U.S. Pat. No. 3,559,024 to Marder (1971) discloses a system for mechanizing the lift, but not tilt, functions of a horizontal blind. This system utilizes an electric motor and gear drive to raise and lower the louvers, and includes linkages and screw-operated limit switches to sense the raised and lowered positions. However, the lack of mechanization of the tilt function is a serious disadvantage of this system. Also, this system includes a complex and large mechanism. Therefore, it is relatively expensive and cannot be practically retrofitted to existing blinds. Installation of this system involves connection of power and control wires, which can require the services of a professional electrician. Estimated net cost of this system, including installation and lost investment in existing blinds, is approximately seven times that of a standard venetian blind.

Two-Motor System of Ipekgil

U.S. Pat. No. 3,809,143 to Ipekgil (1974) shows a system for mechanizing both lift and tilt functions of an obsolescent, pull-cord-type horizontal venetian blind (in which the louver tilt is adjusted by pulling cords, rather than twisting a control wand). This two-motor system utilizes a separate electric motor and gear train, located within the headrail, to mechanize each function. A control panel, having four control switches, is included to operate the system. The control panel is mounted at a convenient place near the window, e.g., on the wall.

However, Ipekgil's system cannot be used with modern horizontal blinds (in which the louver tilt is adjustment by twisting a control wand). Moreover, the design of the system is sufficiently complex and unique that it is suitable for inclusion only at the time of manufacture in specially-constructed venetian blinds, and cannot practically be retrofitted to existing blinds. Further, the system requires installation of power and control wiring.

Single-Motor Lift-and-Tilt System of Nortoft

One of the first practical systems for automation of both the lift and tilt functions of a horizontal venetian blinds is shown in U.S. Pat. No. 4,706,726 to Nortoft (1987). This system mechanizes both lift and tilt functions with a single electric motor. This is achieved by means of spring clutches and dual-speed motor operation: low-speed motor operation adjusts louver tilt, while high-speed operation raises or lowers the blinds. This invention represented a significant advance over the prior lift-and-tilt systems in two important respects. First, it teaches a compact design which can potentially be enclosed within the headrail of a standard venetian blind. Thus, the system described by Nortoft can be incorporated into the design of a complete automated blind system, or used as an add-on device to automate the operation of an existing, standard venetian blind. Second, the need for only one motor enables mechanization of both lift and tilt functions at lower cost than would be possible with a dual-motor approach. However, Nortoft's system has four disadvantages:

- Despite the use of a single motor, cost of a system according to this invention is still many times higher than that of a standard venetian blind. This cost is due to the mechanical complexity of the design, as well as the need to size the motor and gear-train to handle the relatively heavy lifting loads.
- The headrail must be large enough to accommodate the motor, gear-train, drive shaft, and other required components. Unless expensive miniaturized components are used, this system would be incompatible with many of the small headrail designs currently in use. This limits the usefulness of this invention as an add-on device to automate existing blinds.
- Retrofitting this system to a standard blind would require removal and modification of the host blind. These operations would require substantial time and effort, and would be beyond the capabilities of many potential users. If performed professionally, such a retrofit could cost several times as much as the purchase cost of a standard venetian blind.
- Whether this system is incorporated into the initial design of an automatic blind or retrofitted to an existing blind, final installation of the blind to the window would require connection of power and control wires. This would require substantial time and effort, and could require the services of a professional electrician. If so, the cost of these electrical connections could exceed the purchase cost of a standard venetian blind. In addition, like any new blind, the automated blind assembly must be physically mounted to the window. This would require substantial physical effort and could be beyond the capabilities of some potential users.

Despite these disadvantages, this single-motor design, with various modifications, is used as the basis for several automatic horizontal blind systems in production today.

Commercially Available Single-Motor Lift-and-Tilt Systems

SM AUTOMATIC COMPANY'S MODEL 8000

One commercially available system similar to that proposed by Nortoft is the Model 8000 Horizontal Blind Lift and Tilt System, manufactured by the SM Automatic company of Culver City, Calif., U.S.A. This product is available only as a complete motorized headrail; it cannot be practically retrofitted to a standard, existing headrail. Despite the use of a single motor, it is still very expensive: the purchase cost is approximately ten times that of a standard, high-quality Venetian blind. To this high initial cost must be added the costs of removing the existing window coverings, if any, and of installing the new blind on the window. This latter operation involves connection of power and control wires. Including installation and lost investment in existing window coverings, total cost of this system can exceed fourteen times that of a standard venetian blind.

SYSTEMS OF BAUTEX U.S.A. AND SOLARTRONICS, INC.

Two commercially available single-motor systems which can be retrofitted to certain existing horizontal blinds are the JM Lift/Tilt motor, manufactured by Bautex U.S.A., of Dallas, Tex., U.S.A.; and the MB-2000 and MB-2001, manufactured by Solartronics, Inc. of Buffalo, N.Y., U.S.A. These devices cost approximately five times as much as standard venetian blinds. These products are compatible with only a small subset of existing blinds; in most instances, users would have to replace current blinds with compatible units in order to use these systems. An additional disadvantage is that installation of these systems requires removal and modification of the host blind. Due to the difficulty of these modifications, most purchasers choose to have them performed by the factory or other professional installers. Installation of these systems also requires connection of power and control wiring. Total costs of these systems, including installation, can exceed eight times the purchase cost of standard venetian blinds. If the existing blinds are incompatible and must be replaced, total costs can exceed ten times that of standard venetian blinds.

Tilt-Only Systems

A substantial portion of the cost of the previously cited systems is attributable to their automation of the venetian blind lifting function. This requires a relatively complex drive mechanism, including slip clutches, and a powerful motor and sturdy gear-train to handle the heavy lifting loads. On the other hand, automation of the tilting function requires little torque. Accordingly, tilt-only systems have been developed, and several such systems are commercially available at much lower cost than the systems which automate both tilt and lift functions.

TWO-MOTOR, DIFFERENTIAL-TIMED SYSTEM OF DOTTO

U.S. Pat. No. 3,308,873 to Dotto (1967) describes an early tilt-only motorized system which uses two motors, rotating in opposing directions and at different speeds, coupled by a differential to the louver-tilting mechanism of a host blind. The first motor operates continuously, and relatively slowly, in a direction to open the louvers; the other motor operates only at certain times, and at approximately fifty times the speed of the first motor, in a direction to close the louvers. The second motor is triggered when the light level on the inside of the blind reaches a predetermined threshold. Thus, the two motors provide a fast-attack, slow-release, mechanism for closing the louvers in the presence of excessive light levels.

However, the mechanism shown by Dotto is relatively complex, expensive, and too large to fit within the headrails of many venetian blinds. Moreover, the object of Dotto's system can today be accomplished at far less complexity and expense by means of a single electric motor and an electronic control circuit. Further, like many of the previously described systems, Dotto's system requires installation of power and control wires, and suffers from an extremely high daily energy consumption (due to continuous operation of the first electric motor).

SYSTEM OF RINGLE

U.S. Pat. No. 4,096,903 to Ringle (1978) shows a system using a single DC electric motor, located inside the blind headrail, to rotate the tilt axle from which the louvers are suspended, thereby adjusting the louver tilt. Ringle's system represents the first inexpensive, tilt-only system for installation inside the headrail of a conventional venetian blind. However, retrofit of Ringle's system into an existing venetian blind would require removal and modification of the host blind; moreover, even with the use of expensive miniaturized components, the system could be incompatible with some small headrail designs. Further, the system requires installation of power and control wiring. Estimated cost of this system, including installation, is four times that of a standard venetian blind. If the host blind is not compatible and must be replaced, then total cost could exceed six times the purchase cost of a standard venetian blind. Nevertheless, the system shown by Ringle serves as the basis for many of the tilt-only systems which are currently in commercial production.

SYSTEM OF ARCHER

U.S. Pat. No. 4,550,759 to Archer (1985) also shows a system which automates the tilt function of a venetian blind by means of an electric motor located inside the headrail of the host blind. However, Archer's system also includes a means of manual actuation, comprising a hand-turned shaft attached to the tilt axle via a flexible coupling. Another salient feature of Archer's system is the presence of a slip clutch to enable the motor to operate continuously even after the louvers have reached the extreme angle of tilt; this enables a plurality of such systems to be used to simultaneously open or close a set of blinds, even when the initial louver tilt angle differs among the blinds.

However, like Ringle's system, retrofit of Archer's system into an existing venetian blind would require removal and modification of the host blind; moreover, the system could be incompatible with some small headrail designs. Further, Archer's system requires installation of power and control wiring. Estimated cost of this system, including installation, is four times that of a standard venetian blind. If the host blind is not compatible and must be replaced, then total cost could exceed six times the purchase cost of a standard venetian blind.

SYSTEM OF CORAZZINI

Another tilt-only system is shown in U.S. Pat. No. 5,413,161 to Corazzini (1995). This system also utilizes an electric motor, located inside the blind headrail, to rotate the tilt axle from which the louvers are suspended, thereby adjusting the louver tilt. However, this system includes a solar-charged battery to power the motor, and is capable of automatic as well as manual operation. The system includes a control panel suspended from the headrail by a multiconductor cord. The use of a solar-charged battery obviates the need to install power wiring, and the dangling control panel obviates the need to install control wiring.

However, due to the location of the motor and battery within the headrail, this system cannot be retrofitted to many conventional blinds (particularly those having small headrails). Although retrofit installation may be possible in larger venetian blinds, such installation would require removal of the host blind and, possibly, extensive mechanical modifications. Also, while the dangling control panel eliminates the need to install control wiring, it is visually obtrusive and—as a separate assembly—increases the costs of manufacture and packaging. Estimated cost of this system, including installation and lost investment in the existing blind, is approximately four times that of a standard venetian blind. If the host blind is not compatible and must be replaced, then total cost can exceed six times the purchase cost of a standard venetian blind.

COMMERCIALLY AVAILABLE TILT-ONLY SYSTEMS

Commercially available tilt-only systems include the Model 8500 Mini-Blind Tilt-Only Motor, manufactured by the SM Automatic company of Culver City, Calif., U.S.A., and the MB1000 and MB1001, manufactured by Solartronics, Inc. of Buffalo, N.Y., U.S.A. These systems are generally similar to that shown by Ringle, in that they include a single electric motor which is installed within the headrail of the host blind. Basic cost of each of these systems is approximately twice the purchase cost of a standard venetian blind. They are designed for installation within the headrails of certain standard horizontal blinds. However, they are incompatible with a considerable fraction of existing blind designs. Moreover, installation of these systems requires removal, minor modification, and subsequent re-installation of the host blind. Like many of the previously cited systems, these devices also require connection of power and control wires, which can require the services of a professional electrician. Including installation, total costs can exceed four times the purchase cost of standard venetian blinds. If the host blinds are not compatible and must be replaced, then total cost can exceed six times the purchase cost of standard venetian blinds.

SYSTEM OF MCKINNEY

The design and construction of another tilt-only system is described by McKinney (McKinney, Herbert Jr., 1995, "The Blind Robot," *Circuit Cellar Ink*, Issue No. 57, April 1995, p. 69). Like the commercially available tilt-only systems, McKinney's system is generally similar to that shown by Ringle. It is installed within the headrail of the host blind, and its installation requires removal and modification of the host blind. Also, the system may be incompatible with many of the smaller blinds currently in use. The salient feature of McKinney's system is that it is capable of responding to remote-control signals sent over the AC power line. However, the system requires an external power transformer module and a commercially-available power line interface module, both of which must be plugged into an AC outlet. A cable interconnects these modules with the controller and motor assembly (located within the headrail). Thus, like the previously mentioned systems, McKinney's system requires installation of power and control wiring (albeit via a single cable). No switches are provided for local control. Thus, while McKinney's system represents an innovation in the use of power-line control signals for control of a motorized blind, it does not address the aforementioned disadvantages of limited compatibility and high installation costs.

Externally Attached Systems

With the exception of the system shown by Webb, the previously cited systems share two primary disadvantages in connection with use as add-on devices for existing blinds: they are incompatible with many existing blind designs, and their installation requires removal and reinstallation of the host blind. These disadvantages are due to the placement of the principal components within the headrail of the host blind, and could potentially be avoided by locating them outside the headrail. Currently, however, only Webb has shown an externally attached system for automation of a modern horizontal venetian blind, and no externally attached systems for automation of pleated shades have been shown. No externally attached systems for horizontal blinds or pleated shades are currently in commercial production.

However, many externally-installed systems have been developed for the automation of other types of window coverings. In particular, many external systems are available for automating window coverings which are normally operated by pulling a cord, such as draperies, vertical venetian blinds, and obsolescent pull-cord-type horizontal venetian blinds. In principle, these systems could be adapted to automate the lifting function of a horizontal blind or pleated shade.

PULL-CORD-TYPE, HORIZONTAL BLIND SYSTEM OF LOUIS

An early externally attached system for automating the tilt-function of an obsolescent pull-cord-type venetian blind is shown in U.S. Pat. No. 4,173,721 to Louis (1979). Louis' system uses solenoids, actuated at predetermined times, to pull the tilt-adjustment cords of the host blind, thereby automatically opening and closing the louvers. The solenoids are housed in an enclosure which is placed on the floor beneath the sill of the host window. However, Louis' system is incompatible with modern wand-operated venetian blinds, is bulky and visually obtrusive, and provides limited functionality.

VERTICAL BLIND SYSTEMS OF HSIEH AND MING

U.S. Pat. No. 4,914,360 to Hsieh et al. (1990), and U.S. Pat. No. 4,956,588 to Ming (1990), disclose automatic controllers for vertical venetian blinds. This type of venetian blind is operated via two cords: a beaded cord, which controls the tilt angle of the vertical slats, and a pull cord, which moves the slats horizontally. Both of these references show a controller which operates these two cords via two motor-driven drive wheels, and is typically mounted on a wall adjacent the window. These controllers are not capable of automating the tilt function of a horizontal venetian blind, since they have no provisions for driving a shaft. However, they could be used to automate the lift function of virtually any horizontal venetian blind or pleated shade. The two disadvantages of these system are high cost and installation difficulty. Cost is high because a relatively expensive dual motor and gear train must be used to handle the heavy lifting loads, and because the drive and pressure wheels are expensive to manufacture. Installation is difficult because the systems must be mounted securely enough to handle the lifting loads, the blind's lift cord must be shortened to the appropriate length, and power wires must be connected. Retail costs of such systems would be between two and four times the cost of standard venetian blinds. Installation, if performed professionally, could cost two to three times the cost of standard venetian blinds.

OTHER CORD-PULLING SYSTEMS

Many other cord-pulling systems are available, particularly for automating draperies. In general, and in connection with possible use with venetian blinds, all these systems share the aforementioned disadvantages of the systems of Hsieh and Ming.

Solar-Powered Systems

One disadvantage in common with the previously cited systems is the need to connect power wires during installation. Some automatic window coverings attempt to avoid this disadvantage by using a solar-charged battery as a power source. Solar-powered prior-art systems fall into one of three categories: systems using a separate, fixed, flat-plate photovoltaic source; systems using a photovoltaic source separate from—but physically coupled to—a moveable shading material; and systems in which the shading means includes a photovoltaic source.

SYSTEMS USING A SEPARATE, FIXED, FLAT-PLATE PHOTOVOLTAIC SOURCE

SOLARTRONICS SD-1000 AND SD-2004 AND SIMILAR SYSTEMS

The SD-1000 and SD-2004, manufactured by Solartronics, Inc. of Buffalo, N.Y., U.S.A., are solar-powered automatic pleated shade systems using flat-plate photovoltaic sources. In both systems, the source is a physically separate element, which is electrically—but not structurally—attached to the balance of the system via a cable. The source is located between the shading material and the window glazing, and is typically secured by a bracket screwed to the window frame. This approach avoids the need for long wires and a source of AC household current. However, installation of the photovoltaic source can be difficult in many situations, and requires careful placement and the use of tools. The cable between the source and the balance of the system must be carefully routed to maintain an aesthetically pleasing appearance. Moreover, while these systems can be operated with an IR remote-control, they are incapable of local control without installation of switches and control wiring.

These systems also have the disadvantage of reduced solar collection efficiency, stemming from a non-optimum vertical inclination of the photovoltaic source. This disadvantage arises because, in many window covering installations, there is little space between the window covering and the glazing. Thus, the active surface of the flat-plate source must be nearly parallel to the glazing. Therefore, when used with conventional vertical windows, the source must be nearly vertical. However, the optimum angle of inclination of a photovoltaic source—which is a function of the prevailing latitude—can differ substantially from the vertical. The resulting loss in collection efficiency increases the required size of the source, increasing cost.

Many other solar-powered automatic window coverings using separate, fixed, flat-plate photovoltaic sources have been developed (see, for example, the photoactive energy conversion means shown by Webb). All these systems share the aforementioned disadvantages with the Solartronics systems.

TILT-ONLY SYSTEM OF CORAZZINI

As previously stated, the system of Corazzini, disclosed in U.S. Pat. No. 5,413,161 (1995), has a solar-charged battery power supply. The system includes a photovoltaic source which is attached to the headrail of the host blind in such a manner that the photoactive surface of the source faces the window. The attachment of the source to the headrail eliminates the need for power wiring.

However, when used with window frames which are relatively deep (and hence, result in a relatively great louver-to-glazing distance), the photovoltaic source of Corazzini's system would be shaded by the window frame at low solar zenith angles (e.g., at noon in summer), drastically reducing the efficiency of solar collection. Moreover, Corazzini's system cannot be used in outside-mount installations in which the blind is mounted at a significant height above the window frame, since no sunlight would reach the photovoltaic source in such a position. Even when installed in an inside-mount configuration—with a relatively small louver-to-glazing distance—the solar collection efficiency of Corazzini's system would be reduced by the fixed, essentially vertical, orientation of the photoactive surface of the source.

In contrast to the previously described Solartronics systems, Corazzini's system eliminates the need to physically mount the photovoltaic source to the window frame. However, the source must still be physically attached to the headrail of the host blind. Corazzini shows the source attached to the rear vertical face of the headrail, but does not teach a structure or method of physical or electrical attachment. Retrofitting of Corazzini's source to a conventional headrail could require substantial effort, perhaps including removal or modification of the host headrail.

SOLAR PANEL ASSEMBLY OF HIRAKI

U.S. Pat. No. 5,040,585 to Hiraki (1991) shows a flat-plate solar cell panel assembly which supplies power to operate a motorized venetian blind, with both the solar panel and the venetian blind being mounted between two glazing surfaces (glass plates). An object of Hiraki's panel assembly is to obtain a more favorable angle of inclination of the solar cell; this is done by inclining the panel upward, so that its lower edge is against the outermost glazing and its upward edge is nearer to the innermost glazing. The space between the solar panel and the outermost glazing is filled with a transparent resin having a refractive index closely matching that of the glazing, thereby reducing reflective losses. Optionally, a reflector having an L-shaped cross-section is mounted under the solar panel, effectively increasing the solar capture area. The entire solar panel assembly is mounted near the bottom of the glazing surfaces.

Hiraki's solar panel could be adapted for use with conventional, single-glazing installations of motorized venetian blinds, and would offer improved solar collection efficiency relative to the aforementioned systems using flat-plate collectors. However, the use of the refractive resin—resulting in a fixed inclination of the panel—would be a serious liability in installations which have a limited louver-to-glazing distance. Moreover, Hiraki's panel suffers from the other disadvantages previously cited for the aforementioned systems: the panel must be physically attached to the window frame, requiring careful placement and—perhaps—the use of an electric drill. Wiring must be installed between the panel and the balance of the system, and the wiring must be carefully routed to maintain an aesthetically pleasing appearance.

SYSTEMS USING A PHOTOVOLTAIC SOURCE SEPARATE FROM, BUT PHYSICALLY COUPLED TO, THE SHADING MATERIAL

COMFORTEX CORP. SMART SHADE™

U.S. Pat. No. 4,807,686 to Schnebly (1989) describes a system which is now available commercially as the Smart Shade™, manufactured by Comfortex Corporation of Cohoes, N.Y., U.S.A. This system is a motorized pleated-shade system in which the major components—including the motor, battery, and a flat-plate photovoltaic source—are physically coupled to, and move with, the shading material. This unique feature is possible because the photovoltaic source, motor, battery, and ancillary electronics are all mounted in a moveable sill bar at the bottom of the shading material. The edges of the shading material ride on a special slide track installed on each side jamb of the window frame, and the motor drive wheels bear on this slide track. Thus, the motor pushes the shading material up from the bottom, rather than pulling it up from the top (as is the case with conventional pleated shades). The bottom edge of the shading material is sandwiched between the sill bar and the photovoltaic source, with the source facing outward to collect the solar radiation. The source is rigid and arranged in a rectangular configuration, with the long dimension of the configuration being parallel to the long dimension of the sill bar. Since both the battery and the photovoltaic source are located at the bottom of the shade (but on separate sides of the shade material), only a short cable is required to interconnect them, and this cable is installed at the time of manufacture. Thus, no power wiring need be installed during installation of this system. This system includes an infrared remote-control unit, but no local control switches are provided.

However, the absence of local control switches may be disadvantageous in many applications. More importantly, a motorized, moving sill bar attached to the bottom of the shading surface (as taught by this system) cannot be adapted for use with conventional venetian blinds. This is because the louvers in a conventional venetian blind are suspended from the headrail; thus, the motor drive must also be located at the headrail. For the same reason, this system is also incapable of being adapted for use with conventional pleated shades.

If the motor drive is located at the headrail (as it must be for use with venetian blinds and pleated shades), the advantages of a photovoltaic source attached to the bottom of the shading means (as taught by this system), are considerably weakened. This is due to the need for electrical conductors between the bottom-mounted photovoltaic source and the headrail-mounted battery or motor. These conductors would have to span a varying length as the blind or shade is raised and lowered. In a pleated shade, these conductors could take the form of flexible, conductive strips affixed to the shading material; in a venetian blind, they could take the form of conductive lift cords. However, neither of these approaches is practical for retrofit to an existing blind or shade; the required time and effort for installation of the conductors would far exceed that associated with installation of a separate, fixed, flat-plate source (as is used, for example, in the Solartronics SD-2004).

In addition, when used with vertical windows, the Comfortex system suffers from the same reduced solar collection efficiency that plagues the fixed, flat-plate systems described above. This is because the angle of inclination of the photovoltaic source is substantially equal to that of the shading material, which is, in turn, typically equivalent to that of the glazing.

Cost of the Comfortex system is approximately ten times that of a standard venetian blind, exclusive of installation costs. Including installation costs and lost investment in existing window coverings, costs of this system can exceed sixteen times that of a standard venetian blind.

ROLLER-TYPE MOTORIZED SHADES

Solar-powered, roller-type, motorized window shades are also available. These include a flat, flexible sheet of shading material wrapped around a motorized roller located at the top of the host window. A rigid, flat-plate photovoltaic source is mounted at the bottom of the sheet, facing outward, and electrical conductors attached to the sheet interconnect the source with a battery and other components located near the motorized roller. Since the source is generally rigid and cannot be wound around the roller, the source is typically arranged in a rectangular configuration, with the long dimension of the configuration parallel to the long dimension of the roller. This minimizes the area of shading material left exposed when the shade is retracted.

This approach eliminates the need for power wiring. However, the use of a photovoltaic source attached to the bottom of a moveable shading surface (as is taught in these systems) has the same disadvantages previously cited for the Comfortex Smart Shade™ system: such placement would require electrical conductors between the source and the battery, substantially increasing the difficulty of installation in retrofit applications.

In addition, when used with vertical windows, the roller-type systems suffer from the same reduced solar collection efficiency that plagues the fixed, flat-plate systems described above. This is because the angle of inclination of the photovoltaic source is substantially equal to that of the shading material, which is, in turn, very nearly the same as that of the glazing.

Installation of these roller-type motorized window shades requires tools, and—although power wiring is not required—control wiring must be installed. Costs of this type of system, excluding installation, exceed two times that of standard venetian blinds. Including installation costs and the lost investment in existing window coverings, costs of this system can exceed four times that of standard venetian blinds

SYSTEMS IN WHICH THE SHADING MATERIAL INCLUDES A PHOTOVOLTAIC SOURCE

Practitioners in the art have proposed roller-type motorized shade and awning systems wherein the entire shading surface, or a portion thereof, comprises a thin, flexible, photovoltaic source. In these conceptual systems, the source is flexible enough to be wound around a roller as the shade is retracted. Thus, the source can be made very large, while still permitting the shade to be fully retracted. Such systems are not yet in production, but may prove advantageous with further advancements in the technology for manufacture of flexible photovoltaic materials. However, the costs of such systems are unlikely to be substantially less than that of current roller-type motorized shade systems.

Moreover, the use of flexible sources attached to the shading material (as taught by these conceptual systems) provides no advantage in the context of venetian blinds, for three reasons. First, venetian blinds do not use a sheet of flexible shading material wound around a roller, so the flexibility of the source provides no advantage. Second, attachment of a photovoltaic source anywhere on the louvers would interfere with the lifting and tilting functions of the blind. Third, as is the case with the bottom-mounted photovoltaic sources discussed previously, electrical conductors would be required between the source and the headrail, increasing the difficulty of installation in retrofit applications.

This approach would also be disadvantageous in the context of pleated shades, for two reasons. First, although a flexible photovoltaic source could be included as part of the shading material, such a source would provide substantial power only with the shade fully lowered; otherwise, the source area exposed to the solar illumination would be sharply reduced. Second, retrofit of such a source to an existing pleated shade would be prohibitively difficult: it would entail bonding of the source—as well as electrical conductors—to the shading material, which could require considerable skill, as well as disassembly of the shade.

Need for Local Control Switches and Associated Wiring

Many extant motorized window coverings are capable of operating automatically, in response to a light sensor, temperature sensor, or timer. Other systems can be controlled via an Infra-Red (IR) or Radio Frequency (RF) remote control. However, even when both automatic and remote control capability are included, it is highly desirable to also provide a manual control switch located in a convenient, fixed location. Such a switch is often referred to as a local control switch. In a system capable of remote control, a local control switch enables the system to be easily operated when the remote control is lost, broken, or out-of-reach. In a system capable of automatic operation, such a switch allows the user to program or over-ride the automatic operation, as desired. Moreover, a local control switch is mandatory if neither automatic nor remote-control capability is provided.

In the extant systems, the local control switch is connected to the balance of the system via a multi-conductor electrical cable. This switch is typically mounted in the wall in the same manner as a light switch. This approach is used by most of the commercially-available systems, including the previously described system of Ipekgil, as well as those manufactured by the SM Automatic Co. and Bautex U.S.A. The installation of such a switch can require the services of a professional electrician, significantly increasing the costs of installation. Another approach uses surface-mount switches and wires. Such an approach is taken in the some of the systems manufactured by Solartronics Inc. This approach does not require the services of an electrician, but the surface-mount wiring is relatively expensive and its installation still requires substantial skill to achieve an aesthetically pleasing result. The need for control wiring is a serious disadvantage, because it substantially increases the cost and effort of installation. This disadvantage is shared by all extant systems which include a local control switch, with the exception of the aforementioned systems of Corazzini and Webb.

As previously stated, Corazzini's system uses a control panel suspended from the headrail by a multiconductor electrical cord. This allows the system to be operated locally without need for installation of control wiring. However, the control panel is essentially a separate, complete subassembly, having its own housing and including several electrical components; accordingly, costs of manufacture would be greater than those of the simpler switch panels used in other systems. Corazzini does not show details of the electrical cord, but—since it is exposed to view—an aesthetically-pleasing sheath or jacket would be required, increasing the costs of manufacture. Electrical attachments to the multiconductor cord (e.g., via soldering) would also increase costs of assembly.

As previously stated, Webb's system uses an electrical switch actuated by downward motion of a control wand to engage automatic tilting of the louvers of the host blind to a closed position; the louvers can also be mechanically opened or closed by manually rotating the same wand. This provides an inexpensive means of local control without need for installation of control wiring.

Webb's control wand switch provides only one electrical output, which is sufficient for control of Webb's mechanically-driven system (which is capable only of automatically closing a blind previously opened by hand). As previously stated, the inability of Webb's system to automatically open the host blind is a serious disadvantage. In contrast, most of the aforementioned electrically-driven systems are capable of automatically opening, as well as closing, a venetian blind. These systems require several electrical outputs or independent switch contacts for complete control; therefore, the control wand switch shown by Webb is inadequate to control a full-function, automatic venetian blind.

Summary of Prior Art Limitations

In summary, many approaches for the automation of window coverings have been developed, and automatic venetian blinds have been commercially available for many years. However, all of these prior-art approaches share the disadvantage of high net cost, which includes three components:

The basic cost of prior-art systems, exclusive of installation, ranges from approximately two to ten times the cost of a standard venetian blind. The lower end of the range is dominated by add-on systems capable of automating only the tilt functions, while the upper end of the range is dominated by complete automatic blind systems which are capable of both tilt and lift automation. Costs of cord-pulling systems, if adapted for use with horizontal blinds, would lie between these extremes.

The costs of installation of prior-art automatic horizontal blind systems range from approximately one to two times the cost of a standard venetian blind. The lower-end of the range is dominated by complete automatic blind systems, while the upper end of the range is dominated by add-on systems, most of which require removal and modification of the host blind. Costs of installation of cord-pulling systems, if adapted for horizontal blind use, would lie between these extremes. Most of these prior-art systems require installation of electrical wiring and switches, in addition to physical mounting of the blind or cord-pulling system itself. The necessary electrical work often requires the services of a qualified electrician. The physical mounting of the system requires a considerable degree of manual dexterity. Tools, including an electrical drill, are typically required.

The use of prior-art automation systems generally results in loss of the investment in existing window coverings, including the costs of their original installation. This lost investment ranges from approximately one to two times the cost of a standard venetian blind. The lower end of this range represents add-on systems which are compatible with the original blinds, while the upper end of this range represents all other prior art systems for venetian blind automation.

Thus, the overall cost of prior-art systems ranges from approximately four to fourteen times that of standard venetian blinds. This high cost is prohibitive for many important applications. For example, it is a barrier to tapping the considerable energy-savings potential of automatic venetian blinds in commercial office buildings. In residential applications, the high cost of prior art systems has relegated automatic venetian blinds to luxury status, and has thereby prevented widespread general usage. Finally, the high cost has also severely limited the use of automatic venetian blinds among the physically-challenged, many of whom could derive significant benefit from their use.

SUMMARY OF THE INVENTION

Objects and Advantages

Several objects and advantages of the present invention are:

- to provide a system for the automatic operation of venetian blinds which can be retrofitted to existing blinds, and which is compatible with a wide range of existing blind designs and sizes;
- to provide a system which can be easily and quickly installed without tools and without requiring removal or modification of the host blind;
- to provide a system which does not require installation of wires for power or local control signals; and
- to provide a system which is simple and relatively inexpensive to manufacture.

Further objects and advantages are to provide a system which is easy to use, which is capable of both manual and automatic operation, and which can also be operated by remote control. Still another object and advantage is to provide a system which can be adapted for use with other window coverings, particularly pleated shades. Other objects and advantages will become evident from consideration of the drawing and accompanying description.

Salient Features of Subject Invention

According to the teachings of the invention, these objects and advantages can be achieved by an automatic controller for venetian blinds which:

- is located external to the headrail of the host blind, eliminating the need for expensive miniaturized components and modifications of the host blind;
- includes a bracket which engages the top edge of the front wall of the host blind's headrail, ensuring easy installation and compatibility with headrails of varying size;
- includes a coupling tube which attaches to the host blind's tilt-adjustment shaft in the same manner as the blind's tilt-control wand, simplifying installation;
- includes a gearmotor to drive the coupling tube, with the torque path between the gearmotor and the coupling tube having a flexible joint or an extensible joint, or with the mounting of the gearmotor providing angular variability in the initial orientation of gearmotor 85 relative to the host headrail, or translational variability in the initial position of gearmotor 85 relative to the host headrail, with the sum of the number of flexible joints, extensible joints, axes of angular variability, and axes of translational variability being no less than three, so that torque can be transferred from the gearmotor to the coupling tube over varying linear and angular displacements—thus ensuring compatibility with tilt-adjustment shafts of varying location and orientation;
- includes a photovoltaic source attached to a flexible member, the member providing physical support for—and electrical connections to—the source, and being sufficiently thin to fit between the headrail and the window frame, sufficiently flexible to substantially conform to the shape of the headrail, and sufficiently long to optimally position the source between the window glazing and the louvers of the host blind, thus simplifying installation, increasing the efficiency of solar collection, minimizing the risk of shading due to the window sash and frame, eliminating the need for power wiring, and enabling use in both inside-mount and outside-mount blind configurations;
- includes a plurality of momentary-contact electrical switches and an actuating body, the actuating body having a stem to which the tilt-adjustment wand of the host blind can be attached, and so arranged that upward movement of the wand causes one of the switches to close, downward movement of the wand causes a second one of the switches to close, clockwise rotation of the wand causes a third of the switches to close, and counterclockwise rotation of the wand causes a fourth of the switches to close, thus providing an inexpensive means of convenient control of the system without need for installation of control wiring, and without need for separate switches.

DESCRIPTION OF DRAWING FIGURES

The drawing is extensive; therefore, related figures have the same number but different alphabetic suffixes.

FIGS. 1A to 1G: Prior-Art Venetian Blinds

FIG. 1F shows an inside-mount configuration, while FIG. 1G shows an outside-mount configuration.

FIGS. 2A to 2L: Electrical Configuration

Figure 2A:
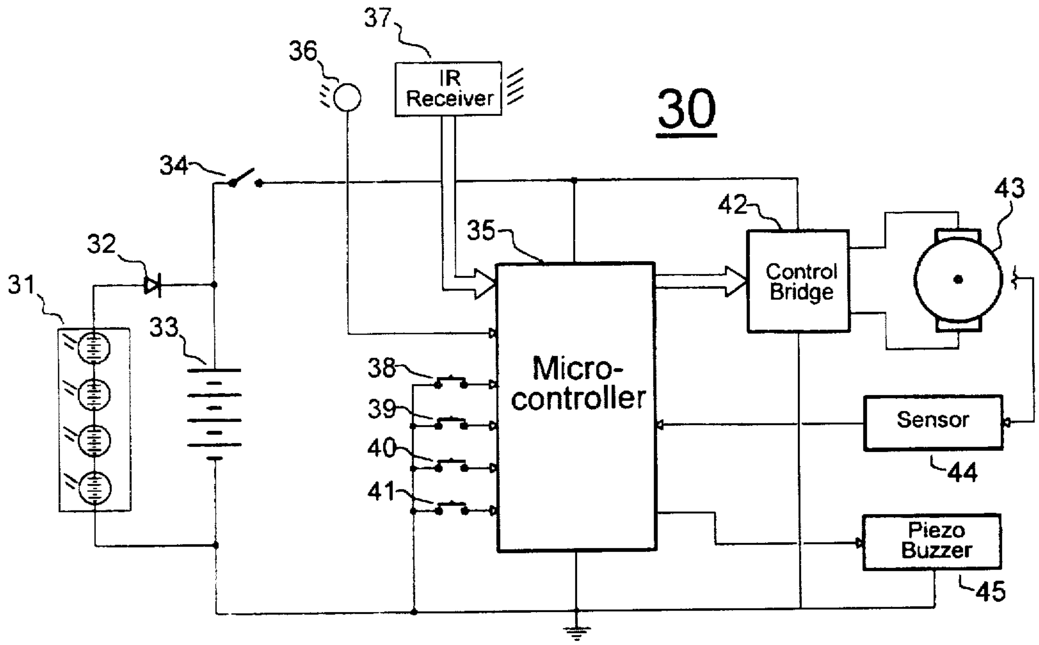

FIG. 2A shows a high-level electrical block diagram of a basic embodiment of my automatic venetian blind controller.

Figure 2B:
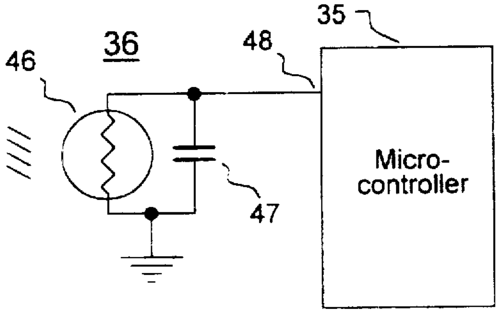

FIG. 2B shows an electrical schematic of a microcontroller-based ambient illumination sensing scheme, using a photoresistor as the sensing element.

Figure 2C:
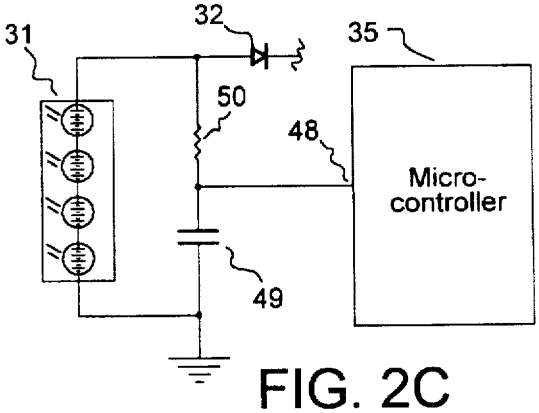

FIG. 2C shows an electrical schematic of a microcontroller-based ambient illumination sensing scheme, using a photovoltaic source as the sensing element.

Figure 2D:
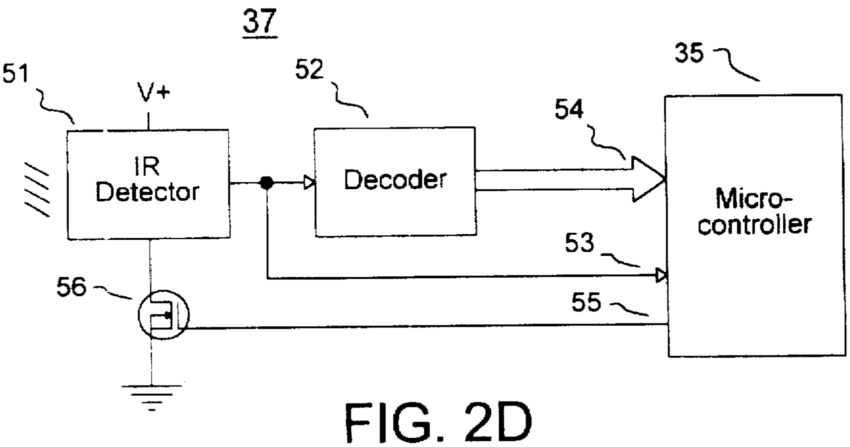

FIG. 2D shows an electrical schematic of an Infra-Red (IR) remote control receiver, using a commercially available IR detector module and IR decoder Integrated Circuit (IC).

Figure 2E:
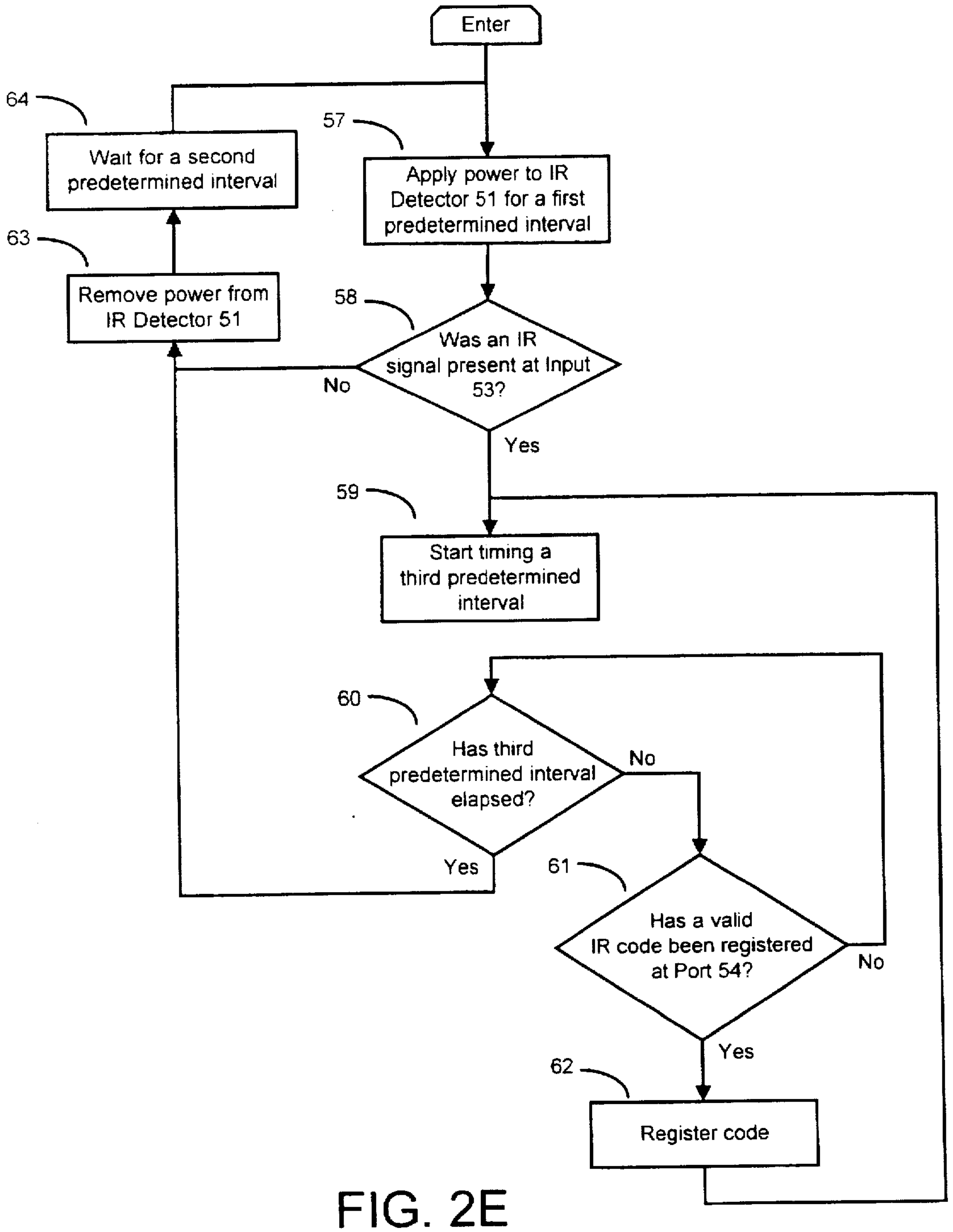

FIG. 2E is a software flowchart showing an algorithm to reliably detect the presence of IR signals with low average power consumption, using low-duty-cycle operation of a commercially available IR detector module.

Figure 2F:
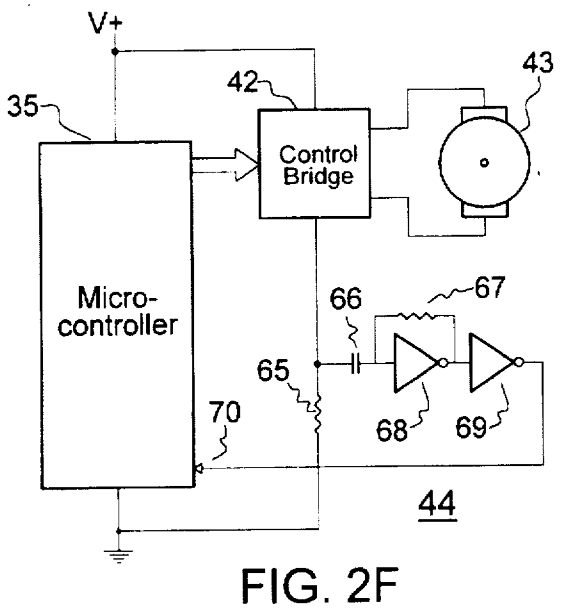
Figure 2G:
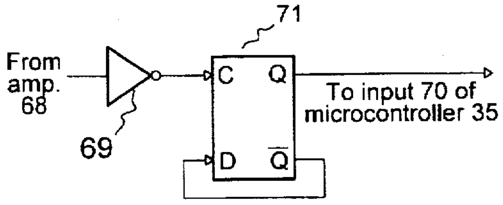
Figure 2H:
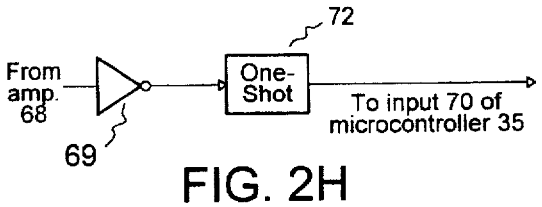
Figure 2I:
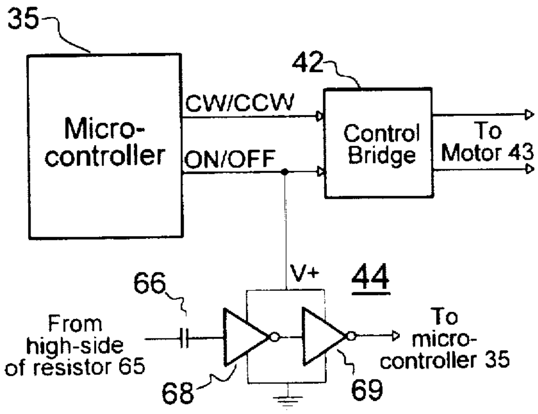
Figure 2J:
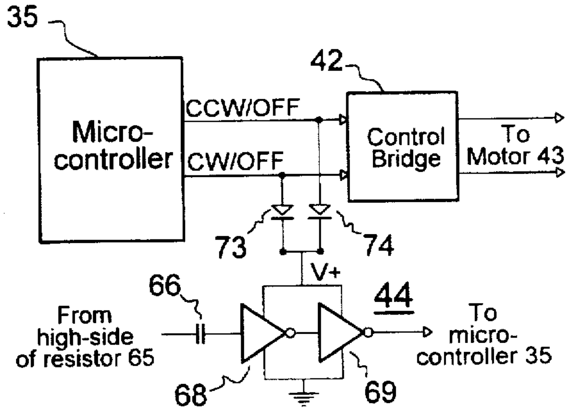

FIGS. 2F to 2J show electrical schematics of a low-cost motor-position feedback sensor, using a capacitively-coupled amplifier to detect the commutation-induced discontinuities in the drive current of a brush-commutated DC motor. FIG. 2F shows the basic scheme; FIGS. 2G and 2H show the use of a flip-flop and monostable multivibrator, respectively, to improve performance; and FIGS. 2I and 2J show techniques for supplying power to the position feedback sensor.

Figure 2K:
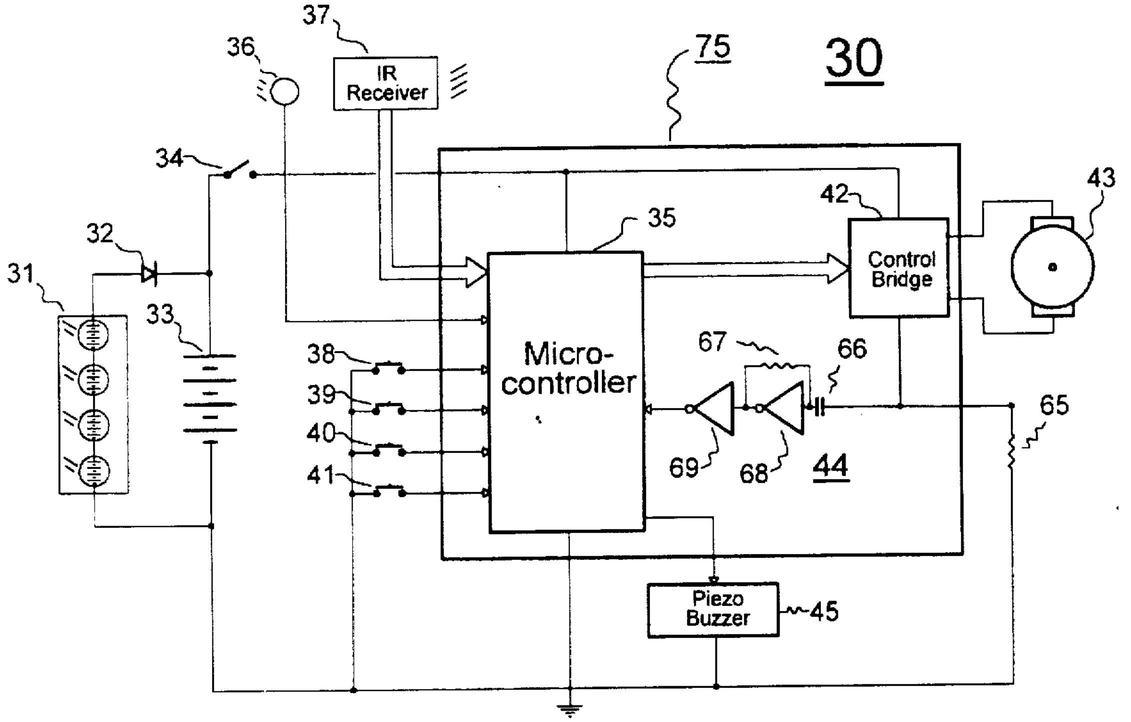

FIG. 2K shows an electrical block diagram of an alternative embodiment of my automatic venetian blind controller, with a microcontroller, motor-drive bridge, and motor position feedback sensor integrated into a single monolithic IC.

Figure 2L:
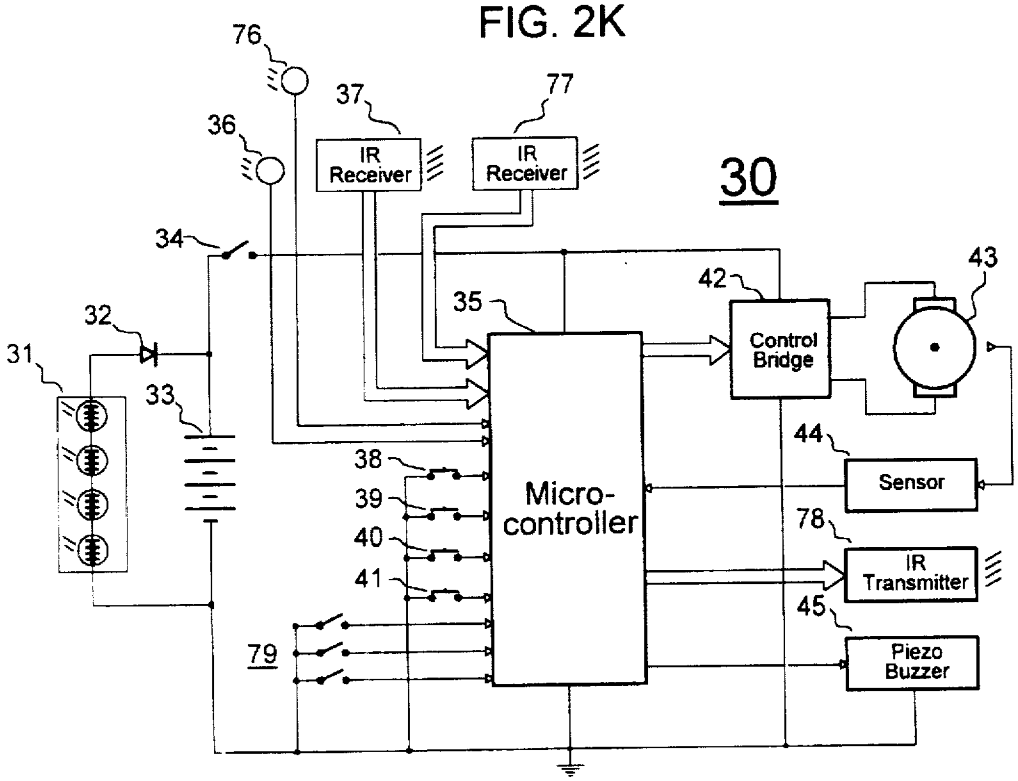

FIG. 2L shows an electrical block diagram of an alternative, expanded embodiment of my automatic venetian blind controller, with additional elements to provide additional capabilities.

Figure 3A:
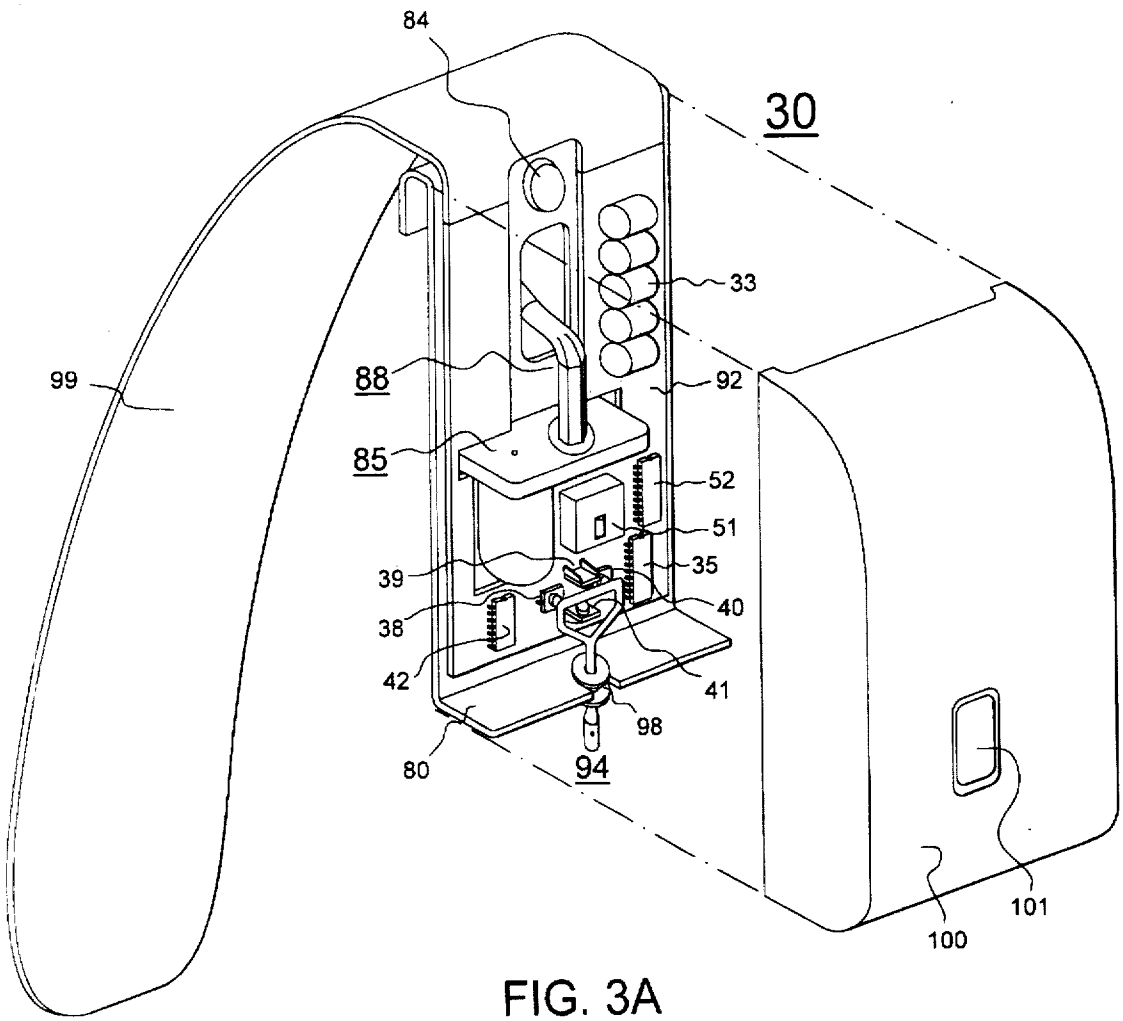
Figure 3B:
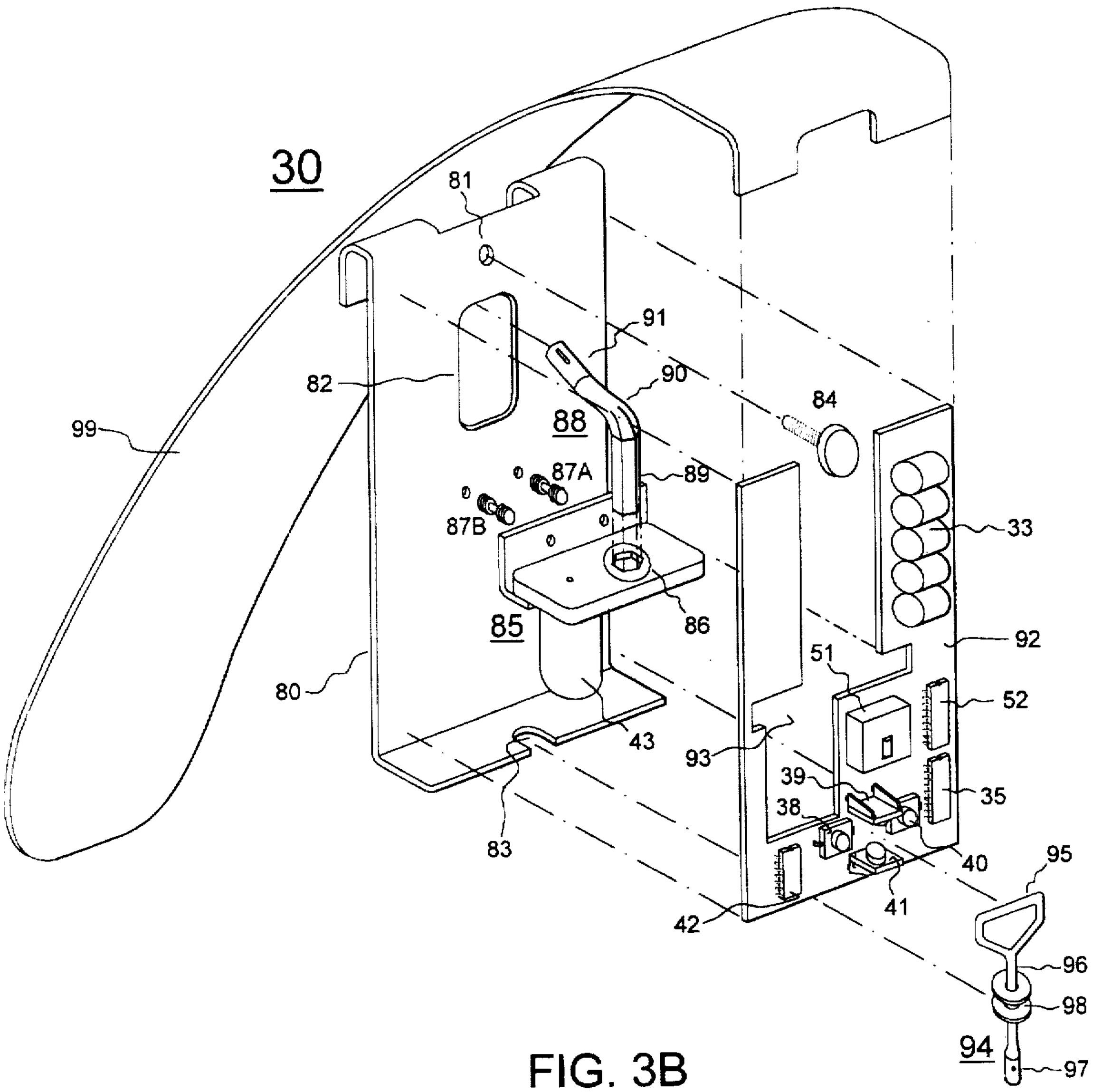

FIGS. 3A and 3B: Overall Structure of Preferred Embodiment

FIGS. 3A and 3B show, respectively, standard and exploded isometric views of the physical structure of a preferred embodiment of my automatic venetian blind controller.

FIGS. 4A to 4G: Mounting Bracket

Figure 4A:
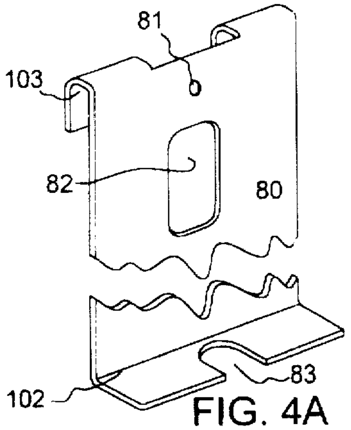
Figure 4B:
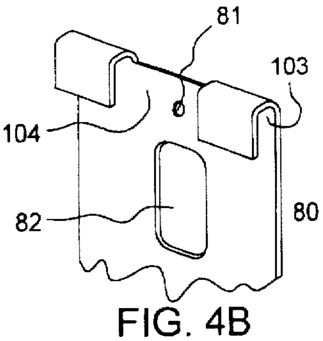
Figure 4C:
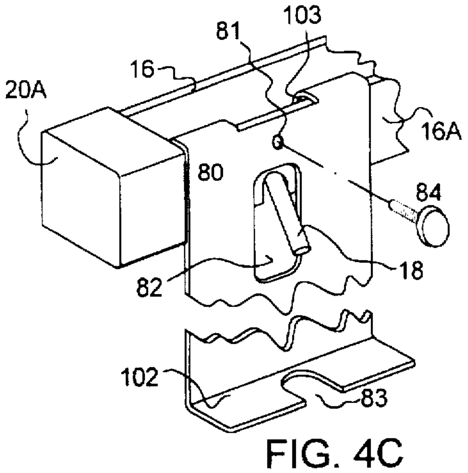

FIGS. 4A to 4C show isometric views of a mounting bracket. FIGS. 4A and 4B show, respectively, front and back views of the bracket, while FIG. 4C shows the bracket attached to the headrail of a conventional venetian blind.

FIGS. 4D to 4G show isometric views of advantageous variants of the mounting bracket.

FIGS. 5A to 5F: Preferred Embodiment of Torque Transmission Scheme

Figure 5A:
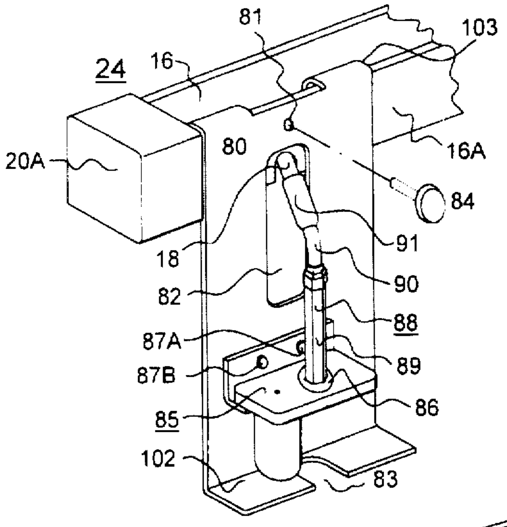
Figure 5B:
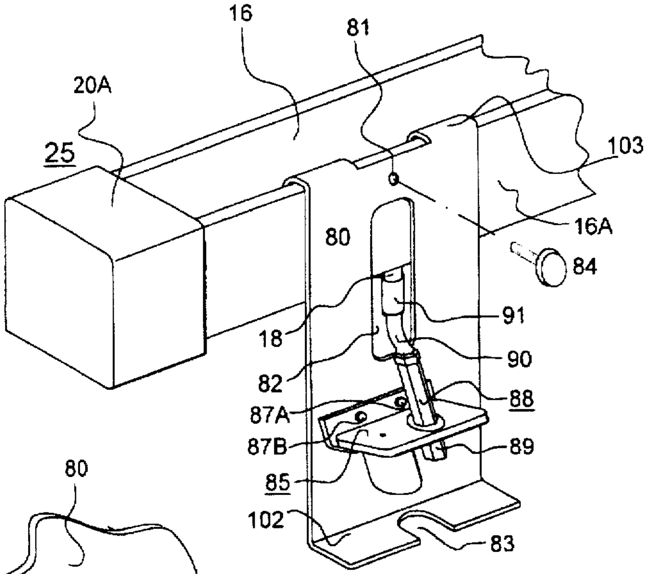

FIGS. 5A and 5B show isometric views of a mounting bracket, a rubber-mounted gearmotor, and a flexible driveshaft of my automatic venetian blind controller, in conjunction with conventional venetian blinds. FIG. 5A shows these elements mounted to the headrail of a small conventional venetian blind, while FIG. 5B shows these elements mounted to the headrail of a large conventional venetian blind.

Figure 5C:
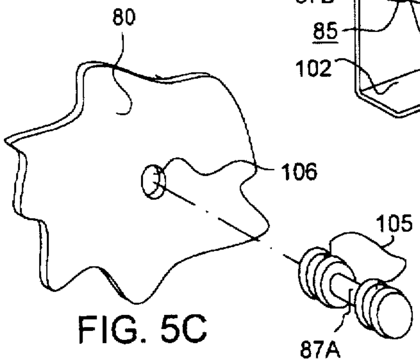

FIG. 5C shows an isometric view of a rubber rivet used to flexibly mount the gearmotor to the mounting bracket.

Figure 5D:
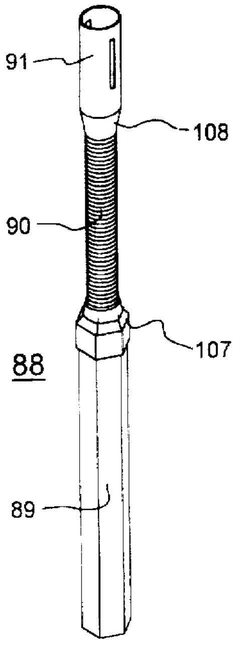
Figure 5E:
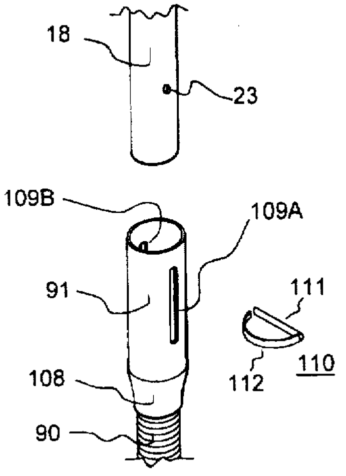
Figure 5F:
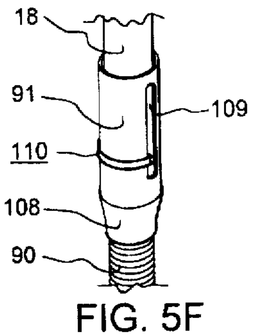

FIGS. 5D to 5F show isometric views of a flexible driveshaft, having a single flexible section, of my automatic venetian blind controller. FIG. 5D shows the basic configuration of the drive shaft, while FIGS. 5E and 5F show the attachment of the upper portion of the driveshaft to the tilt-adjustment shaft of a conventional venetian blind.

FIGS. 6A to 6I: Alternative Embodiments of Torque Transmission Scheme

Figure 6A:
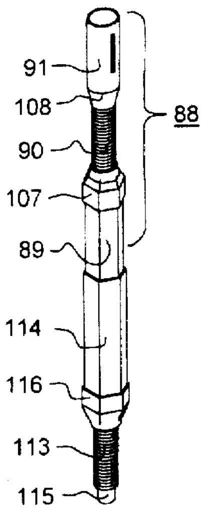
Figure 6B:
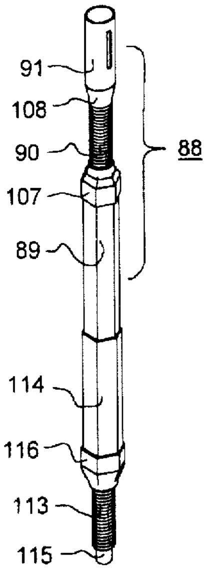
Figure 6C:
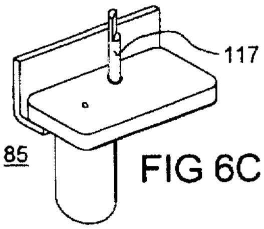

FIGS. 6A to 6C show isometric views related to an alternative embodiment of the driveshaft, which includes a telescoping center section and two flexible end sections. FIGS. 6A and 6B show the driveshaft in the contracted and extended positions, respectively, while FIG. 6C shows a flatted gearmotor output shaft to mate with the lower end of the driveshaft.

Figure 6D:
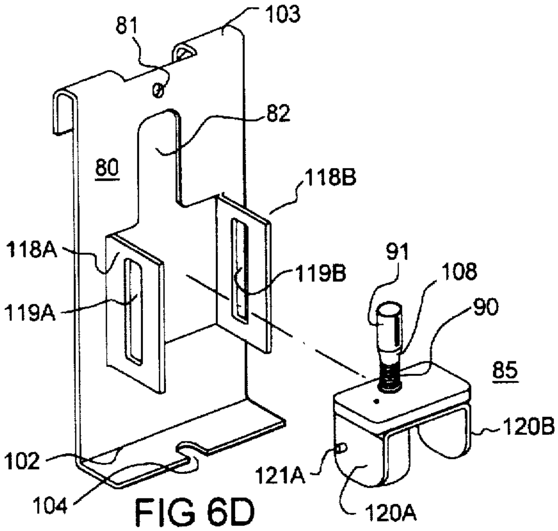
Figure 6E:
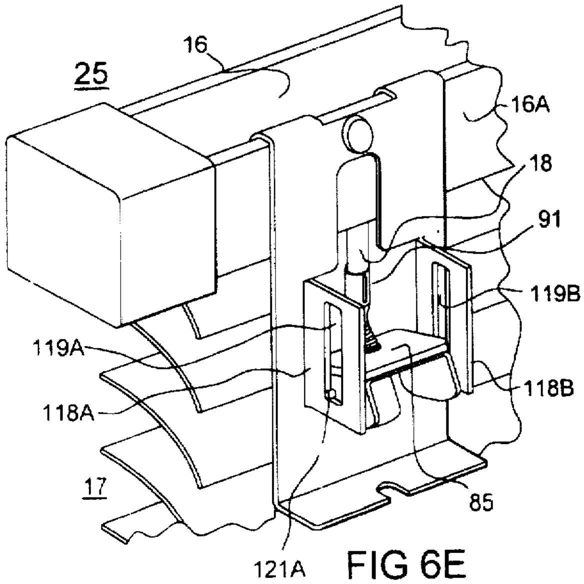
Figure 6F:
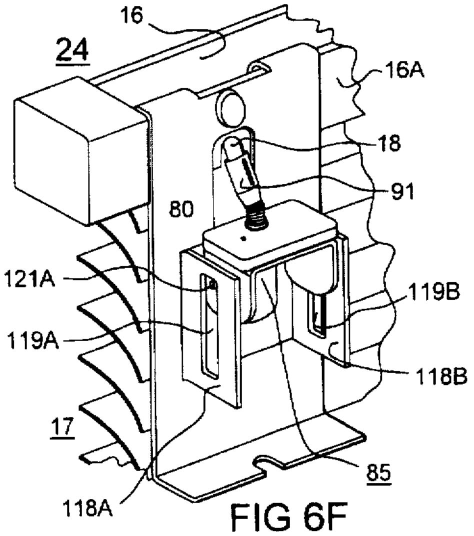

FIGS. 6D to 6F show an alternative, simplified embodiment of the mounting bracket and gearmotor. This embodiment uses a moveable gearmotor mount, as well as a simple flexible coupling and coupling tube, to couple the gearmotor to the tilt-adjustment shaft of the host blind. FIG. 6D shows an exploded view, with the gearmotor separate from the bracket, while FIGS. 6E and 6F show the gearmotor attached to the bracket. FIG. 6E shows the bracket mounted to a large conventional venetian blind, while FIG. 6F shows the bracket mounted to a small conventional venetian blind.

Figure 6G:
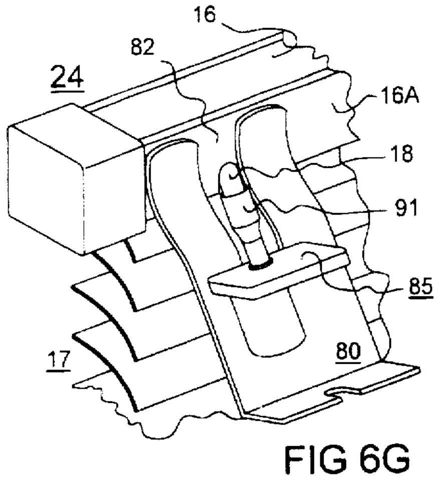
Figure 6H:
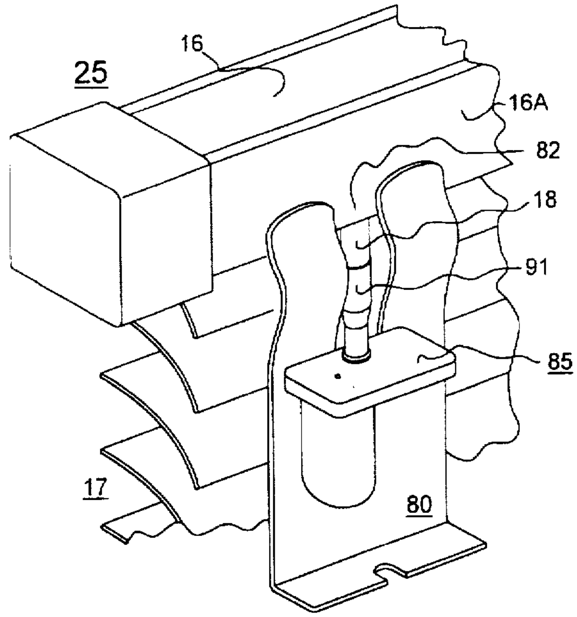
Figure 6I:
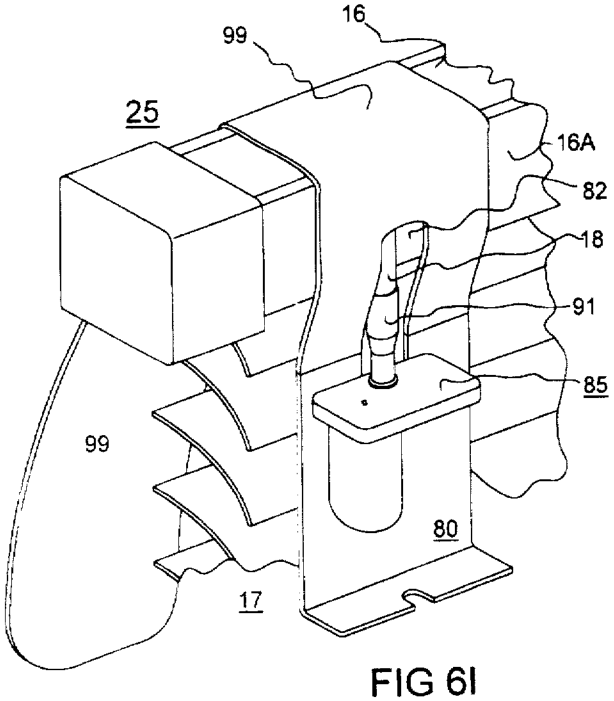

FIGS. 6G to 6I show another alternative, simplified embodiment of the mounting bracket and gearmotor. This embodiment uses a rigid coupling between the gearmotor and the tilt-adjustment shaft. FIG. 6G shows an isometric view of the bracket and gearmotor alone, FIG. 6H shows the bracket mounted on a small conventional blind, and FIG. 6I shows the bracket mounted on a large conventional venetian blind.

FIGS. 7A to 7I: Wand Switch Assembly

Figure 7A:
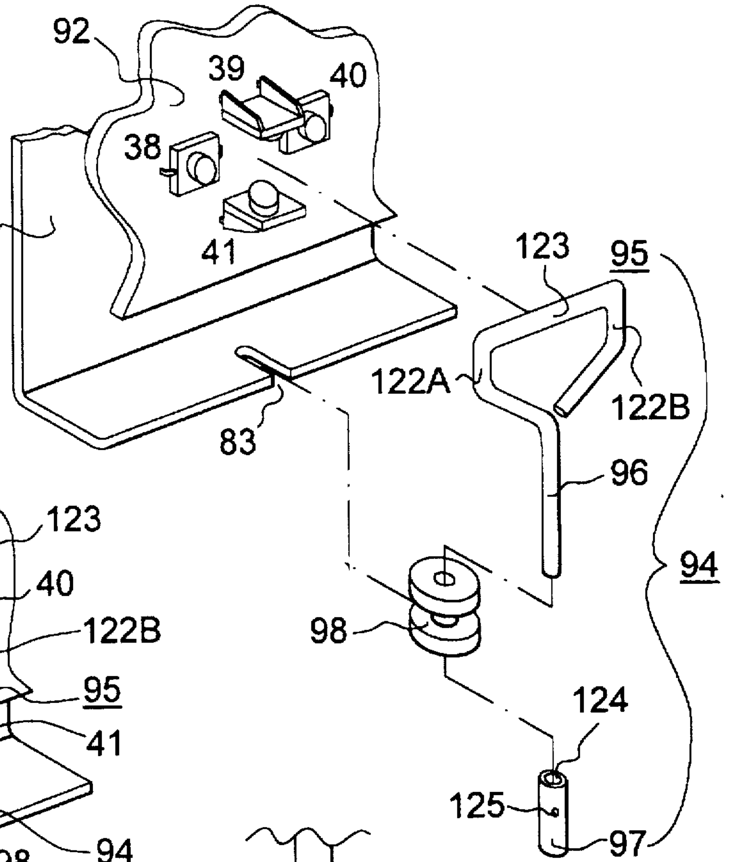
Figure 7B:
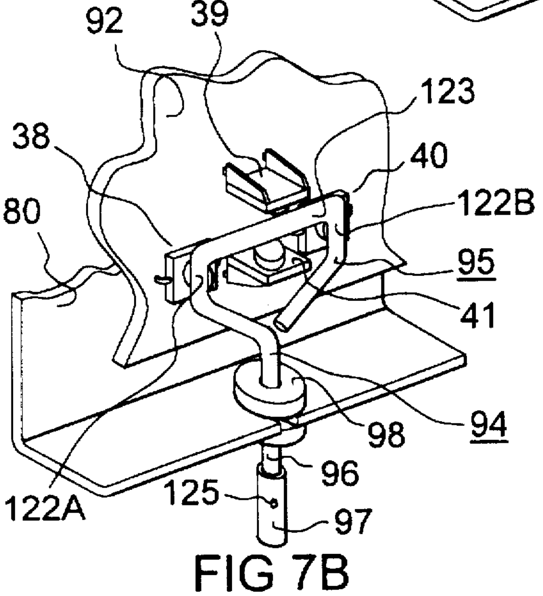
Figure 7C:
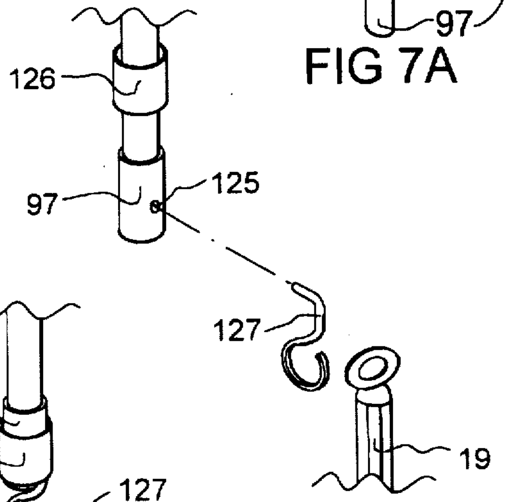
Figure 7D:
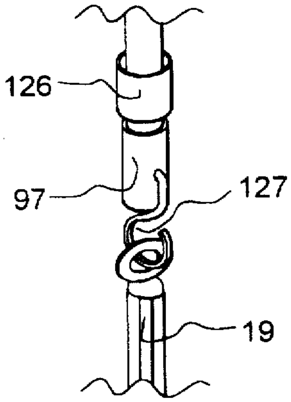

FIGS. 7A to 7E show a switch assembly having two standard-mount and two right-angle-mount momentary-contact printed-circuit-board switches, and including a bent-wire actuating body which can be attached to the tilt-control wand of a conventional venetian blind. FIGS. 7A and 7B show, respectively, exploded and standard views of the switch assembly, while FIGS. 7C to 7D show the attachment of the lower portion of the actuating body to a control wand of a standard venetian blind.

Figure 7E:
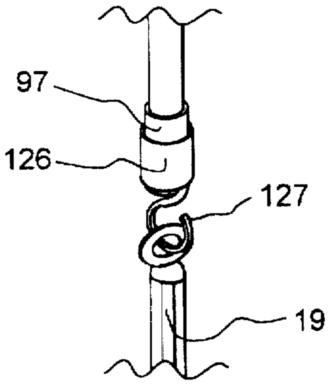
Figure 7F:
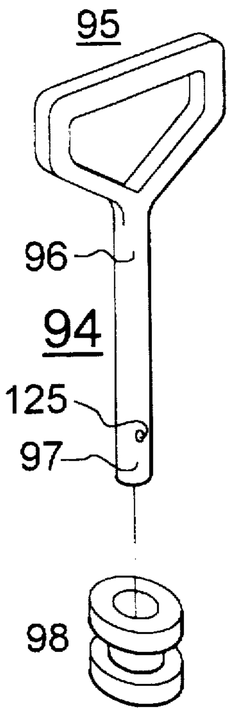

FIG. 7F shows an alternative, molded-plastic embodiment of the actuating body.

Figure 7G:
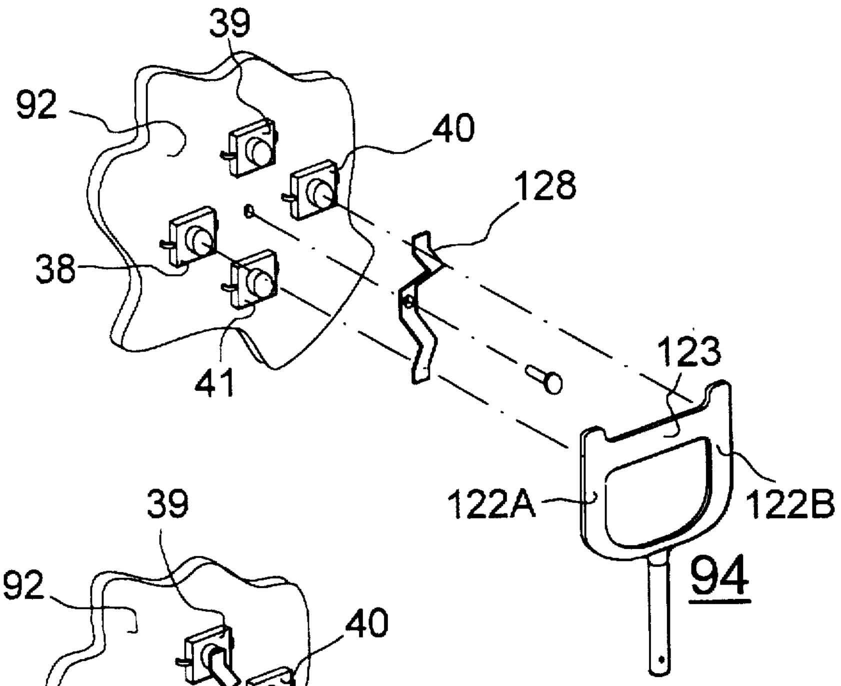
Figure 7H:
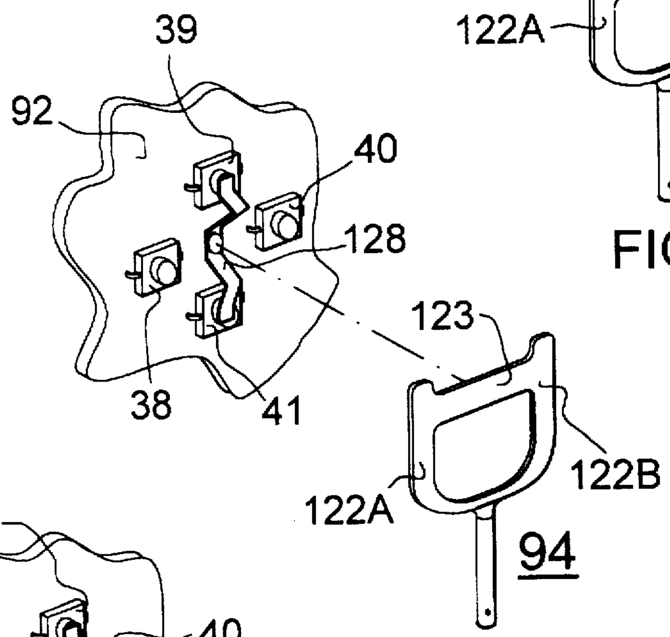
Figure 7I:
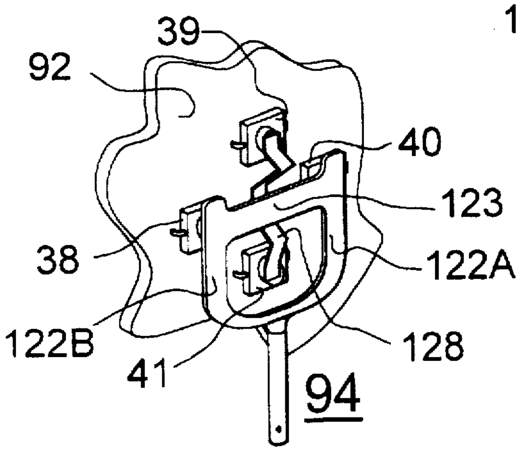

FIGS. 7G to 7I show an alternative embodiment of the switch assembly, having four standard-mount momentary-contact printed-circuit-board switches (instead of two standard-mount and two right-angle-mount switches) and a metal actuating leaf.

FIGS. 8A to 8K: Flexible Support Member and Photovoltaic Source

Figure 8A:
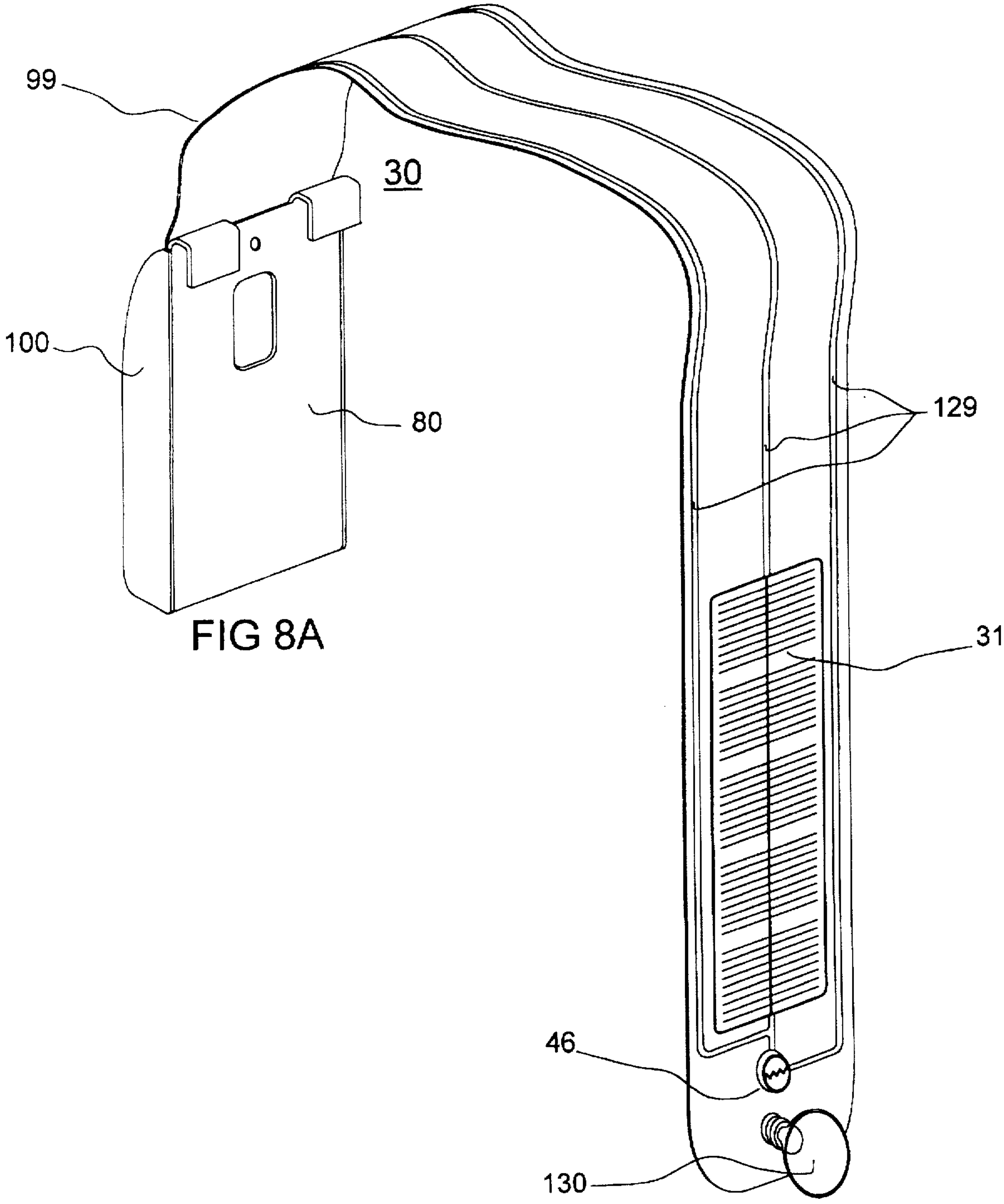
Figure 8B:
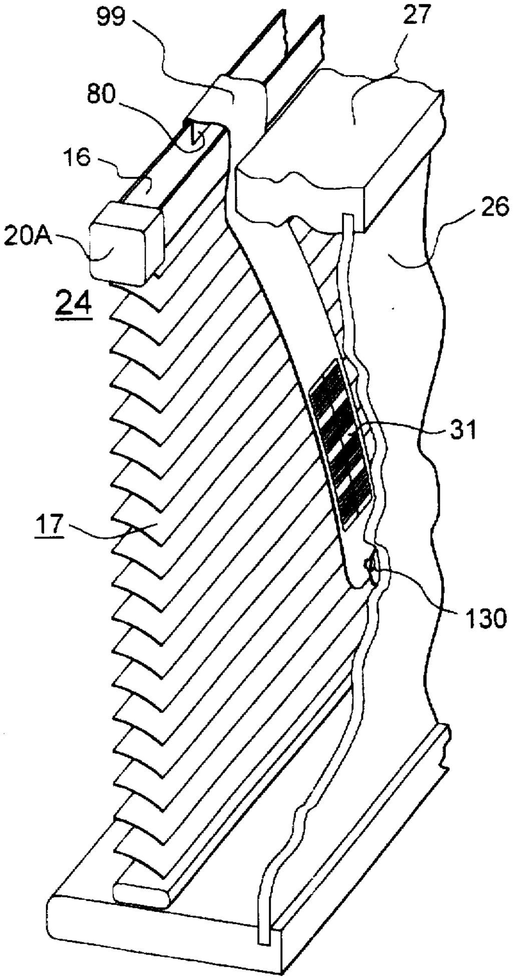
Figure 8C:
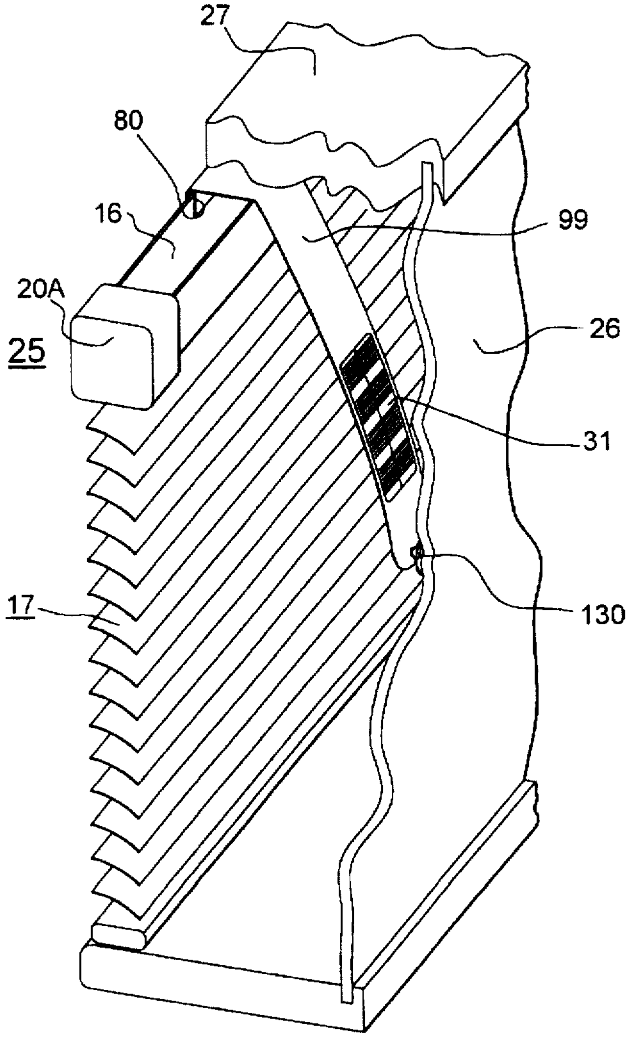

FIGS. 8A to 8C show a preferred embodiment of a flexible support member and photovoltaic source. FIG. 8A shows an isometric view of the embodiment, which consists of photovoltaic material and electrical conductors deposited on the surface of a thin, flexible member, along with a conventional suction cup. FIGS. 8B and 8C show this embodiment in conjunction with prior-art conventional venetian blinds; FIG. 8B shows a small venetian blind in an outside-mount configuration, while FIG. 8C shows a large venetian blind in an inside-mount configuration.

Figure 8D:
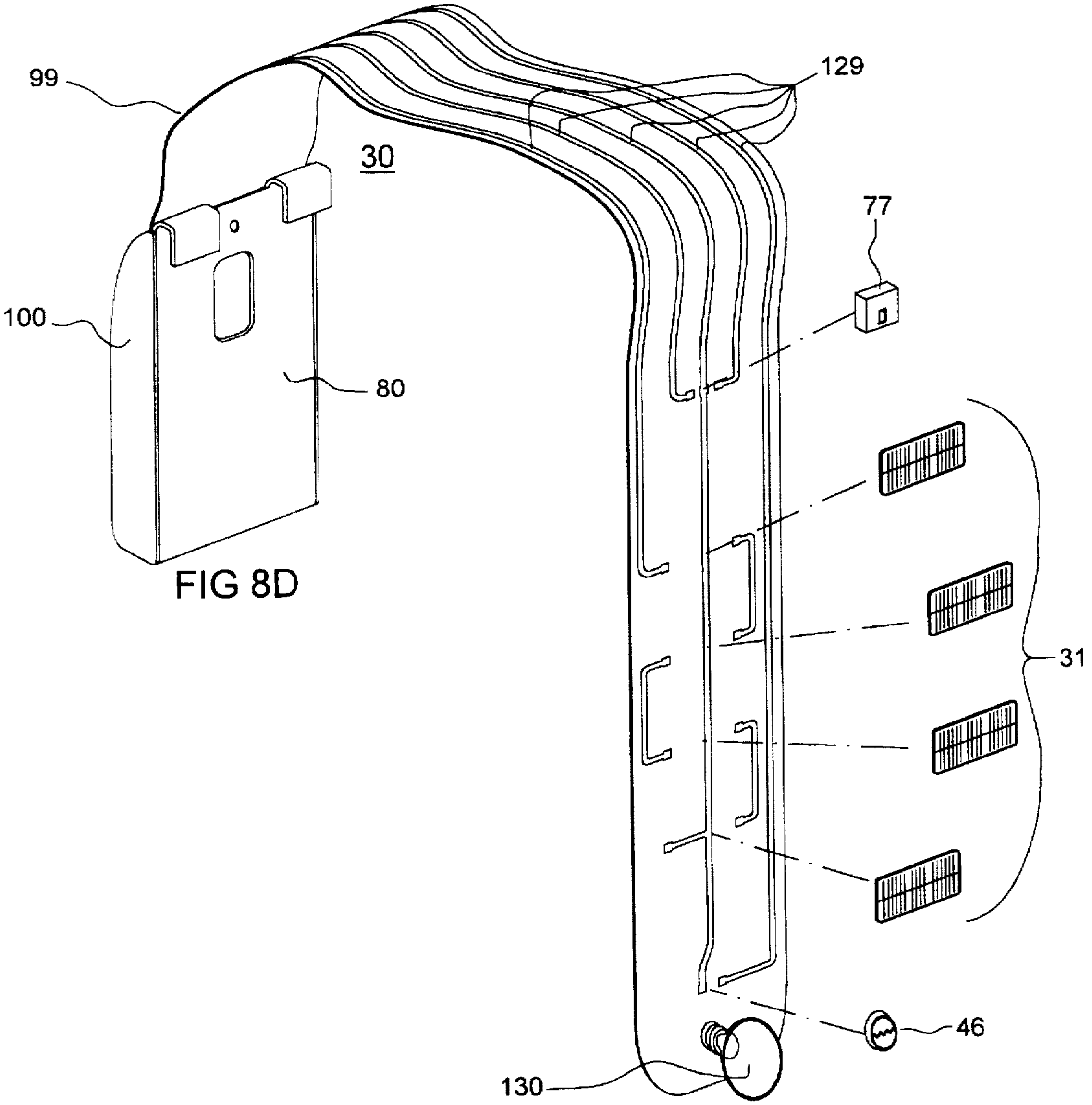

FIG. 8D shows a variant of the flexible support member and photovoltaic source which uses separate photovoltaic sources mounted to the surface of the thin, flexible member, along with an IR detector module and photoresistor.

Figure 8F:
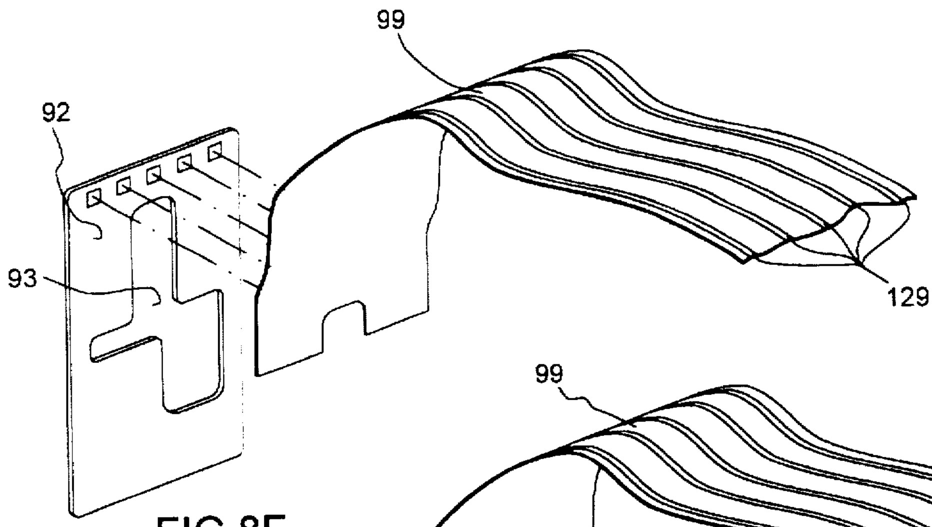
Figure 8E:
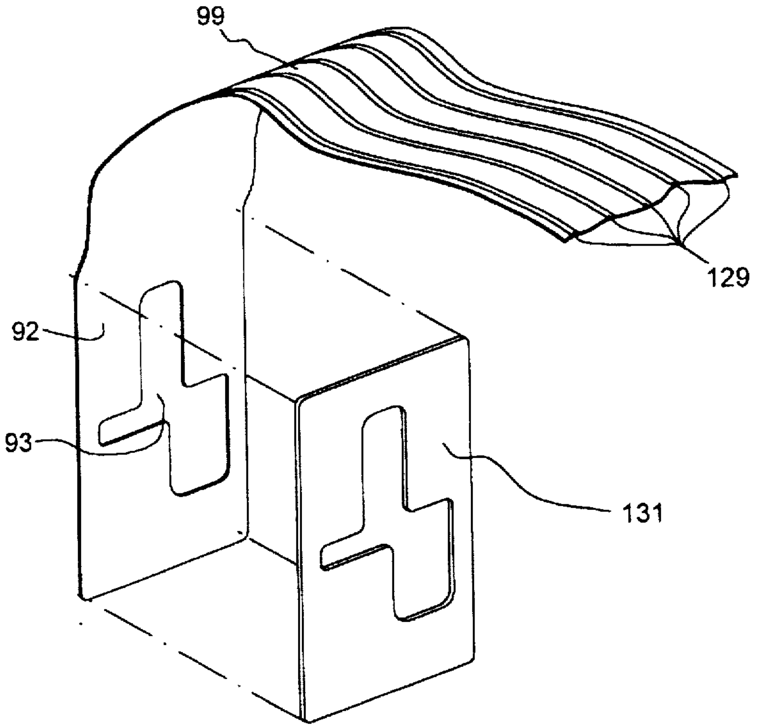
Figure 8G:
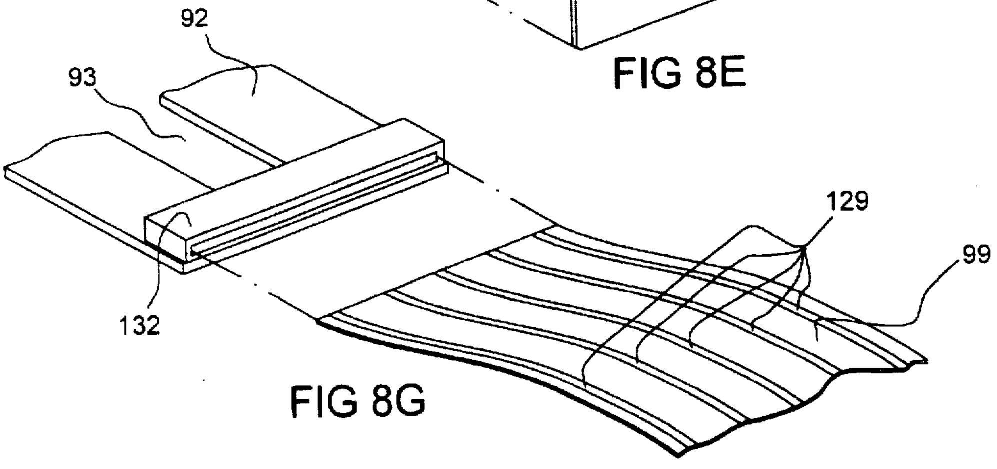

FIGS. 8E to 8G show isometric views of alternative approaches for electrically connecting the flexible support member and photovoltaic source with a circuit board. FIG. 8E shows the flexible member and circuit board as two separate units, attached via solder or conductive adhesive. FIG. 8F shows the flexible support member and circuit board fabricated as a single unit, with a separate stiffening member underneath the circuit board. FIG. 8G shows the use of a ribbon connector mounted on the circuit board.

Figure 8H:
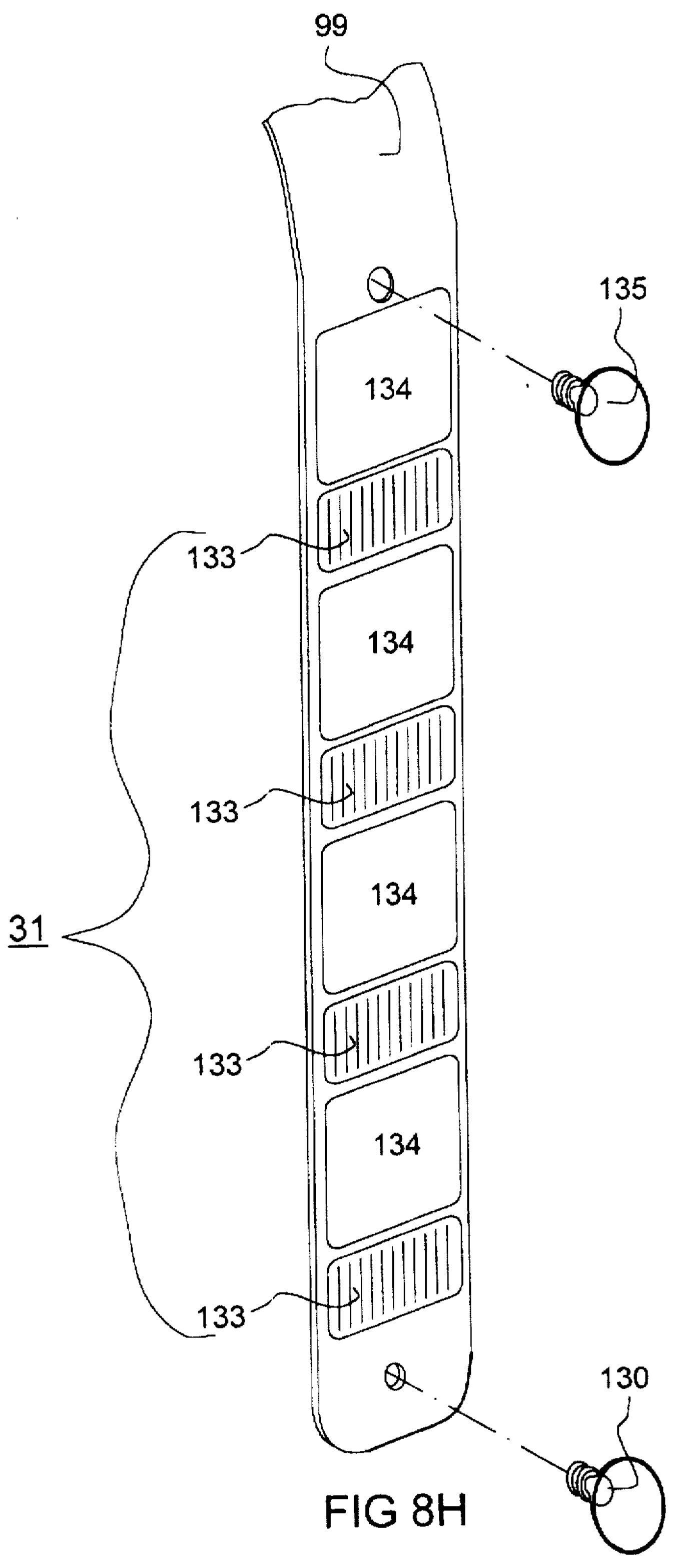
Figure 8I:
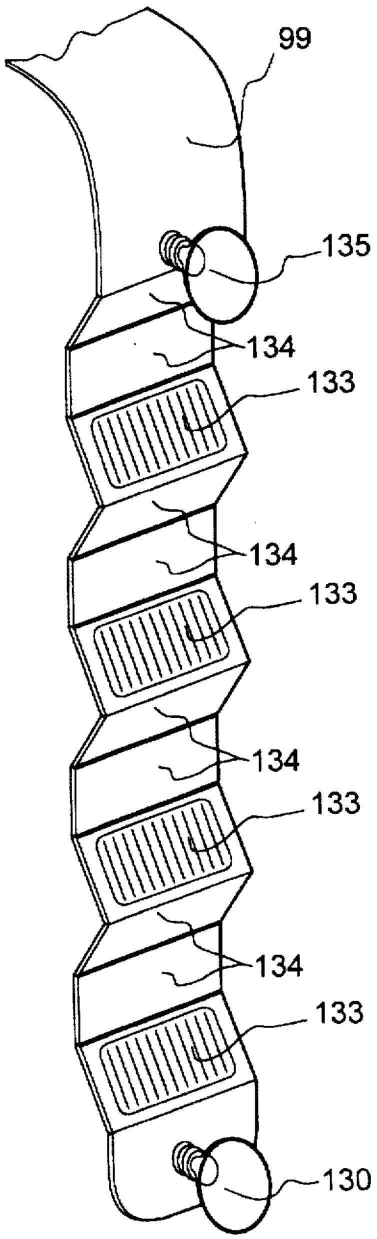
Figure 8J:
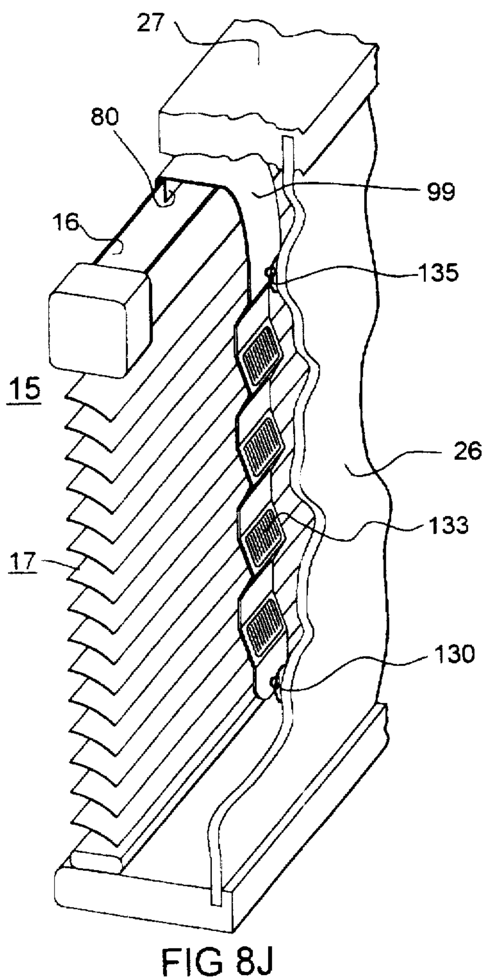
Figure 8K:
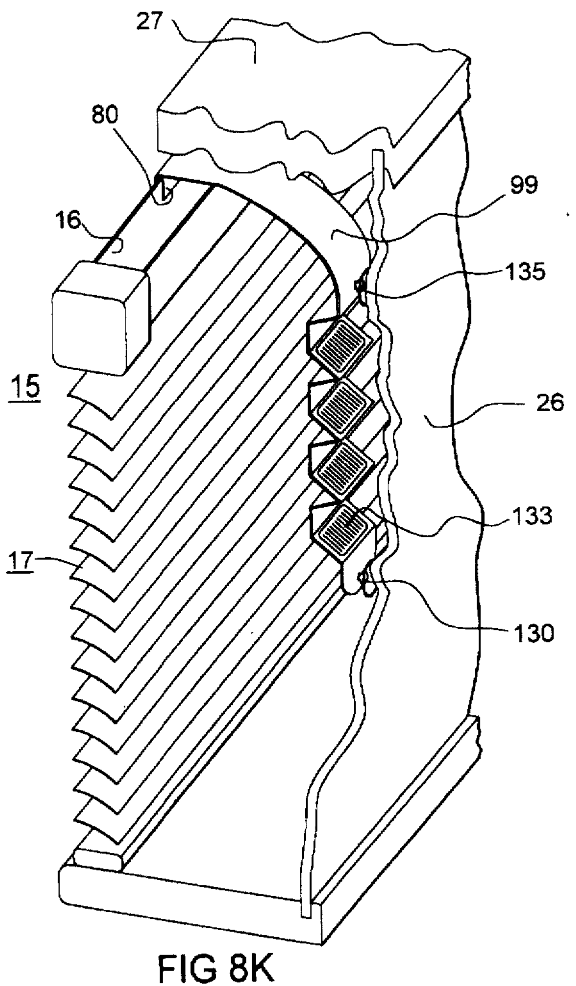

FIGS. 8H to 8K show an alternative embodiment of the flexible support member and photovoltaic source, which places the photovoltaic source in a flexible, folded configuration, and which includes reflective patches and a second suction cup. FIGS. 8H and 8I show the embodiment in the straight and folded configurations, respectively. FIGS. 8J and 8K show the embodiment in conjunction with conventional venetian blinds. FIG. 8J shows the embodiment in conjunction with a venetian blind which is mounted with a short distance between the louvers and the window glazing. However, FIG. 8K shows the embodiment in conjunction with a venetian blind which is mounted with a large distance between the louvers and the window glazing.

FIGS. 9A to 9F: Software

Figure 9A:
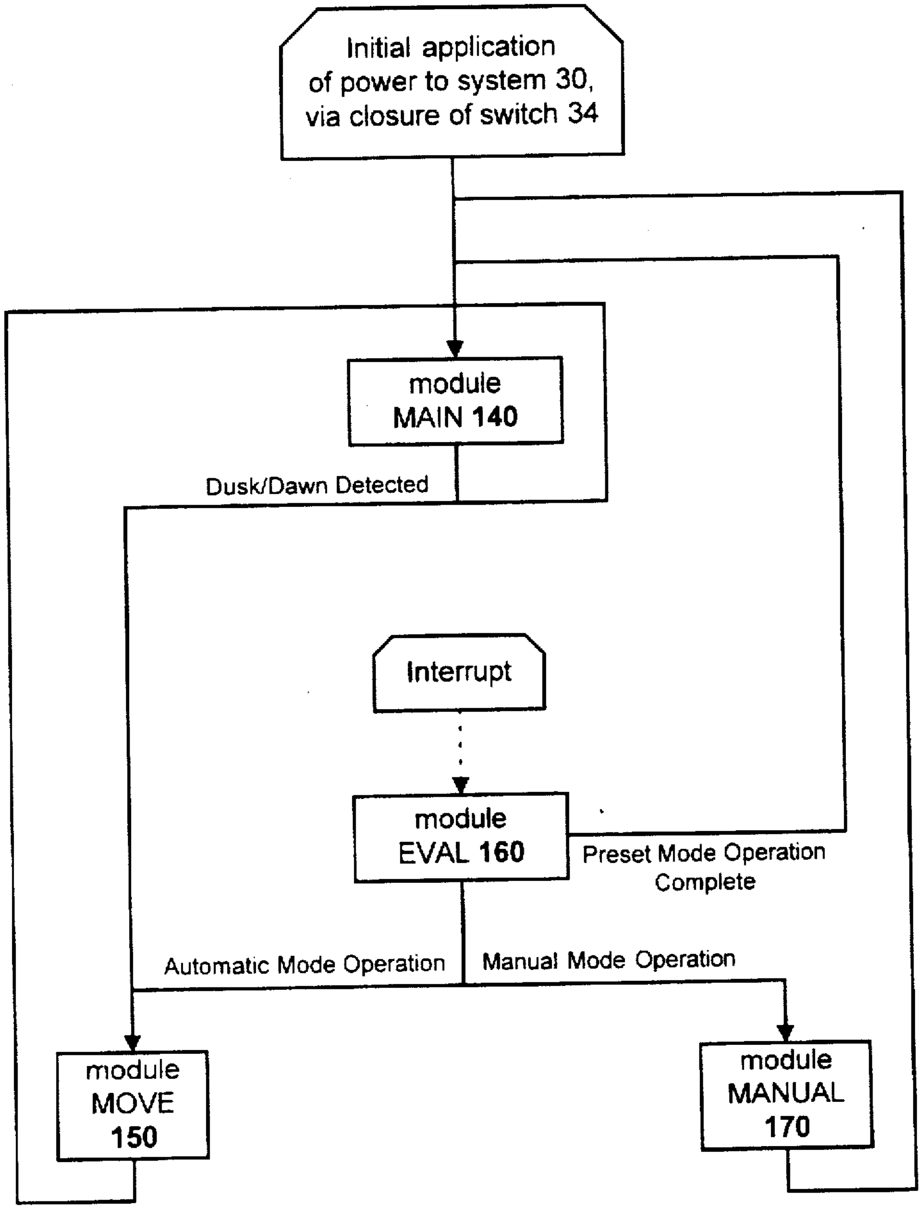
Figure 9B:
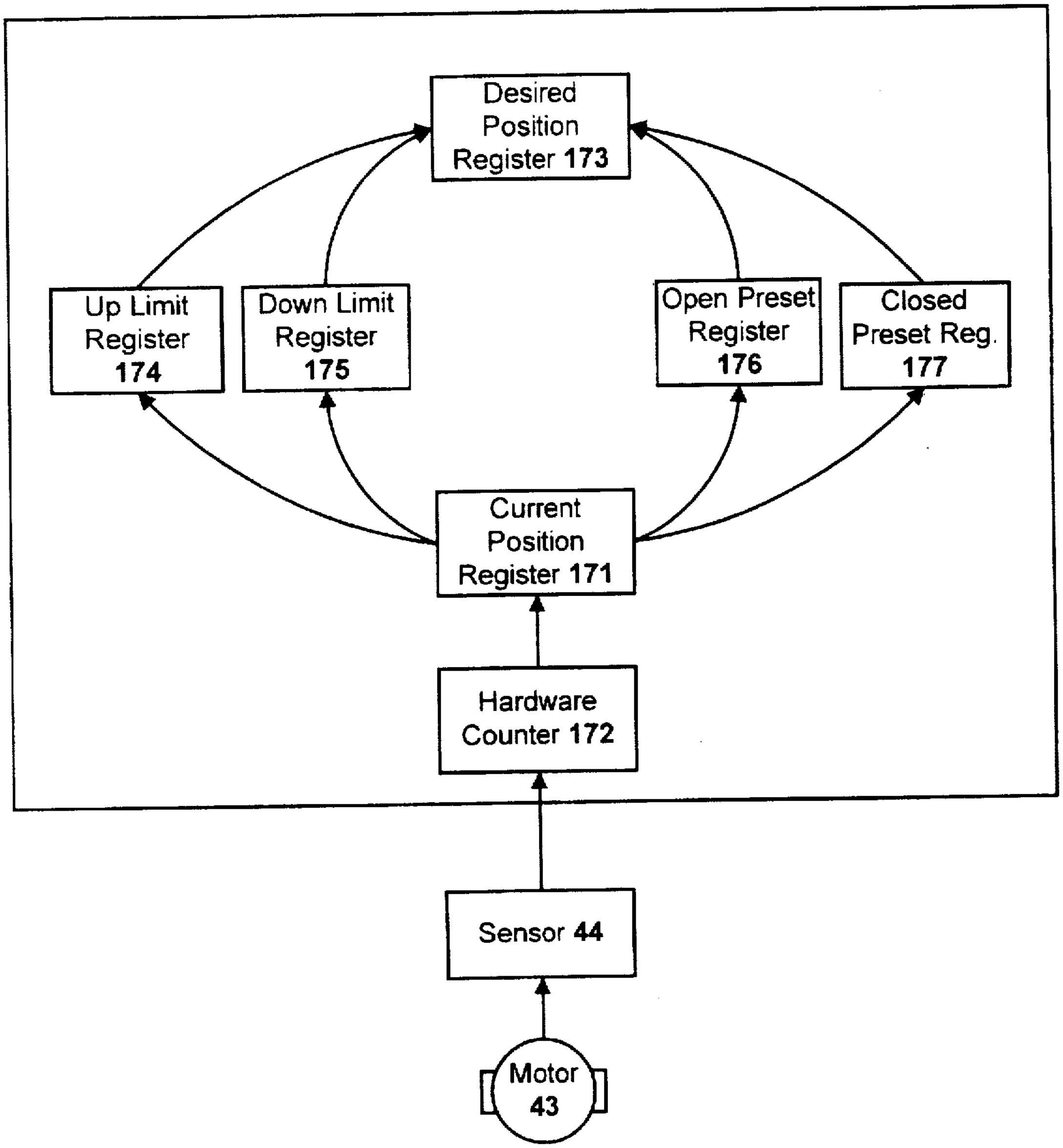

FIGS. 9A to 9F show aspects of the software operation of a preferred embodiment of my venetian blind controller. FIG. 9A is a flow diagram showing the relationship between the modules composing the software, FIG. 9B is a pictorial representation of key memory registers addressed in the software operation, and FIGS. 9C to 9F are software flowcharts.

Figure 10A:
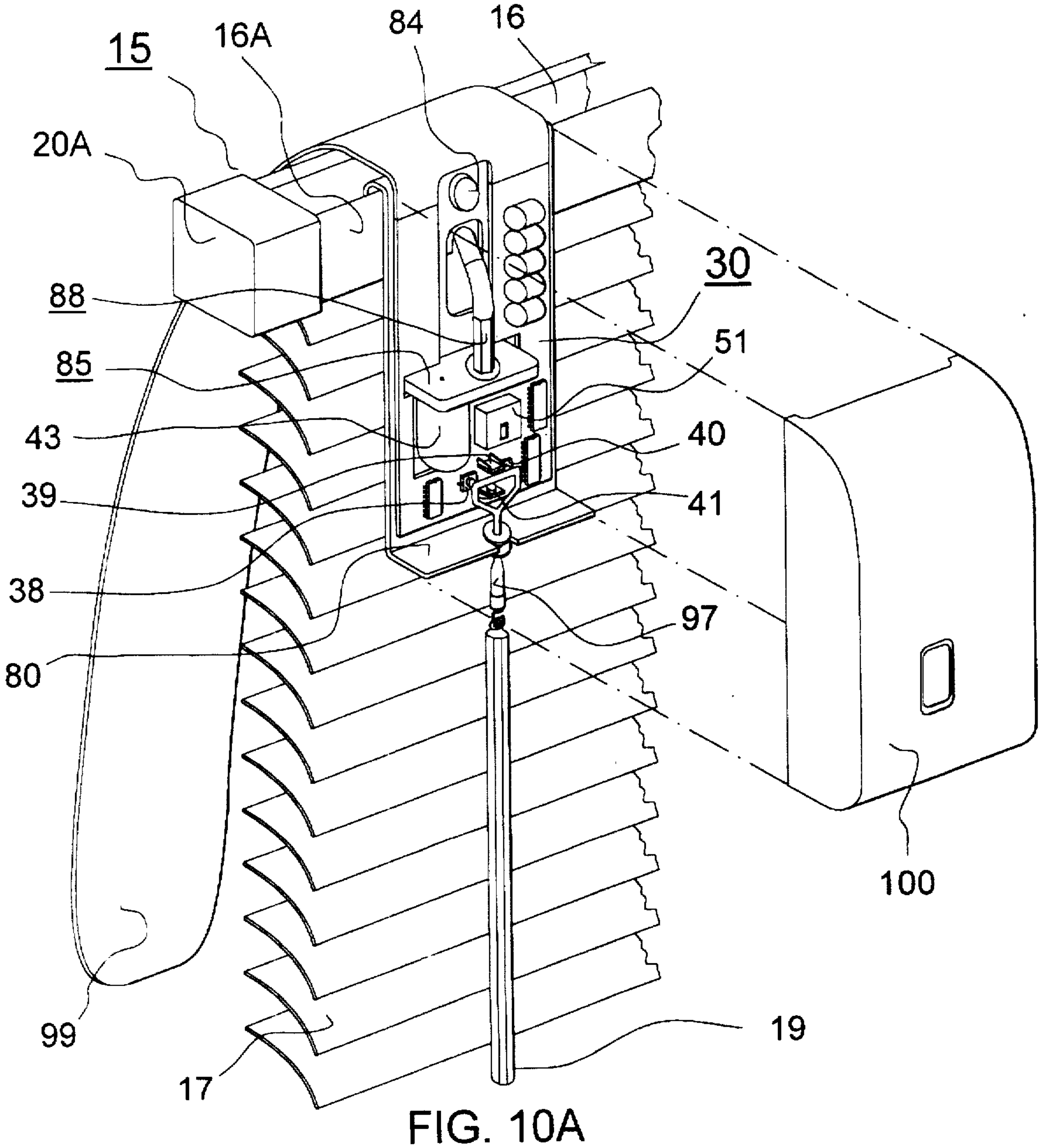
Figure 10B:
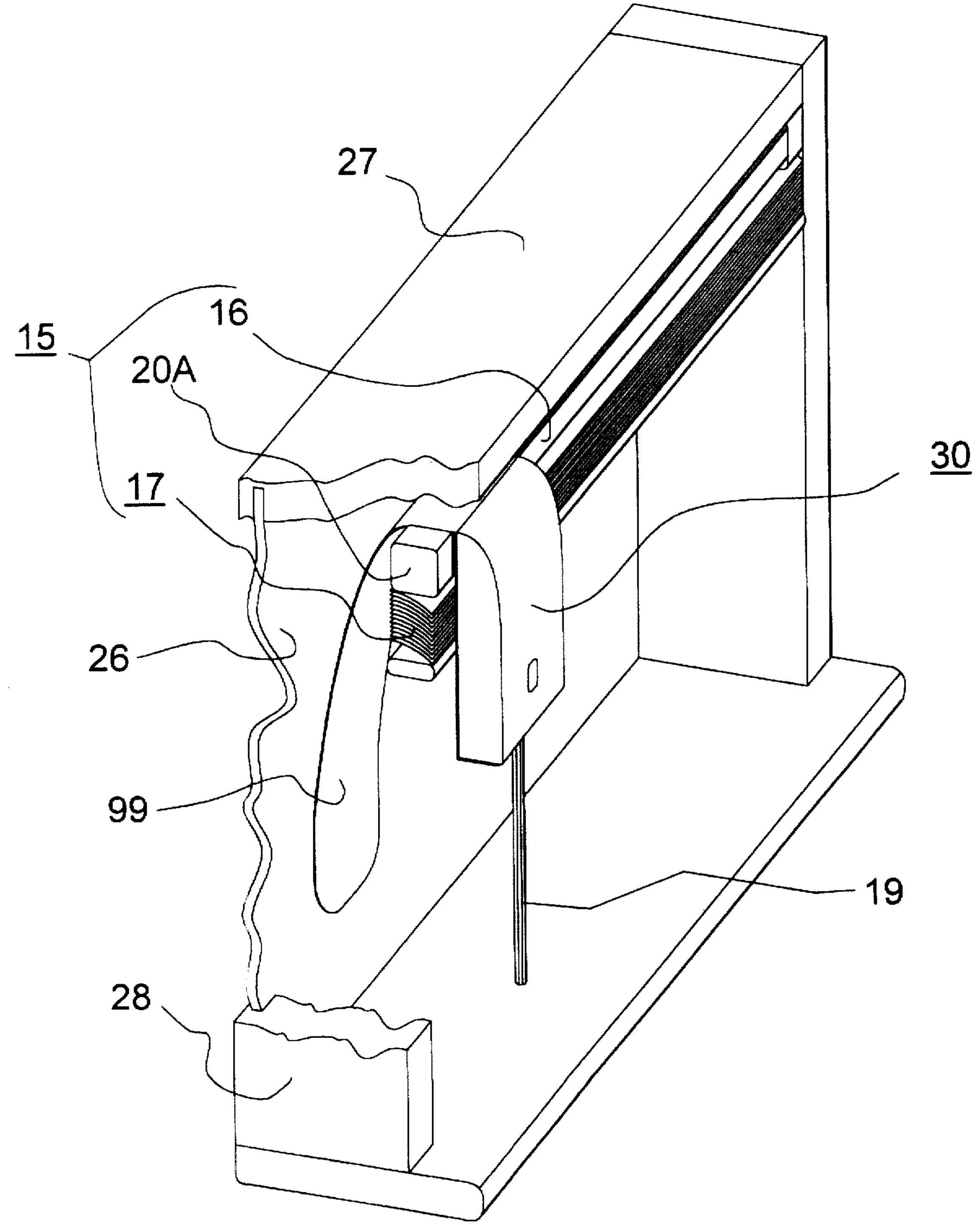

FIGS. 10A and 10B: Installation and Operation

FIGS. 10A and 10B show isometric views of a preferred embodiment of my automatic venetian blind controller mounted on a conventional venetian blind. FIG. 10A shows a substantially front view of the controller, with cover removed, while FIG. 10B shows a substantially side view with cover attached.

Figure 11A:
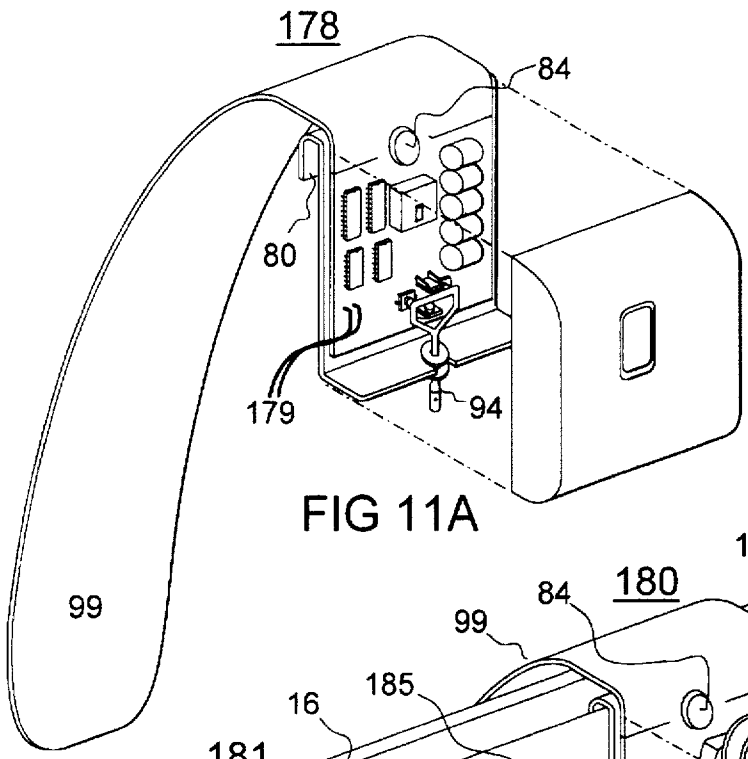
Figure 11C:
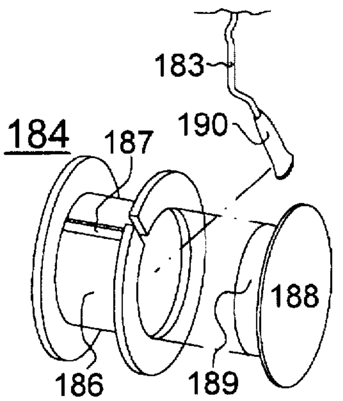
Figure 11B:
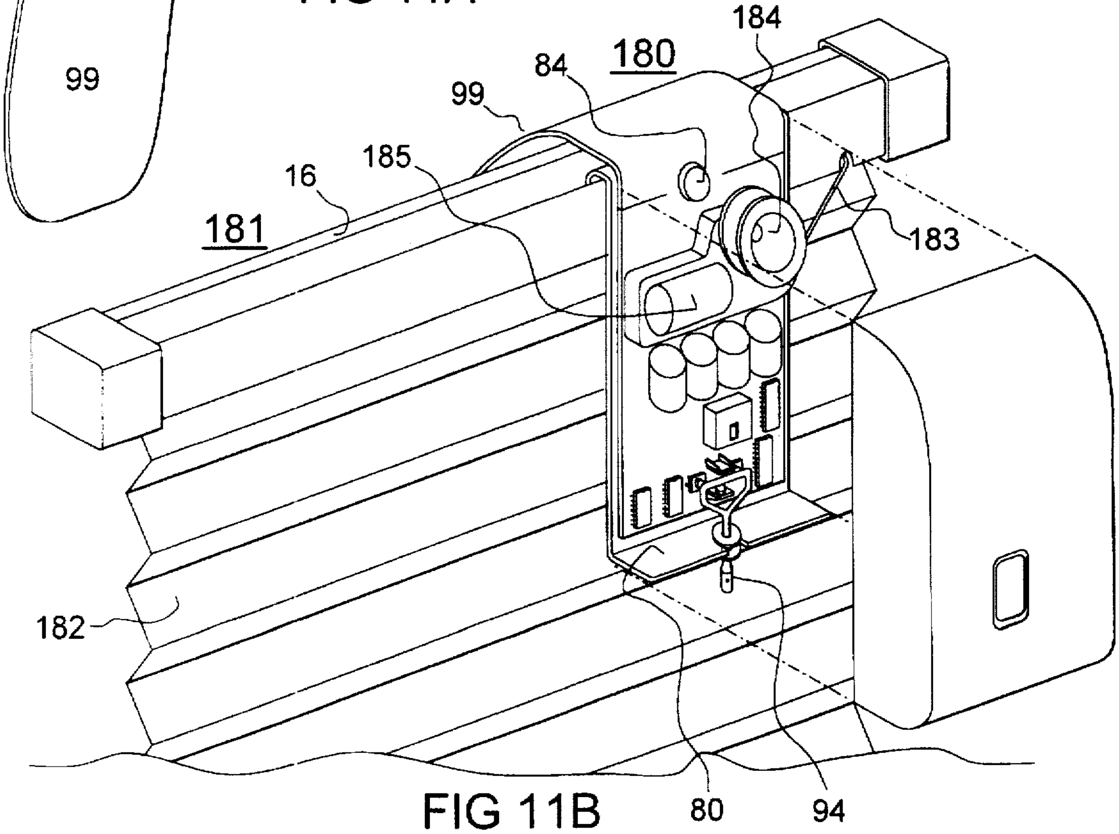

FIGS. 11A to 11C: Alternative Embodiments

FIGS. 11A to 11C show some alternative useful embodiments of my invention. FIG. 11A shows a solar-powered, automatic controller for commercially available motorized venetian blinds, while FIGS. 11B and 11C solar-powered, automatic controller for pleated shades.

LIST OF REFERENCE NUMERALS

| | | | |
|---|---|---|---|
| 15 | conventional venetian blind | 29 | sill |
| 16 | headrail | 30 | system |
| 16A | front wall of headrail | 31 | photovoltaic source |
| 17 | louvers | 32 | blocking diode |
| 18 | tilt-adjustment shaft | 33 | secondary battery |
| 19 | control wand | 34 | single-pole, single-throw switch |
| 20A, B | hanger | 35 | microcontroller |
| 21 | metal clip | 36 | photosensor |
| 22 | retaining sleeve | 37 | IR receiver |
| 23 | hole | 38 | momentary-contact switch |
| 24 | small venetian blind | 39 | momentary-contact switch |
| 25 | large venetian biind | 40 | momentary-contact switch |
| 26 | glazing | 41 | momentary-contact switch |
| 27 | head jamb | 42 | motor-control bridge |
| 28 | side jamb | 43 | motor |
| 44 | sensor | 74 | diode |
| 45 | buzzer | 75 | monolithic IC |
| 46 | photoresistor | 76 | second photosensor |
| 47 | capacitor | 77 | second IR Detector |
| 48 | programmable I/O line | 78 | IR transmitter |
| 49 | capacitor | 79 | Switch array |
| 50 | resistor | 80 | bracket |
| 51 | IR detector | 81 | threaded hole |
| 52 | Decoder IC | 82 | cut-out |
| 53 | Discrete input | 83 | first notch |
| 54 | Input port | 84 | thumbscrew |
| 55 | discrete output | 85 | gearmotor |
| 56 | transistor | 86 | output sleeve |
| 57 to 63 | software step | 87A, B | rubber rivet |
| 65 | current-sensing resistor | 88 | drive shaft |
| 66 | coupling capacitor | 89 | base shaft |
| 67 | feedback resistor | 90 | flexible coupling |
| 68 | amplifier | 91 | coupling tube |
| 69 | amplifier | 92 | circuit board |
| 70 | input | 93 | board cut-out |
| 71 | flip-flop | 94 | actuating body |
| 72 | one-shot | 95 | yoke |
| 73 | diode | 96 | rod |
| 97 | stem | 120A, B | side plate |
| 98 | bushing | 121A, B | guide pin |
| 99 | support member | 122A, B | vertical leg |
| 100 | cover | 123 | horizontal leg |
| 101 | window | 124 | vertical hole |
| 102 | 90-degree bend | 125 | horizontal hole |
| 103 | J-shaped lip | 126 | retaining sleeve |
| 104 | second notch | 127 | metal clip |
| 105 | groove | 128 | metal strip |
| 106 | hole | 129 | conductors |
| 107 | first adapter | 130 | suction cup |
| 108 | second adapter | 131 | stiffening support |
| 109A, B | slot | 132 | ribbon connector |
| 110 | D-clip | 133 | photovoltaic region |
| 111 | pin | 134 | reflective patch |
| 112 | strip | 135 | second suction cup |
| 113 | second flexible coupling | 140 | module MAIN |
| 114 | hexagonal tube | 140A to D | software step |
| 115 | input tube | 150 | module MOVE |
| 116 | third adapter | 150A to E | software step |
| 117 | output shaft | 160 | module EVAL |
| 118A, B | flange | 160A to K | software step |

-continued

LIST OF REFERENCE NUMERALS

| | | | |
|---|---|---|---|
| 119A, B | locating slot | 170 | module MANUAL |
| 170A to D | software step | 180 | pleated-shade controller |
| 171 | current position register | 181 | pleated shade |
| 172 | hardware counter | 182 | shading material |
| 173 | desired position register | 183 | lift cord |
| 174 | up limit register | 184 | drive spool |
| 175 | down limit register | 185 | gearmotor |
| 176 | open preset register | 186 | spool tube |
| 177 | closed preset register | 187 | cord slot |
| 178 | controller | 188 | spool cover |
| 179 | wires | 189 | covertube |
| | | 190 | handle |

DESCRIPTION OF PREFERRED EMBODIMENT

Prior-Art Venetian Blinds

Since the present invention is to be used in conjunction with standard venetian blinds, salient features of prior-art venetian blinds are first shown in FIGS. 1A to 1G.

Figure 1A:
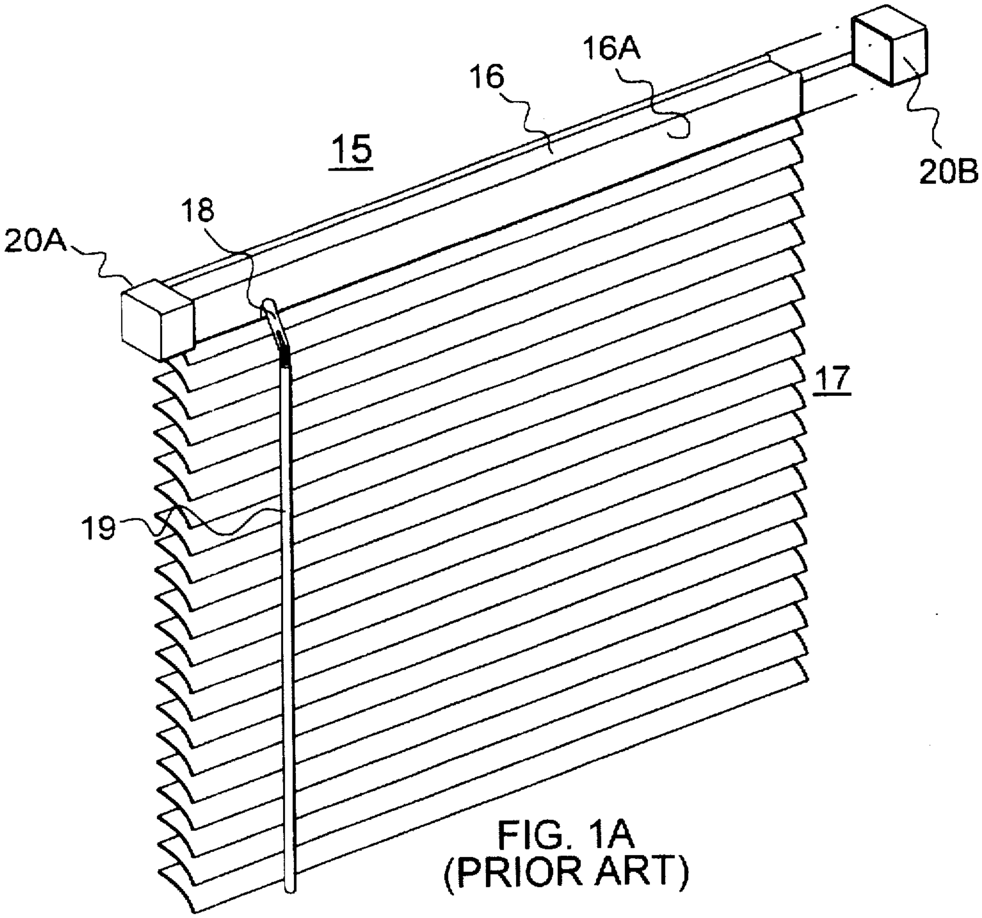
FIG. 1A (PRIOR ART)
FIGS. 1A to 1D show various details of a prior-art conventional venetian blind.

General Arrangement—FIG. 1A

As shown in FIG. 1A, a conventional horizontal venetian blind 15 has a headrail 16, from which louvers 17 are suspended by means of ladder tapes (not shown). Headrail 16 is in the general shape of a rectangular box, open on top, having a front wall 16A, a back wall, a bottom wall, and two side walls. Headrail 16 is generally of steel or plastic, while louvers 17 are generally of aluminum, wood, or vinyl. The amount of light passing through blind 15 can be adjusted by varying the inclination, or tilt, of the short axes of louvers 17. This is done by rotating a tilt-adjustment shaft 18, which extends from headrail 16. A control wand 19, demountably attached to tilt-adjustment shaft 18, allows the louver tilt to be conveniently adjusted by hand even when headrail 16 is mounted above arm's reach. Wand 19 is typically of plastic, with circular or polygonal cross-section. Headrail 16 is supported at each end by a hanger 20A and a hanger 20B; these hangers, in turn, are screwed into the wall or window frame (not shown).

Figure 1B:
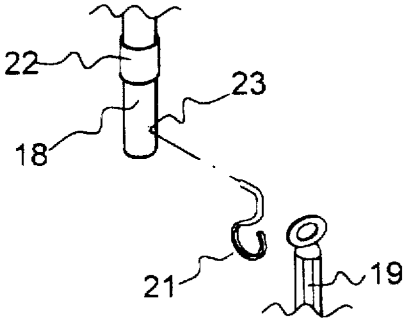
FIG. 1B (PRIOR ART)
Figure 1C:
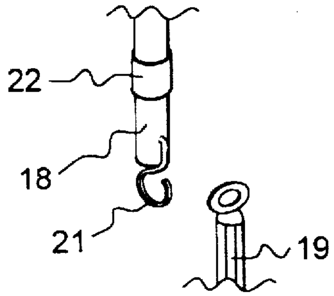
FIG. 1C (PRIOR ART)
Figure 1D:
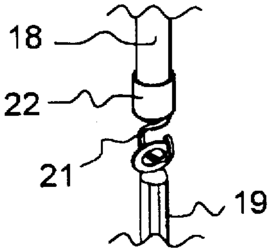
FIG. 1D (PRIOR ART)

Wand-to-Shaft Coupling—FIGS. 1B to 1D

Many methods are used to attach wand 19 to shaft 18. One such method is shown in FIGS. 1B to 1D. This method includes a metal clip 21 and a retaining sleeve 22. Clip 21 has an approximately ninety-degree bend at its upper end, and a ring-shaped bend at its lower end. Sleeve 22, typically of vinyl or plastic, has an inside diameter which slightly larger than the outside diameter of shaft 18, so that sleeve 22 has a loose fit on shaft 18 and can be moved along shaft 18 by hand. Shaft 18 is pierced by a hole 23. Wand 19 has a ring-shaped structure at its upper end. As shown in FIG. 1C, attachment of wand 19 to shaft 18 begins with placement of sleeve 22 on shaft 18, so that the bottom of sleeve 22 is above hole 23. Then the end of the ninety-degree bend at the top of clip 21 is inserted into hole 23. Then, as shown in FIG. 1D, sleeve 22 is pushed down over hole 23, securing clip 21, and the ring-like structure at the top of wand 19 is placed over the ring-shaped bend at the bottom of clip 21, so that wand 19 hangs from clip 21. Other methods are also used to attach wand 19 to shaft 18, but the bulk of extant methods include a hole in shaft 18 and a ring-like structure at the top of wand 19.

Figure 1E:
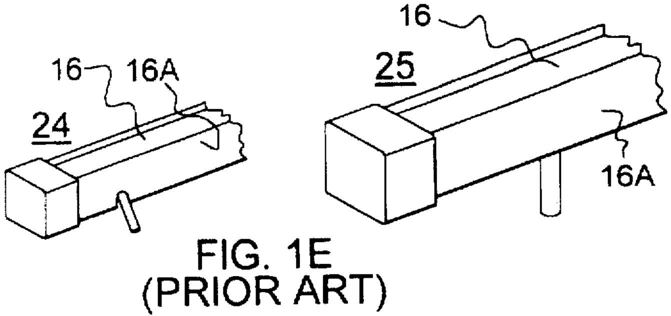
FIG. 1E (PRIOR ART)
FIG. 1E shows two prior-art conventional venetian blinds, one small and one large.

Variation in Headrail Size Among Extant Blinds—FIG. 1E

There is considerable variation in the dimensions of the cross-section of headrail 16, and in the length, diameter, and orientation of tilt-adjustment shaft 18, among extant venetian blinds. The possible range of this variation is illustrated in FIG. 1E, which shows a commercially available small venetian blind 24, often referred to as a microblind, and also a commercially available large blind 25. Small blind 24 and large blind 25 are shown at the same scale. It is evident that the cross-sectional area of headrail 16 (taken in a plane perpendicular to the long dimension of headrail 16) differs substantially in blinds 24 and 25; among available blinds, this area varies by more than a factor of four. In blind 24, tilt-adjustment shaft 18 is relatively short, and extends from front wall 16A of headrail 16; however, in blind 25, shaft 18 is relatively long, and extends from the bottom of headrail 16. The variation in size of headrail 16, and in the size and orientation of shaft 18, is an important consideration in the design of the present invention. Another important variable, not shown in FIG. 1E, is the location of shaft 18. In most extant blinds, shaft 18 is located on the left-hand side (when viewing the room-facing side of the blind); in some blinds, however, shaft 18 is located on the right-hand side.

Figure 1F:
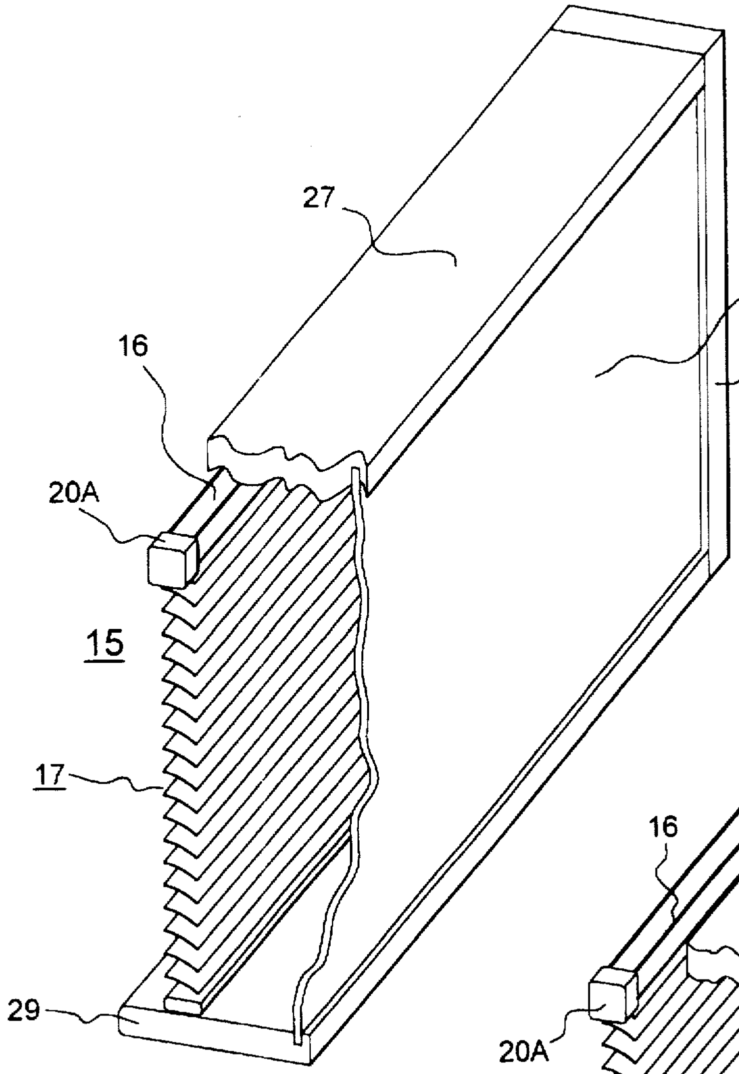
FIG. 1F (PRIOR ART)
FIGS. 1F and 1G show two typical mounting arrangements for prior-art conventional venetian blinds.
Figure 1G:
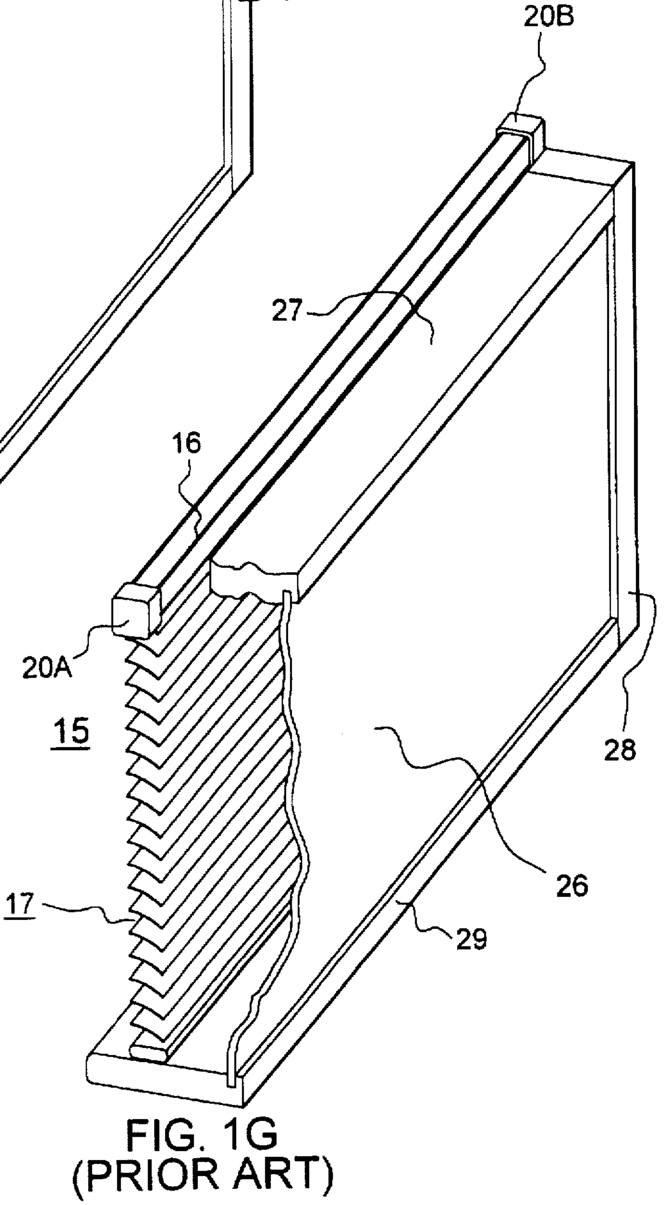
FIG. 1G (PRIOR ART)

Variation in Mounting Arrangement of Extant Blinds—FIGS. 1F and 1G

In addition to the aforementioned variations in the design of extant venetian blinds, there is considerable variation in the mounting arrangement of venetian blinds. FIGS. 1F and 1G show two typical mounting arrangements in which blind 15 is mounted in proximity to a glazing 26 of a host window. Glazing 26 is disposed within a window frame which includes a head jamb 27, a side jamb 28, and a sill 29. A sash assembly (not shown) may also be included, but is not germane to the structure or operation of the subject invention and is therefore omitted from the subsequent discussion. In FIG. 1F, hanger 20A and hanger 20B (not shown) are mounted to the undersurface of head jamb 27, so that headrail 16 is effectively suspended from head jamb 27. This is often referred to as "inside mounting" or "recessed mounting". In FIG. 1G, hangers 20A and 20B are mounted to the wall (not shown) above head jamb 27, so that headrail 16 is also located above head jamb 27. This is often referred to as "outside mounting".

Another significant variable among extant venetian blind installations is the distance between glazing 26 and the plane containing louvers 17. This distance depends on two factors. First, it varies with the venetian blind mounting arrangement, being larger with outside mounting than with inside mounting. This variation due to mounting arrangement ranges from approximately 2 cm to approximately 7 cm, and is largely determined by the dimensions of headrail 16. Second, the distance between glazing 26 and louvers 17 also varies with the depth of the window frame (i.e., the distance between glazing 26 and the distal edge of head jamb 27). This factor typically accounts for a much larger variation than the blind mounting arrangement, with window frame depths ranging from approximately 2 cm to 15 cm or more. Thus, while FIG. 1F shows an inside mounting arrangement and FIG. 1G shows an outside mounting arrangement, the distance shown between glazing 26 and louvers 17 is greater in FIG. 1F than in FIG. 1G, due to the greater depth of the window frame shown in FIG. 1F. This variation in distance between glazing 26 and louvers 17 is a significant consideration in the design of the subject invention.

Electrical Configuration of Subject Invention

The present invention includes both electrical and mechanical aspects. While many of the electrical aspects will be familiar to those skilled in the art, a description of these aspects will be of considerable help in understanding the overall essence of the invention. Moreover, certain electrical considerations are critical to realizing the full potential of my invention. Therefore, salient electrical aspects are shown in FIGS. 2A to 2L, and special electrical considerations in the realization of my invention are discussed presently.

Basic Block Diagram

GENERAL CONFIGURATION—FIG. 2A

FIG. 2A shows a schematic diagram of a basic version of a solar-powered, wireless, automatic, venetian blind control system 30 according to the subject invention. Practitioners in the art will recognize the electrical configuration of system 30 as essentially that of a conventional microcontroller-based digital servo-positioning system, with control by means of momentary-contact switches and Infra-Red (IR) signals, and powered by a solar-charged battery. These elements are well-known in the art and used in a variety of commercially available products. For example, microcontroller-based digital servo-positioning systems with momentary-contact switch inputs are used in many of the programmable power seats and mirrors found in luxury automobiles. Solar-charged batteries are used in satellites, highway emergency call-boxes, and outdoor residential lighting products. IR remote control is used in a wide variety of consumer electronic appliances. Therefore, many aspects of FIG. 2A will be familiar to those knowledgeable in the art, and these aspects will be only briefly described. However, aspects of FIG. 2A which are unique to the subject invention will be described in detail.

PV SOURCE 31, DIODE 32, AND BATTERY 33—FIG. 2A

In FIG. 2A, a PhotoVoltaic (PV) source 31 is connected to a secondary battery 33 via a blocking diode 32. The combination of PV source 31, battery 33, and diode 32 constitutes a conventional solar-charged battery power supply. This configuration is currently used in a variety of applications, and is extensively described in the literature. In the preferred embodiment, battery 33 is a Nickel-Cadmium type comprising four series-connected cells of 110 milliamp-hours capacity. PV source 31 is a silicon type with an open-circuit voltage of approximately 14 volts, and a short-circuit current of approximately 45 milliamps, under full-sun conditions. However, many other advantageous embodiments and sizes of source 31 and battery 33 are possible. These, as well as other unique considerations in the design of source 31 and battery 33, will be discussed in detail subsequently.

MICROCONTROLLER 35—FIG. 2A

Battery 33 supplies current via a single-pole, single throw switch 34 to a microcontroller 35 of conventional design. For most embodiments of system 30, microcontroller 35 need provide only modest computational performance or throughput. However, microcontroller 35 should preferably be a low-power type, with maximum average current consumption of less than 100 microamps. With currently-available low-power microcontrollers, this can be achieved with continuous operation at a relatively low clock speed, such as 32 kiloherz, or intermittent operation at a higher clock speed. The former approach is used in the preferred embodiment. If the latter approach is taken, then microcontroller 35 should be capable of fully static operation, or should have a low-power standby mode with a current consumption of a few microamps or less. In addition, microcontroller 35 should preferably include at least 256 bytes of on-chip program memory, at least 256 bytes of on-chip data storage, an integral real-time clock-counter, and at least 8 Input-Output (I/O) pins. Other features, such as an integral Analog-to-Digital (A/D) converter and a serial I/O port, are less important but will prove advantageous in some applications, if cost permits. Many suitable devices are currently available. In general, these requirements are not critical, and it is expected that, for most embodiments of system 30, the selection of microcontroller 35 will be made primarily on the basis of cost. In the preferred embodiment, microcontroller 35 is the PIC16C54 manufactured by Microchip Technology, Inc.

PHOTOSENSOR 36—FIG. 2A

As shown in FIG. 2A, one input of microcontroller 35 is connected to a photosensor 36. Photosensor 36 is a conventional sensor capable of generating electrical signals, in response to the degree of ambient illumination, which can be sensed by microcontroller 35 to register the presence of dawn (the transition from night-time to day-time) and dusk (the transition from day-time to night-time). Such photosensors are used in a variety of commercial applications, such as automatic street lamps, and many techniques are known in the art for the use of such sensors in conjunction with microcontrollers. Preferably, photosensor 36 should have a high degree of repeatability, so that its output varies primarily as a function of the degree of illumination (and not of time, temperature, or other incidental variables). Another key aspect of photosensor 36 is the wavelength of peak response; for most embodiments of system 30, the peak optical response should be within the visible light spectrum. However, other applications (notably those which stress energy savings) may be best served by a peak response in the near-infrared region. Preferably, the combination of photosensor 36 and microcontroller 35 will include a means for adjusting the thresholds of illumination corresponding to the registered states of dawn and dusk. Also preferable is a time-constant of at least several seconds, and as long as several tens of minutes, in the response of the combination of photosensor 36 and microcontroller 35. Such a time-constant will reduce the frequency of errors due to short-term illumination events, such as lightning. These requirements can be met with a variety of techniques known in the art. Preferred and alternative embodiments of photosensor 36 will be described subsequently.

IR RECEIVER 37—FIG. 2A

An input port of microcontroller 35 is connected to an InfraRed (IR) receiver 37. IR receiver 37 is a conventional receiver capable of generating electrical signals, in response to standard IR remote-control signals of the type used in many electronic appliances, which can be registered by microcontroller 35. Many techniques for implementing such IR receivers are known in the art. In the preferred embodiment, IR receiver 37 includes a commercially available IR detector module and a commercially available integrated circuit for decoding IR signal transmissions. This, as well as alternative embodiments, are described in detail subsequently.

SWITCHES 38 TO 41—FIG. 2A

Four inputs of microcontroller 35 are connected to an array of four momentary-contact, single-pole switches 38 to 41. Switches 38 to 41 operate in the conventional manner, so that closure of any of switches 38 to 41 cause the corresponding input of microcontroller 35 to be pulled high, while in the absence of such closures, conventional pull-down resistors (not shown) pull all inputs low.

CONTROL BRIDGE 42 AND MOTOR 43—FIG. 2A

Two outputs of microcontroller 35 are connected to a motor control bridge 42 of conventional design. Bridge 42 drives a Permanent Magnet (PM) Direct Current (DC) motor 43, also of conventional design. Bridge 42 consists of switching elements to apply power to motor 43 to cause it to operate, in either direction, in response to logic signals from microcontroller 35. In most embodiments of system 30, bridge 42 will be capable of output currents of 200 mA continuous and 1A peak, with less than 10 mA control current. These requirements are common to many applications, so many advantageous implementations of bridge 42 are known in the art. One such implementation is the so-called H-bridge configuration, which consists essentially of two complementary-symmetry transistor pairs with optional drive logic. In the preferred embodiment, bridge 42 is one of the many commercially available monolithic H-bridge integrated circuits, such as the UDN-2952B Full-Bridge Motor Driver manufactured by Sprague Corp. Alternatively, bridge 42 could be combined with microcontroller 35 in a single integrated circuit. Several manufacturers are currently in the process of introducing such devices.

In the preferred embodiment, motor 43 is a brush-commutated device with a size and operating characteristic similar to that of the motors in the Radio-Control (RC) servos used by model aircraft hobbyists. However, larger or smaller motors could also be used, as is subsequently discussed. Other types of motors, such as stepping motors and brushless DC motors, could also be used, but will be prohibitively expensive in typical applications of system 30.

SENSOR 44—FIG. 2A

Motor 43 is coupled to an angular motion sensor 44 of conventional design. Sensor 44 can be any of several sensors known in the art which is capable of producing a signal related to the rotation of the output shaft of motor 43, such that the angular displacement of the output shaft can be registered by microcontroller 35. Many different types of rate and displacement sensors are available, and techniques for the use of such sensors with microcontrollers to register motor shaft displacement are extensively described in the literature. Two such sensors are the widely-used incremental and absolute optical encoders. However, the requirements of sensor 44 differ from those of the sensors used in conventional digital servo-positioning applications. Conventional applications typically require sensors with high accuracy and repeatability, with cost as a secondary consideration. In most embodiments of system 30, however, sensor 44 will be selected primarily on the basis of cost, while instantaneous accuracy and repeatability are less important. A preferred embodiment of sensor 44 will be described subsequently.

PIEZOELECTRIC BUZZER 45—FIG. 2A

One or more outputs of microcontroller 35 drive a piezoelectric buzzer 45 of conventional design. Such buzzers are used extensively in commercial products, and their use in conjunction with microcontrollers is well-known in the art.

Selection of Battery 33

SIZING—FIG. 2A

In most embodiments of system 30, battery 33 will account for a substantial portion of the overall size and cost of system 30. Therefore, it is desirable to minimize the size and cost of battery 33. For a given battery type, the size and cost of battery 33 will depend primarily on its energy capacity. In general, there will be two constraints on the minimum required capacity of battery 33. First, battery 33 should have sufficient capacity to power system 30 over the maximum expected interval between charging cycles. Second, since the operating life of secondary batteries (as measured in terms of the number of charge-discharge cycles) varies inversely with the depth of discharge, the battery must have sufficient capacity to appropriately limit the depth of discharge over the average expected interval between charging cycles. Since solar illumination constitutes the sole source of charging current for battery 33 (via PV source 31), the average expected interval between charging cycles is approximately one day. However, due to the possibility of consecutive cloudy days, the maximum expected interval between charging cycles will be much longer, and will vary with the prevailing climate. Either the single-day depth-of-discharge constraint, or the consecutive-cloudy-day constraint, can drive the minimum required capacity of battery 33, depending on the battery type, the desired operating life, and the prevailing climate. In most cases, it is expected that the maximum expected number of cloudy days will be the driving constraint. For most climates in the US, it is expected that a design interval of six days will be sufficient to limit the probability of battery depletion to acceptable levels. Therefore, battery 33 should typically have sufficient capacity to power system 30 over an interval of six days.

For practical embodiments of system 30, the minimum feasible average power consumption will typically range between 0.5 and 5.0 milliwatts. Therefore, system 30 will consume between 72 and 720 milliwatt-hours over six days. In the preferred embodiment, average power consumption is approximately 2.5 milliwatts, resulting in a six-day consumption of 360 milliwatt-hours. However, most commercially available secondary batteries have a capacity greater than 360 milliwatt-hours. Therefore, as a practical matter, battery 33 may have a somewhat higher capacity than suggested by the six-day criterion. In the preferred embodiment, battery 33 has a capacity of 530 milliwatt-hours.

CHEMISTRY—FIG. 2A

The choice of type or chemistry of battery 33 can be made in the conventional manner, with consideration given to factors such as commercial availability, cost, energy density, and operating lifetime in the solar-charging mode. While lead-acid batteries offer good performance and operating life in solar-charged applications, they are typically available only with much larger capacity than necessary for system 30. Therefore, to minimize size and cost of system 30, it is expected that battery 33 will most frequently be another type of secondary battery, such as nickel-cadmium, nickel-metal-hydride, or lithium-ion. In the preferred embodiment, battery 33 comprises four series-connected, 110 milliamp-hour, nickel-cadmium cells. This configuration is similar to those used to power the receivers in Radio-Controlled (RC) model aircraft. This type of battery is relatively inexpensive and readily available. Other newer types, particularly some of the lithium-based chemistries, have significant advantages over lead-acid and nickel-cadmium types in energy density and lifetime, and represent a reduced environmental threat after disposal. Currently, however, their costs are much higher than those of nickel-cadmium types, and their availability is limited. In the future, these types will probably prove more advantageous as they become more widely-used and costs decline.

Selection of PV Source 31—FIG. 2A

PV source 31 is the source of charging current for battery 33. In accordance with conventional practice in the design of solar-charged batteries, the required power output of source 31 will depend primarily on the capacity of battery 33, the power consumption of system 30, and the expected duration of insolation. A brief example of conventional practice in determining the required PV source power for solar-charged battery applications is given by Michael A. Argo in "Improving Solar-Powered SCADA Performance", *World Oil*, October 1994, Vol. 215, No. 10, p. 83.

REQUIRED POWER OUTPUT—FIG. 2A

The minimum required power output of source 31 is established by the power consumption of system 30; source 31 must provide at least as much energy in a single day as is required to replace the energy consumed by system 30 over the same period. The maximum required power output of source 31 is established by the energy capacity of battery 33: the power output of source 31 need be no greater than that required to fully charge battery 33, from a fully-discharged condition, in a single day. In practice, the optimum power output of source 31 will generally fall between these extremes. In the preferred embodiment, source 31 has sufficient power output to fully-charge battery 33, from a fully-discharged condition, in three days, while replacing the lost charge due to the power consumption of system 30. This requires that source 31 deliver in a single day approximately four times the energy consumed by system 30, or 240 milliwatt-hours, plus an additional factor to account for charging inefficiencies in battery 33. The charging efficiency will vary with the battery type, age, temperature, charge rate, and state of charge, among other factors. For a nickel-cadmium type at room temperature, charging efficiencies of 60% to 80% are typical. In the preferred embodiment, an efficiency of 60% is assumed, so that source 31 must deliver 380 milliwatt-hours per day.

REQUIRED ACTIVE AREA—FIG. 2A

The size (i.e., active area) of source 31 required to deliver the desired charge energy per day can be established in accordance with conventional practice in the design of photovoltaic systems. As is the case in typical photovoltaic applications, the required photoactive area will depend on factors such as the photovoltaic conversion efficiency and the local intensity of solar radiation. In typical applications of photovoltaic sources, the source is oriented in azimuth and elevation in a manner which maximizes the cumulative daily insolation. For example, in a typical application, the source will be oriented so that the photoactive surface faces toward true south, with an elevation angle (above horizontal) which is approximately equal to the local latitude. However, this will generally not be possible in most embodiments of system 30: the orientation of source 31 will generally be constrained in both azimuth and elevation. As a result, an additional margin must be included in establishing the size of source 31 to account for a non-optimum orientation. In the preferred embodiment, a margin of 300% is used to account for non-optimum orientations. In typical photovoltaic applications, the photoactive surface of the source is covered with a material which provides protection against the elements with minimum attenuation of the incident solar radiation. However, in some applications of system 30, the incident solar radiation will be required to pass through dirt films, window screens, and one or more layers of window glass, prior to illuminating source 31. An additional margin must be included in sizing of source 31 to account for the resulting attenuation of the incident radiation. In practice, a margin of between 50% and 100% will generally be adequate. Therefore, in the preferred embodiment, an overall design margin of approximately 450% is added, after the required photoactive area of the source is established in accordance with conventional design practice. This results in a source area of approximately 50 $cm^2$. The physical configuration of PV source 31 will be described subsequently.

Photosensor 36

REQUIREMENTS—FIG. 2A

As previously stated, the combination of photosensor 36 and microcontroller 35 should be capable of registering the presence of dusk and dawn with variable thresholds, a high degree of repeatability, a peak sensitivity in the visible light spectrum, and a time constant of at least several tens of seconds. These requirements can be met with a variety of techniques known in the art. In general, these techniques can be divided into two groups. In the first group, the presence of dusk or dawn is detected in photosensor 36 and conveyed to microcontroller 35 via a discrete logic signal. In the second group, photosensor 36 measures the ambient illumination level and provides a corresponding analog or digital signal to microcontroller 35, wherein the presence of dusk or dawn is detected via a software step. Either group is suitable for system 30, but the latter group is advantageous because it permits software-based time-averaging of the signal, and supports software-based variable detection thresholds. Therefore, it is expected that most embodiments of system 30 will use a technique selected from the latter group.

PREFERRED EMBODIMENT—FIG. 2B

One such known technique, representing the preferred embodiment, is shown in FIG. 2B. This technique meets the previously stated requirements at very low cost, but requires that microcontroller 35 be equipped with at least one I/O line which can be configured to operate, under software control, as either an input or an output. This feature is available in many microcontrollers. Referring to FIG. 2B, a combination of parallel-connected elements, consisting of a cadmium-sulfide photoresistor 46 and a timing capacitor 47, is connected between a programmable I/O line 48 of microcontroller 35 and ground. The resistance of photoresistor 46 corresponds to the level of ambient illumination. This resistance is sensed by microcontroller 35 in the following manner. First, I/O line 48 is programmed as an output and then driven high, charging capacitor 47. After a time previously determined to be sufficient to substantially charge capacitor 47, I/O line 48 is programmed as an input. At this instant, the voltage on I/O line 48 is substantially equal to the supply voltage, and is sensed by microcontroller 35 as a logic high level. Capacitor 47 then begins to discharge through photoresistor 46, causing the voltage on I/O line 48 to decrease exponentially. At some point, the decreasing voltage will be sensed by microcontroller 35 as a logic low level. The elapsed time between the start of the discharge process, and the instant at which the voltage on I/O line 48 is sensed as a logic low level, is proportional to the resistance of photoresistor 46, and hence inversely proportional to the level of ambient illumination. Several such measurements are taken, and then averaged, to provide a time-averaged indication of the illumination level. Subsequently, this time-averaged indication is compared with a predetermined threshold in order to detect the presence of dawn or dusk. This approach is sensitive to thermally-induced variations in the value of capacitor 47 and in the voltage threshold for I/O line 48 (when programmed as an input) in sensing a high-to-low transition. In most applications, this sensitivity will not be prohibitive, since the effects of such variations will be small in relation to the change in resistance of photoresistor 46 arising from even small changes in the illumination level. However, if necessary, this sensitivity can be largely eliminated via the approach described in Application Note 512 (AN512) of the *Embedded Control Handbook*, issued by Microchip Technology Inc. This latter approach also senses the target resistance via measurement of the time required to charge or discharge a timing capacitor. However, unlike the method shown in FIG. 2B, it also includes a calibration resistor of known value, and requires a total of three I/O lines in microcontroller 35. As described in the cited reference, this approach is capable of compensating for temperature sensitivities within the microcontroller and the timing capacitor, and is capable of excellent resolution at low cost. However, the need for additional I/O lines will be a significant disadvantage in many embodiments of system 30.

ALTERNATIVE ADVANTAGEOUS EMBODIMENT—FIG. 2C

Another approach known in the art is to detect the presence of day-time or night-time by monitoring the output voltage, current, or impedance of a photovoltaic cell or source. In system 30, either source 31 or a separate photovoltaic element could be used for this purpose. An absolute minimum-cost approach would be to monitor the output voltage of source 31; this could be done by simply connecting the output of source 31 to a discrete input of microcontroller 35; the presence of daylight could then be detected as a logical high level at the discrete input. However, this approach does not support variable detection thresholds, and is therefore unsuitable for many embodiments of system 30. However, a variable detection threshold can be achieved by monitoring the impedance (i.e., equivalent internal resistance) of source 31. As shown in FIG. 2C, this can be done in a manner similar to the photoresistor approach previously shown in FIG. 2B. In FIG. 2C, a series configuration of a capacitor 49 and a resistor 50 are connected between the anode of source 31 and ground. Programmable I/O line 48 of microcontroller 35 is then connected to the high side of capacitor 49. To measure the ambient illumination using this scheme, I/O line 48 is first programmed to operate as an output, and then brought low for a predetermined time to discharge capacitor 49. Resistor 50 serves to limit the current sunk by I/O line 48. Then I/O line 48 is configured as an input, and the time required for capacitor 49 to charge to the logic threshold level of I/O line 48 is measured. This time will vary as a function of the internal impedance of source 31; since this will depend on the level of ambient illumination, the time measurement provides an indication of the illumination level. Unfortunately, however, this time will also depend on the impedance of battery 33 (not shown) as well the load presented by the balance of system 30. Fluctuations in these variables (e.g., as a result of variation in the state-of-charge of battery 33) can corrupt the illumination measurement. However, if battery 33 is sized (as previously described) to power system 30 for several days without need for charging, then the daily variation in internal impedance of battery 33 will be small relative to the illumination-dependent variation in the internal impedance of source 31. Moreover, a software correction can be applied to compensate for some of the residual error. In general, the technique shown in FIG. 2C is less expensive than that shown in FIG. 2B, but provides a potentially less accurate and repeatable measure of the illumination level. The choice between the methods shown in FIG. 2B and FIG. 2C will depend on the circumstances of the specific application; it is expected that both methods will find use in practical embodiments of system 30.

Other embodiments of photosensor 36 are also feasible. For example, integrated circuits which include a photodiode, amplifier, and A/D converter are now commercially available. These devices easily meet the requirements for photosensor 36, but at a high cost relative to the previously described approaches.

IR Receiver 37

REQUIREMENTS AND GENERAL APPROACH—FIG. 2A

The combination of IR receiver 37 and microcontroller 35 should be capable of continuously monitoring the ambient IR illumination for the presence of any one of a set of predetermined IR signals. In most embodiments of system 30, IR receiver 37 will represent a large fraction of the average power consumption of system 30. Therefore, the size and cost of photovoltaic source 31 and battery 33 will depend, in large measure, on the power dissipation of IR receiver 37; thus, it is advantageous to minimize this power dissipation.

A standard IR remote-control signal typically consists of incoherent IR illumination which is amplitude-modulated by a fixed-frequency subcarrier, which subcarrier has itself been modulated with a serial digital code containing the desired information. Two steps must be performed to register this information in a microcontroller: first, the subcarrier must be detected in the IR illumination; second, the serial digital code must be decoded to obtain the desired information. The first step is typically accomplished by means of a photodiode, amplifier, bandpass filter, and comparator. Self-contained IR detectors are available which include all of these elements in a single package. Such detectors are manufactured by Sharp Electronics Corp. and Lumex Opto/Electronics Inc., among others. These self-contained IR detectors are widely used in commercial applications, and offer the advantages of small size and low cost relative to a discrete implementation. These advantages are germane to practical embodiments of system 30. However, since most commercial applications of IR detectors involve relatively high-power appliances (such as televisions and Video-Cassette Recorders), minimization of power dissipation is rarely a criterion in the design of self-contained IR detectors. Power dissipation of commercially available self-contained IR detectors ranges from 5 milliwatts to 20 milliwatts. Such an energy consumption is of little consequence in a device powered by household AC current, but will be excessive for typical embodiments of system 30.

One standard technique to reduce power consumption in IR and RF receivers is to apply power to the receiver intermittently, with low duty-cycle, until the presence of a signal is detected. Then, power can be applied continuously until the desired information is decoded. This basic technique is used in a variety of products and is described extensively in the literature. For example, this technique was used many years ago in early RF paging receivers, and is used today in many cordless and cellular telephones. An improvement to this basic technique is also described in U.S. Pat. No. 5,081,402 (1992) and U.S. Pat. No. 5,134,347 (1992), both to Koleda. Using this technique of low-duty cycle operation, a standard, self-contained IR detector can be included in IR receiver 37 without unduly driving the size of source 31 and battery 33.

PREFERRED EMBODIMENT—FIG. 2D

The preferred embodiment of IR receiver 37, shown in FIG. 2D, employs such a technique. The output of a commercially available self-contained IR detector 51 is connected to the input of a commercially available decoder IC 52, as well as to a discrete logic input 53 of microcontroller 35. The output of IC 52 is connected to an input port 54 of microcontroller 35. A discrete logic output 55 of microcontroller 35 is connected to the gate of a transistor 56, whose source is grounded and whose drain is connected to the ground terminal of detector 51. Detector 51 can be any IR detector capable of detecting and demodulating the subcarrier-modulated IR signal to extract the transmitted serial digital code stream. An examples of a suitable devices is the model OED-RM200-1 Remote Control Receiver Module manufactured by Lumex Corp. Decoder 52 can be any serial decoder capable of registering the transmitted serial digital code, verifying that it is a valid code, and converting it to a parallel code which can be registered by microcontroller 35. Many such devices are commercially available, such as the model HT-694 Decoder IC manufactured by Holtek Corp. Practitioners skilled in the art will recognize that IC 52 is not absolutely necessary; techniques are available which would enable microcontroller 35 to be connected directly to detector 51, and to perform the function of registering the signal information directly from the serial code obtained at the output of detector 51. This approach saves the cost of IC 52, but increases the complexity of the software instructions (and hence the amount of required on-board memory) for microcontroller 35. The selection between this approach and an approach using a separate decoder (as shown in FIG. 2D) can be made in the conventional manner, with considerations given to overall cost and difficulty of software implementation.

OPERATING FLOWCHART—FIG. 2E

A flowchart describing the operation of this embodiment of receiver 37 is shown in FIG. 2E. This operation is essentially that of a loop, with an initial software step 57 in which power is applied to IR detector 51 (via transistor 56, shown previously in FIG. 2D) for a first predetermined interval. In a step 58, a decision is made on the basis of the presence of an IR signal from detector 51 at input 53: if no signal was present during step 57, then, in a step 63, power is removed from IR detector 51, and, in a step 64, a delay of a second predetermined interval is implemented, after which step 57 is repeated. If, in step 58, a decision is made than an IR signal was, in fact, present during step 57, then a step 59 is executed. In step 59, a timer is started for a third predetermined interval. In a step 60, a test is made to determine if this third predetermined interval has elapsed; if not, a step 61 is executed, in which the status of input port 54 is examined to detect the presence of a valid IR code from decoder IC 52. If such a code is detected, then, in a step 62, the code is registered, and step 59 is repeated. If a code is not detected in step 61, then step 60 is repeated. If, in step 60, it is determined that the third predetermined interval has elapsed, then step 63 is executed.

Thus, when no IR signal is present, the operating duty cycle of IR detector 51 will be essentially equal to the ratio of the durations of the first and second predetermined intervals, in steps 57 and 64, respectively. As is known in the art, the selection of these intervals represents a trade-off between power savings (relative to continuous operation of detector 51) and response time (the interval between transmission of IR information, and the registering of that information in microcontroller 35). In general, it is desired to realize the maximum possible degree of power savings, while keeping the response time within acceptable limits. To achieve this, the first predetermined interval must be made as small as possible, while still allowing sufficient time for detector 51 to power-up (to become fully operational after application of power) and for microcontroller 35 to reliably detect the presence of the IR signal. In the preferred embodiment, this first predetermined interval is approximately 10 milliseconds. The second predetermined interval should be made as large as possible, while still ensuring that the response time is less than the maximum tolerable value. In the preferred embodiment, this second interval is approximately 500 milliseconds. If an IR signal is detected in step 58, then, in steps 59 to 61, power is applied to IR detector 51 for a third predetermined interval. This interval should be slightly longer than the time required to sequentially transmit two complete IR code sequences. In the preferred embodiment, this third predetermined interval is approximately 300 milliseconds. The considerations and tradeoffs inherent in the selection of these intervals are well-known in the art, and are described, for example, by Koleda.

The method by which microcontroller 35 detects the presence of an IR signal in step 58, via input 53, is an important feature of the preferred embodiment. The selection of this method represents a trade-off between the time required to detect the signal, the frequency of false detections, and the frequency of missed detections. A high frequency of false detections will considerably reduce the degree of expected power savings, while a high frequency of missed detections will increase the average response time. In general, the optimum method will depend on the frequency of spurious outputs of detector 51, as well as on the characteristics of the serial digital code carried by the IR signal. A very simple method is possible if detector 51 has a frequency of spurious outputs which is either much higher or much lower than the bit rate of the serial code. This method involves counting the number of edges (low-to-high or high-to-low transitions) in the output of detector 51 over the first predetermined interval of step 57, and comparing that count with a predetermined value. This is an especially convenient technique if input 53 drives a hardware counter within microcontroller 35. If detector 51 has a relatively low frequency of spurious outputs, then an IR signal is detected when the measured count exceeds the predetermined value. This is the approach used in the preferred embodiment. However, if detector 51 has a relatively high frequency of spurious outputs, then an IR signal is detected when the measured count is less than the predetermined value.

A different detection technique must be used if detector 51 has a frequency of spurious outputs which is comparable to the bit rate of serial code. In this case, for example, a valid signal might be detected by measuring the duration of several pulses at the output of detector 51, or by use of a special preamble in the serial code. These methods are well-known in the art.

Sizing of Motor 43—FIGS. 1A and 2A

Referring now to both FIGS. IA and 2A, the purpose of motor 43 (shown in FIG. 2A) is to rotate tilt adjustment shaft 18 of venetian blind 15 (shown in FIG. 1A), via a gear-reduction mechanism (not shown). The power required for this purpose will depend primarily on three factors. The first factor is the torque required to rotate shaft 18. This torque varies widely among extant venetian blinds. In general, higher-quality blinds require relatively little torque, while low-quality blinds require higher torque. It is expected that a torque of 0.3 newton-meters will be sufficient for most venetian blinds of at least average quality. The second factor is the number of revolutions of shaft 18 required to fully-open and full-close louvers 17 (shown in FIG. 1A). For most extant blinds, this number is between six and ten revolutions. The third factor is the desired speed with which louvers 17 can be fully-opened or fully-closed. If this speed is too high, users will not be able to accurately stop louvers 17 in the desired position. If this speed is too low, then the time required to adjust the blinds will exceed the patience of many users. For most embodiments of the subject invention, it is expected that a speed which results in a cycle time (time required to rotate shaft 18 through the full range of tilt of louvers 17) of approximately 6 to 12 seconds will be appropriate. However, this factor is not critical; much longer cycle times will be acceptable to many users. Given these three factors, the required power of motor 43 can be determined in accordance with conventional design practice. It is expected that, for most embodiments of the subject invention, a power output of 0.5 watts to 2.0 watts will be sufficient for motor 43. This power output is within the capability of many of the DC motors which are used in battery-operated toys and small appliances.

In most embodiments of system 30, Motor 43 will be a standard, brush-commutated Permanent-Magnet (PM) type DC motor. Other types, such as brushless-DC or stepper motors, could also be used, but their relatively high cost will not be warranted in most embodiments of system 30.

Sensor 44

REQUIREMENTS AND GENERAL APPROACH—FIG. 2A

Referring again to FIG. 2A, sensor 44 provides a feedback signal to enable microcontroller 35 to register the angular displacement of the output shaft of motor 43. Since there are very many applications for such sensors, a wide variety of such sensors is known in the art. For example, some motorized automotive mirror assemblies use potentiometers, in conjunction with Analog-to-Digital (A/D) converters, to provide a displacement feedback signal to a microcontroller. More commonly, pulse-type or digital sensors are used to avoid the need for A/D converters. These include incremental and absolute optical encoders, shutter wheels, and eddy current and Hall-effect-based sensors. However, the requirements of sensor 44 are less stringent than those of the feedback sensors used in many other applications. Most applications of such sensors require high accuracy and repeatability, so that the difference between the measured and actual motor shaft displacement is never greater than a very small predetermined amount, such as a few milliradians. In most embodiments of the subject invention, however, an error of many tens of radians will be tolerable. Therefore, the design of sensor 44 should stress low cost, rather than high accuracy, relative to typical sensors used in other applications. Several suitable low-cost displacement-sensing techniques are known in the art; any of these could be used in the subject invention. One such technique derives a displacement feedback signal from the periodic variations in drive current which arise in the operation of conventional DC motors. The accuracy and repeatability provided by this technique are inadequate for many applications, but are more than adequate for most embodiments of system 30. Since no electromechanical rotary sensor is required, this technique offers the advantages of mechanical simplicity and low cost. Therefore, it is expected that this technique will be a suitable choice for many embodiments of sensor 44, and is the basis of the preferred embodiment. An early embodiment of this technique is described by R. McGillivray in "Motor Revolutions Control", *Wireless World*, January 1977, p. 76. Subsequently, this approach was also addressed in U.S. Pat. No. 4,684,858 (1987) to Ma et al., U.S. Pat. No. 5,038,087 (1991) to Archer et al., and French patent 2,628,906 (1988) to Roussel. Archer described an approach which is essentially equivalent to that described by McGillivray, and showed its use in the control of motorized roller-type window shades and awnings. Ma described a different technique intended to improve accuracy and repeatability, and discussed its use in connection with motorized positioners for satellite television dish antennas. Roussel described still further improvements. In general, these extant techniques can be grouped into two categories: those which detect the sharp current discontinuities which occur at the instant of commutation, and those which detect the sinusoidal variation in the motor current caused by a corresponding variation in the back-EMF generated by the motor. In general, the latter approach offers the potential for better performance, at some increase in cost and complexity. The techniques described by Ma and Roussel fall into this category. However, the former approach is adequate for this application, and is used in the preferred embodiment to reduce cost. The techniques described by McGillivray and Archer fall into this category. In fact, the technique used in the preferred embodiment is very similar to that described by McGillivray, but with certain optional low-cost improvements.

PREFERRED EMBODIMENT—FIG. 2F

FIG. 2F shows a basic embodiment of sensor 44 using the commutation-pulse feedback technique. In this embodiment, a current-sensing resistor 65 is placed between control bridge 42 and ground, so that the motor current flows through resistor 65. The high side of resistor 65 is connected, via a capacitor 66, to an amplifier 68, which is supplied with negative feedback via a resistor 67. The output of amplifier 68 is connected to the input of an amplifier 69, the output of which is connected to an input 70 of microcontroller 35. Input 70 drives the clocking input of a hardware counter (not shown) within microcontroller 35. Thus, it can be seen that a voltage proportional to the motor current appears across resistor 65 and is capacitively-coupled to amplifier 68. The motor current, and hence the voltage across resistor 65, includes periodic discontinuities due to motor commutation. The value of capacitor 66 is selected to pass these discontinuities, while substantially suppressing lower-frequency components. These discontinuities appear as narrow pulses at the output of amplifier 69, which are registered by microcontroller 35. The configuration of elements 65 through 69 shown in FIG. 2F is substantially the same as that described McGillivray, who also provides a description of the circuit operation.

ALTERNATIVE ADVANTAGEOUS EMBODIMENTS—FIGS. 2G AND 2H

Since the pulses at the output of amplifier 69 are typically of relatively short duration, the embodiment of FIG. 2F requires a hardware clock/counter within microcontroller 35 to reliably register them. If such a clock/counter is not available, then additional elements can be used to lengthen the pulses at the output of amplifier 69, so that software instructions executed by microcontroller 35 can reliably detect the pulse edges. Two such schemes are shown in FIG. 2G and FIG. 2H. In FIG. 2G, the output of amplifier 69 is connected to a T-type flip-flop 71, the output of which is connected to input 70 of microcontroller 35. The state of flip-flop 71 is toggled on each rising edge of the output of amplifier 69; this yields a square waveform whose frequency is half the pulse rate at the output of amplifier 69. In the approach shown in FIG. 2H, the output of amplifier 69 is connected to the input of a one-shot 72, the output of which is connected to input 70 of microcontroller 35. The output pulse length of one-shot 72 should be approximately equal to one-half the period of the pulse rate at the output of amplifier 69, when the motor is operating at the expected speed. The technique shown in FIG. 2G is slightly less complex than that shown in FIG. 2H, and ensures that a square wave is produced regardless of the input pulse rate. However, the technique shown in FIG. 2H offers better immunity to spurious outputs (as might be caused, for example, by brush bounce in motor 43). Accordingly, the technique shown in FIG. 2H will be preferable to that shown in FIG. 2G in many applications.

CURRENT-SENSING RESISTOR 65—FIG. 2F

Referring again to FIG. 2F, the value of current-sensing resistor 65 represents a trade-off: a large value will increase the voltage drop across resistor 65, hence increasing the signal level to amplifier 68; however, there will be a concomitant increase in power losses in resistor 65 due to the motor current. However, this will not be an issue for most embodiments of system 30, since operation of motor 43 will typically be infrequent. A value of approximately 10 ohms is used for resistor 65 in the preferred embodiment, but a wide range of values will generally be suitable.

CAPACITOR 66—FIG. 2F

More care must be taken in the selection of the value of capacitor 66: if the capacitance is too low, then the frequency of missed pulses can become unacceptably high; if the capacitance is too high, the frequency of spurious pulses can also rise to unacceptable levels. The value of capacitor 66 should ideally be determined empirically, with consideration given to aging of the motor. It should be noted that system 30 can tolerate a relatively high incidence of spurious and missed pulses (e.g., 10%), but care should be taken in the selection of capacitor 66 to ensure that the incidence of spurious and missed pulses is substantially the same for both directions of motor rotation. Depending on the motor type and speed, and on the value of current-sensing resistor 65, optimum values for capacitor 66 typically range between 100 picofarads and 200 nanofarads.

AMPLIFIER 68 AND FEEDBACK RESISTOR 67—FIG. 2F

As is evident in FIG. 2F, amplifier 68 is operated as a linear amplifier (via negative feedback through resistor 67), while amplifier 69 is operated as a comparator. Typically, the closed-loop gain of amplifier 68 will be selected to be just sufficient to ensure that amplifier 69 saturates on the voltage peaks at the output of amplifier 68. The required closed-loop gain of amplifier 68 depends on factors such as the motor current, the value of current-sensing resistor 65, and the design of the brushes and commutator of motor 43. The value of feedback resistor 67 should be determined empirically to provide reliable detection of the commutation-induced discontinuities, and will typically be selected to provide a closed-loop gain of approximately 100 for amplifier 68. In most embodiments of sensor 44, the required gain-bandwidth product of amplifiers 68 and 69 will be less than 1 megaherz. Required input impedance for amplifiers 68 and 69 will typically be less than 10 kilohms. These requirements are modest and can be met by a wide variety of low-cost devices, such as CMOS logic gates which have been externally biased for linear operation. For example, McGillivray shows that amplifier 68 can be implemented with a single inverter from a type 4007 quad-two-input inverter IC, with a value of 470K for feedback resistor 67. McGillivray also shows that a second inverter can be used directly as amplifier 69. The use of linear-biased CMOS logic is advantageous because costs of such devices are extremely low. Another, potentially more significant, advantage is the possibility of integrating such CMOS logic-based amplifiers together with microcontroller 35 into a single monolithic integrated circuit. This implementation is described subsequently.

POWER SUPPLY—FIGS. 2F, 2I, AND 2J

The power supply connections for amplifiers 68 and 69 are not shown in FIG. 2F. Since it is highly desirable to minimize the average power consumption of system 30, and since amplifiers 68 and 69 serve only to measure the displacement of motor 43, power need be applied to amplifiers 68 and 69 only when motor 43 is operating. This could be accomplished, for example, by obtaining the power for amplifiers 68 and 69 from the output of control bridge 42, or from the outputs of microcontroller 35 which are connected to control bridge 42. Any of several well-known techniques can be used to accomplish this. Two such technique are shown in FIGS. 2I and 2J.

In FIG. 2I, control bridge 42 is of the type which requires two control signals for bi-directional operation of motor 43, such that one signal gates the application of power to motor 43, while the other signal determines the polarity of the applied voltage (and hence, the direction of rotation). One such bridge is the UDN-2952B Full Bridge Motor Driver manufactured by Sprague Corp. In this scheme, power for amplifiers 68 and 69 is obtained directly from the output of microcontroller 35 which drives the power-gating input of bridge 42 (shown as the ON/OFF input). This scheme is practical only if this output of microcontroller 35 can source enough current to operate amplifiers 68 and 69. In most cases, this will not be a problem. This is the approach used in the preferred embodiment.

In FIG. 2J, control bridge 42 is of the type which requires two control signals for bi-directional operation of motor 43, such that one signal gates the application of voltage to motor 43 for operation in one direction, while the other signal gates the application of voltage to motor 43 for operation in the opposite direction. In this technique, the anodes of a diode 73 and a diode 74 are connected to the outputs of microcontroller 35 which drive control bridge 42. The cathodes of both diodes 73 and 74 are connected to the positive supply terminal of amplifiers 68 and 69. Thus, diodes 73 and 74 form a wired-OR network which supplies power to amplifiers 68 and 69 if either of the outputs of microcontroller 35 is high.

SENSOR PERFORMANCE AND ALTERNATIVE EMBODIMENTS—FIG. 2F

In general, the performance of the embodiment of sensor 44 shown in FIG. 2F will depend on characteristics of motor 43, such as the composition, mechanical configuration, and age of the brushes; the motor speed; and the cleanliness and surface condition of the commutator. As previously stated, the subject invention is relatively tolerant of spurious and missed pulses. Therefore, acceptable performance can often be obtained even with very low-cost motors, such as those used in motorized toys. For this reason, the approach shown in FIG. 2F, optionally in conjunction with the improvements shown in FIGS. 2G or 2H, can be expected to be sufficient for most embodiments of system 30. However, superior performance can be obtained, albeit at some increase in complexity and cost, with other methods known in the art, such as those proposed by Ma and Roussel. More conventional techniques, such as shutter-wheels and Hall-effect sensors, could also be employed.

Monolithic Embodiment of System 30—FIGS. 2A, 2F, and 2K

As is the case with conventional electronic devices, system 30 may be implemented with varying levels of device integration. Referring again to FIG. 2A, microcontroller 35, control bridge 42, and sensor 44 have been previously described as comprising physically distinct electronic components in the preferred embodiment. However, it is also practical to integrate these elements in a single, monolithic, integrated circuit. FIG. 2K shows an embodiment of system 30 using such a monolithic Integrated Circuit (IC) 75. Given the current state of integrated circuit technology, system 30 is well-suited to such a monolithic embodiment, since many manufacturers are able to integrate power devices (such as those required to implement control bridge 42) with logic and control elements (such as those required to implement microcontroller 35) in a single monolithic device. The modest output current and power dissipation requirements of bridge 42, due to the relatively small size of motor 43, further facilitate this integration. Also, since amplifiers 68 and 69 of sensor 44 (previously shown in FIG. 2F) need have only modest analog performance (and could even be implemented with CMOS gates biased for linear operation), they also can be readily and inexpensively integrated into monolithic IC 75. A monolithic circuit such as that shown in FIG. 2K would entail significant engineering investment, but would substantially reduce the recurring costs of practical embodiments of system 30. Therefore, such a monolithic circuit would prove extremely advantageous in many applications.

Expanded Configuration of System 30—FIGS. 2A and 2L

In the previously shown figures, a preferred embodiment of the electrical configuration of system 30 is presented. However, many advantageous variations of this embodiment are possible. In some applications, a subset of the elements shown in FIG. 2A will suffice. For example, not all applications will require IR receiver 37; in these circumstances, the deletion of IR receiver 37 will significantly reduce the cost, complexity, and power consumption of system 30. In other applications, a ready source of power will be available, so that PV source 31, diode 32, and battery 33 will not be required.

However, other applications of system 30 will benefit from the addition of certain elements to the basic configuration shown in FIG. 2A. One such embodiment is shown in FIG. 2L. In this embodiment, a second photosensor 76, a second IR receiver 77, an IR transmitter 78, and a switch array 79 are connected to microcontroller 35. Second photosensor 76 is similar in composition and operation to photosensor 36, but is physically oriented to sense illumination incident from a different direction and (optionally) has a different wavelength of peak response. Second IR receiver 77 is similar in composition and operation to IR receiver 37, but is physically oriented to receive IR radiation from a different direction. Details of the physical orientation of second photosensor 76 and second IR receiver 77, and the purpose and benefits of their addition to system 30, will be subsequently described in detail. IR transmitter 78 is an element of conventional design which is capable of emitting IR signals, under control of microcontroller 35, which contain information provided by microcontroller 35. Many conventional techniques are known for implementing such an element. These conventional techniques include techniques for conveying information at a relatively low data-rate over relatively long distances, as well as techniques for conveying information at a relatively high data-rate over relatively short distances. IR transmitter 78 will preferably use a technique selected from the former category. For example, IR transmitter 78 could be implemented in the same manner as the IR transmitters used in hand-held remote controls for televisions and video-cassette recorders. Accordingly, a typical implementation of IR transmitter 78 will include at least one IR Light-Emitting Diode (IR LED), at least one switching element to operate the IR LED, and a subcarrier-frequency oscillator which is gated by microcontroller 35. The purpose and benefits of IR transmitter 78 will be subsequently described in detail. Switch array 79 includes at least one manually-operated switch of conventional design, connected to microcontroller 35 in the conventional manner so that the switch state can be registered by microcontroller 35. Switch array 79 could be used to actuate special functions or modes, in the conventional manner.

Physical Configuration of Subject Invention

General Arrangement—FIGS. 3A and 3B

FIG. 3A shows an isometric view of a preferred embodiment of automatic tilt control system 30, while FIG. 3B shows an exploded isometric view of the same embodiment. Reference is made to both figures in the following discussion.

System 30 includes a bracket 80, which has a threaded hole 81, cut-out 82, and first notch 83. Bracket 80 will be subsequently described in greater detail. A thumbscrew 84 is screwed into threaded hole 81.

System 30 includes a gearmotor 85. Gearmotor 85 is an electromechanical rotary actuator of conventional design. Gearmotor 85 includes motor 43, a gear-train (not shown), and an output sleeve 86 with a hexagonal aperture. The design of gearmotor 85 is such that operation of motor 43 causes output sleeve 86 to rotate. Gearmotor 85 is attached to bracket 80 by a rubber rivet 87A and a rubber rivet 87B.

System 30 also includes a drive shaft 88. Drive shaft 88 includes a base shaft 89 of hexagonal cross-section, a flexible coupling 90, and a coupling tube 91. The dimensions of the cross-section of base shaft 89 are such that base shaft 89 fits within the hexagonal aperture of output sleeve 86. Drive shaft 88 will be subsequently described in greater detail. As best seen in FIG. 3A, the configuration of bracket 80, gearmotor 85, and drive shaft 88 is such that portions of drive shaft 88 can extend through cut-out 82, so that torque from gearmotor 85 can be transmitted to a point on the opposite, distal, side of bracket 80.

A circuit board 92 is attached to bracket 80 in the conventional manner; for example, by screws and stand-offs (not shown). As best seen in FIG. 3B, circuit board 92 has a board cut-out 93 of suitable shape to enable board 92 to be mounted to bracket 80 without interference to gearmotor 85 or drive shaft 88. On circuit board 92 are mounted certain previously described electronic components of system 30, including battery 33, microcontroller 35, switches 38 to 41, control bridge 42, IR detector 51, and decoder IC 52. Not shown in either FIGS. 3A or 3B are certain other electronic components of system 30 which may be mounted on circuit board 92, since they have been previously described and are incidental to the physical structure of the subject invention.

Switches 38 to 41 have been previously described as momentary-contact, single-pole switches. As evident in FIGS. 3A and 3B, switches 38 and 40 are of the flat-mounted printed-circuit-board type, such as the Panasonic model EVQ-QS205K. This type of switch is actuated by moving a plunger or button toward the surface of the circuit board. However, switches 39 and 41 are of the right-angle-mounted printed-circuit-board type, such as the Panasonic model EVQ-QEJ04K. This type of switch is actuated by moving a plunger or button parallel to the surface of the circuit board, in a direction determined by the switch orientation. In the embodiment shown in FIGS. 3A and 3B, switch 39 is actuated by moving the button upward, while switch 41 is actuated by moving the button downward. Switches 38 to 41 are arranged in a diamond-shaped configuration, with switches 39 and 41 at the top and bottom, respectively, and switches 38 and 40 at the left and right sides, respectively, of the diamond.

System 30 also includes an actuating body 94, comprising a yoke 95, rod 96, and stem 97. Rod 96, of circular cross-section, is disposed within a bushing 98. Bushing 98 is fixed within first notch 83 of bracket 80, so that the left side of the upper-most part of yoke 95 is in contact with the button of switch 38, and the right side of the upper-most part of yoke 95 is in contact with the button of switch 40. It is evident, therefore, that these elements constitute a switch assembly in which rotation of body 94 about an axis concentric with rod 96 will cause closure of either switch 38 or switch 40, depending on the direction of rotation, while upward displacement of body 94 will cause closure of switch 39, and downward displacement of body 94 will cause closure of switch 41. The elements composing this switch assembly will be subsequently described in greater detail.

System 30 includes a support member 99. Support member 99 is attached to circuit board 92 by conventional means. Support member 99 includes electrical conductors (not shown) which are electrically connected to certain of the electronic components mounted on circuit board 92. On support member 92 are mounted certain other electronic components of system 30 (such as PV source 31) which are not shown in FIGS. 3A or 3B. Details of the attachment between member 99 and circuit board 92, of the electrical conductors included in member 99, of the electronic components mounted on member 99, and of the construction and arrangement of member 99 itself will be discussed subsequently.

System 30 also includes a cover 100 (shown in FIG. 3A, but not FIG. 3B) which is demountably attached to bracket 80 by conventional means, such as magnets or screws. Cover 100 is preferably of plastic, although light metals could also be used. Cover 100 includes a window 101. Window 101 is located so as to allow IR signals to illuminate IR detector 51. The dimensions of window 101 are such that window 101 does not limit the intrinsic field-of-view of IR detector 51. Thus, in accordance with conventional design practice, the dimensions of window 101 will depend on the distance from IR detector 51 to window 101, as well as the intrinsic field-of-view of IR detector 51. In accordance with conventional practice, window 101 should be of a material which offers good transmissivity to IR radiation.

Gearmotor 85

REQUIREMENTS—FIGS. 1A AND 3B

As will be subsequently shown, the purpose of gearmotor 85 (shown in FIG. 3B) is to rotate tilt-adjustment shaft 18 (shown in FIG. 1A) of host blind 15 (shown in FIG. 1A). As previously stated, the torque required to rotate shaft 18 will depend on the type and quality of blind 15, with a torque of approximately 0.3 newton-meters being adequate for most venetian blinds of at least average quality. Also as previously stated, six to ten revolutions of shaft 18 are required to fully traverse the tilt angle limits of louvers 17 (shown in FIG. 1A) in most extant blinds. Also as previously stated, system 30 (not shown) should be capable of traversing the full tilt angle range of louvers 17 in approximately 6 to 12 seconds, but this requirement is not critical; much longer traverse times will be acceptable to many users.

Therefore, gearmotor 85 should be capable of an output torque of approximately 0.3 newton-meters, with an output speed of between 30 and 100 RPM (although much slower speeds could also be used, as will be subsequently discussed). Gearmotor 85 should also be capable of producing a continuous rotary displacement of at least ten revolutions.

These requirements are similar to those of many appliances and toys, and many conventional electromechanical rotary actuators are capable of meeting them. However, in four important respects, the requirements of gearmotor 85 are less stringent than those of the electromechanical rotary actuators used in other applications. First, gearmotor 85 need be capable of only intermittent, infrequent operation, with a continuous operating duration of considerably less than one minute, and total daily operating time of less than several minutes. Second, in terms of total accumulated operating time, gearmotor 85 need have only a relatively short lifetime: over five years of typical operations of system 30, gearmotor 85 can be expected to accumulate less than 100 hours of operating time. Fourth, there are no special requirements of gearmotor 85 concerning backlash, mechanical play, operating noise, or efficiency. Therefore, it is expected that the embodiment of gearmotor 85 will be selected primarily on the basis of cost.

PREFERRED EMBODIMENT—FIG. 3B

In the preferred embodiment, the mechanical aspects of gearmotor 85 are similar to those of the miniaturized servomotors used in radio-controlled model aircraft and automobiles. As previously stated, gearmotor 85 includes motor 43, which is a brush-commutated, permanent-magnet DC motor with a power output of less than 2 watts. Gearmotor 85 also includes a speed-reduction gear-train (not shown), having a speed reduction factor of approximately 72, and comprising multiple meshes of plastic spur gears.

ALTERNATIVE EMBODIMENTS—FIGS. 1A AND 3B

Any of many well-known types of electromechanical rotary actuator could be used instead of gearmotor 85 (shown in FIG. 3B). For example, gearmotor 85 could be replaced with a stepping motor; in that case, sensor 44 (previously shown in FIG. 2A) would not be required.

Instead of brush-commutated motor 43, gearmotor 85 could use a brushless (electronically-commutated) DC motor, or an AC motor with the appropriate drive electronics. Also, instead of multiple-stage plastic spur gears, gearmotor 85 could include helical gears, or a worm-gear combination.

However, all of these alternative embodiments—while feasible—are likely to result in increased cost of system 30, and will therefore prove less desirable than the preferred embodiment in most applications.

In some applications, cost will be especially critical, while the speed of tilt adjustment of louvers 17 (shown in FIG. 1A) will be especially non-critical. For example, in systems intended exclusively for unattended operation, a time of several minutes, or more, to fully traverse the tilt-angle range of louvers 17 may be quite acceptable. In these applications, a significant cost savings could be obtained by reducing the output power of motor 43, with a corresponding increase in the speed-reduction factor in gearmotor 85 to maintain the required torque.

Bracket 80

Referring to FIGS. 4A to 4C, as well as the previously shown FIG. 1E, bracket 80 is now described in detail.

GENERAL ARRANGEMENT—FIGS. 4A TO 4C

FIG. 4A shows an isometric view of the front of bracket 80, while FIG. 4B shows an isometric view of the top part of the back of bracket 80. FIG. 4C shows bracket 80 placed on headrail 16. Bracket 80 consists of a thin, rectangular piece of metal, with an approximately 90-degree bend 102 at its bottom-most part and a lip 103 at its top-most part, and into which certain openings have been cut or stamped. These openings include threaded hole 81, cut-out 82, and first notch 83, as well as a second notch 104 (shown only in FIG. 4B). As best seen in FIG. 4B, lip 103 is a bend in the top part of bracket 80 which has the general shape of an inverted J. As seen in FIG. 4C, lip 103 functions as a saddle which rests on the top edge of front wall 16A of headrail 16. In use, bracket 80 is placed so that lip 103 engages the top of front wall 16A, with bracket 80 positioned laterally in such a manner that tilt-adjustment shaft 18 is substantially centered horizontally in cut-out 82. Then, thumbscrew 84 is threaded into hole 81 and tightened, clamping bracket 80 to front wall 16A of headrail 16. There are two important considerations in the selection of material for bracket 80, its thickness, and the method used to form the bends. First, lip 103 must hold its shape in the face of clamping forces induced by thumbscrew 84. Second, since venetian blinds are often installed so that the top surface of hanger 20A is flush against the undersurface of the head jamb of the window frame (i.e., in an inside-mount configuration, as shown previously in FIG. 1F), the thickness of the metal used for bracket 80 should ideally be no greater than that of the metal used in hanger 20A. This will ensure adequate clearance between the top of headrail 16 and the undersurface of the head jamb to permit installation of bracket 80. In the preferred embodiment, bracket 80 is of stamped steel, with thickness approximately equal to that of the metal used in hanger 20A for a small venetian blind.

DIMENSIONS—FIGS. 1C, 1E, AND 4A TO 4C

As previously shown in FIG. 1E, there is considerable variation in the dimensions of the headrails of available venetian blinds, and this variation must be considered in establishing the size and shape of bracket 80. Another variable which must be considered is the location of tilt-adjustment shaft 18: FIG. 4C shows tilt-adjustment shaft 18 on the left-hand side of headrail 16, but in many blinds, shaft 18 is on the right-hand side of headrail 16. Therefore, to assure compatibility with a wide range of extant blinds, the shape of bracket 80 should be symmetrical about a vertical axis which passes through the center of cut-out 82, and the width of bracket 80 should be less than twice the minimum expected distance between the outer diameter of tilt-adjustment shaft 18 and the proximal end of hanger 20A. For most extant blinds, this distance ranges from approximately 2 cm to 4 cm, so the width of bracket 80 should ideally be no greater than 4 cm. The distance between the inside surfaces of the parallel vertical segments composing the J-shaped cross-section of lip 103 (best seen in FIG. 4B) should be slightly greater than the maximum expected thickness of the top edge of front wall 16A of headrail 16 (best seen in FIG. 4C). A distance of approximately 0.5 cm to 0.75 cm will be sufficient to accommodate most extant blinds. The length of short vertical segment of the J-shaped cross-section of lip 103 represents a compromise: if this segment is too short, the attachment of bracket 80 to headrail 16 will not be secure; if too long, the installation of bracket 80 could require temporary removal of headrail 16 to gain the necessary mounting clearance (particularly in an inside-mount application, as shown previously in FIG. 1F). A length of between 0.5 cm to 1.0 cm will be appropriate in most applications.

The distance between the top of cut-out 82 and the top of bracket 80 should be less than the minimum expected distance between the top edge of front wall 16A and the upper-most part of the exposed portion of tilt-adjustment shaft 18 (see FIG. 4C), less a distance equal to approximately the maximum diameter of drive shaft 88. A distance of approximately 1.25 cm will be sufficient to accommodate most extant blinds. The distance between the bottom of cut-out 82 and the top of bracket 80 should be greater than the maximum expected distance between the top edge of front wall 16A and the bottom of tilt-adjustment shaft 18 (see FIG. 1C), plus a distance equal to approximately three times the maximum diameter of drive shaft 88. A distance of approximately 6.5 cm will be sufficient to accommodate most extant blinds. The width of second notch 104 (shown in FIG. 4B) should be larger than the width of the gear housing and bearing assembly (not shown) within headrail 16 which is connected to tilt-adjustment shaft 18. A width of 2 cm of second notch 104 will be sufficient to accommodate most extant blinds. Cut-out 82 should be as wide as possible while leaving enough material on both sides of cut-out 82 to maintain adequate rigidity in bracket 80. In the preferred embodiment, the width of cut-out 82 is 1.5 cm less than the width of bracket 80. The placement of threaded hole 81 is not critical; in most cases, it will be located as close to the top of bracket 80 as is practicable. The other dimensions of bracket 80, such as overall height of bracket 80 or the length of the short leg of bend 102, are likewise non-critical and will depend on dimensions of the other components composing system 30.

These dimensions may be varied as needed to suit the unique requirements of particular embodiments of system 30. In particular, if compatibility with a wide range of extant blinds is not desired, then the previously described constraints may be relaxed. For example, if compatibility is desired only with blinds having tilt-adjustment shaft 18 on the left-hand side, then bracket 80 need not be symmetric about a vertical axis bisecting cut-out 82; instead, the lateral extent of bracket 80 to the right of cut-out 82 can be increased arbitrarily.

ALTERNATIVE EMBODIMENTS

WIDER LOWER PORTION—FIGS. 4D AND 4E

Figure 4D:
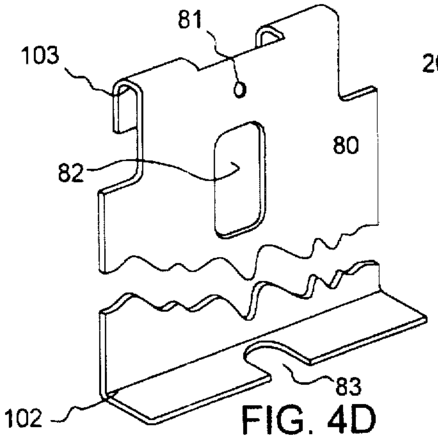
Figure 4E:
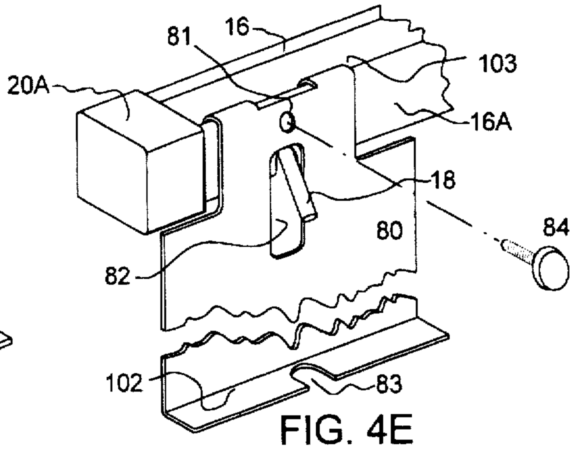

One potentially advantageous variation of bracket 80 is shown in FIGS. 4D and 4E. In this variation, the width of bracket 80 is not constant: the width of the upper portion of bracket 80 is as was previously described, while the width of the lower portion is increased. FIG. 4E shows this embodiment of bracket 80 attached to headrail 16. The width of the lower, wider portion of bracket 80 should be less than twice the minimum expected distance between the outer diameter of tilt-adjustment shaft 18 and the distal end of hanger 20A. For most extant blinds, this distance ranges from approximately 3.5 cm to 7.5 cm, so the width of the lower portion of bracket 80 could range up to 7 cm. The vertical distance between the top of bracket 80 and the point at which the width of bracket 80 increases should be greater than the maximum expected height of hanger 20A. The increased width of the lower portion of bracket 80 afforded by this variation provides more room for the other components composing system 30, and will therefore prove advantageous in many applications.

DIFFERENT SHAPE OF LIP 103

Although the previously shown J-shaped bend of lip 103 is easily fabricated and will prove satisfactory in most applications, other shapes of bend may prove advantageous in some applications. For example, an R-shaped bend could be used, in which the space at the lower part of the bend is greater than at the middle part. If fabricated with resilient spring steel, such an R-shaped lip could provide a significant degree of clamping force on front wall 16A, possibly obviating the need for thumbscrew 84 and hole 81. Similar, spring-steel lips, without clamping screws, are used in the commercially-available clips used to attach decorative valances to conventional venetian blinds. In the context of the subject invention, there are two disadvantages with such an arrangement: first, the clamping force would be much less than that provided by the preferred embodiment described above; second, the required height of the spring-steel lip would be greater than that of the preferred embodiment, increasing the probability that headrail 16 would have to be temporarily removed to provide adequate installation clearance. However, the cost savings associated with deletion of thumbscrew 84 could make such a lip preferable in some applications.

ALTERNATIVES To THUMBSCREW 84—FIG. 4C

The aforementioned variations of bracket 80 are intended to permit easy installation on, and removal from, the host blind. If this is not required, adhesive or magnet means could be used, in lieu of threaded hole 81 and thumbscrew 84, to secure bracket 80 to headrail 16. However, magnetic attachments are relatively insecure, and adhesive attachments carry the risk of permanently marring the surface of headrail 16; this may be unacceptable in some applications. If such marring is not objectionable, one potentially advantageous means of attachment comprises self-adhesive hook-and-loop fastening strips. In this approach, threaded hole 81 is eliminated, and the hook-type strip is attached to the back of bracket 80. The loop-type strip is then attached to the front of headrail 16. Thereafter, bracket 80 can be secured to headrail 16 by simply pressing it in place.

Although thumbscrew 84 improves the security of the attachment between bracket 80 and headrail 16, it will not be required in all applications of bracket 80, since the weight of bracket 80 (and all the elements mounted thereon) bearing on lip 103 will, in some cases, provide an acceptably secure attachment to headrail 16.

Figure 4F:
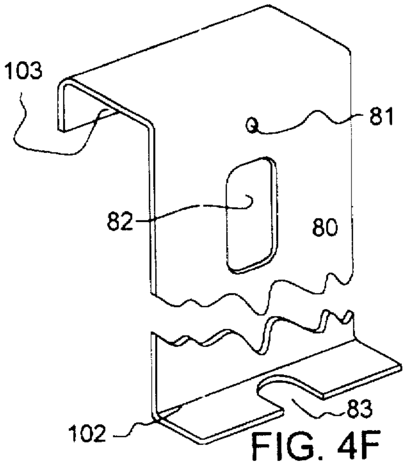
Figure 4G:
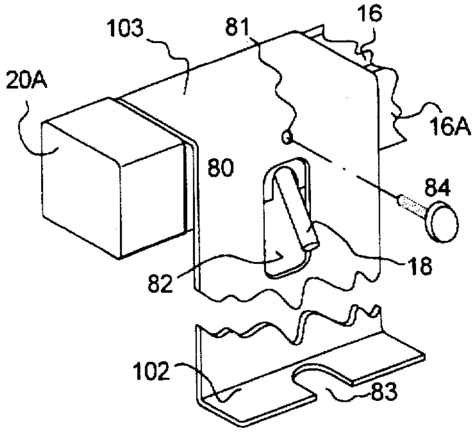

INCREASED DEPTH OF Lip 103—FIGS. 4F AND 4G

Another potentially advantageous variation of bracket 80 is shown in FIGS. 4F and 4G. In this variation, the depth of lip 103 (i.e., the distance between the inside surfaces of the parallel vertical segments composing the J-shaped cross-section of lip 103) is increased to a value slightly greater than the depth of the headrail 16; thus, lip 103 functions as a saddle which sits on top of headrail 16. As in the embodiments shown in FIGS. 4A to 4E, lip 103 contacts the upper edge of front wall 16A, and thumbscrew 84 bears against front wall 16A to secure bracket 80 to headrail 16. The advantage of the variation shown in FIGS. 4F and 4G is that it provides a potentially more secure attachment to the host headrail. However, this variation has two significant disadvantages. First, installation of this variation of bracket 80 on a venetian blind which is installed in an inside-mount configuration would require temporary removal of headrail 16 from hanger 20A, increasing the difficulty of installation. Second, this variation of bracket 80 cannot be used with blinds having a headrail depth which exceeds the distance between the inside surfaces of the parallel vertical segments of lip 103; therefore, this distance must be made greater than the maximum expected headrail depth. This would result in a substantial, unsightly protrusion of bracket 80 away from front wall 16A when bracket 80 is used with smaller headrails. Therefore, for most applications, it is expected that the variation shown in FIGS. 4F and 4G will be less useful than the embodiments of FIGS. 4A to 4E.

USE OF SOFT MATERIAL TO LINE INSIDE SURFACES OF BRACKET 80—FIG. 4C

The inside surfaces of bracket 80 (i.e., those surfaces facing headrail 16) can advantageously be lined with a soft material, such as rubber or felt—or can be given a plastic coating—to prevent marring of headrail 16. However, as previously stated, the thickness of bracket 80 at the top of lip 103—including any lining material or coating, if present—should be minimized, and should preferably be less than the thickness of hanger 20A.

USE OF BRACKET 80 WITH OTHER TYPES OF WINDOW COVERINGS

FIGS. 4C, 4E, and 4G show the use of bracket 80 with headrail 16 of a host venetian blind. However, bracket 80 could be used in a similar manner with any window covering having a headrail, such as a pleated shade (since, however, pleated shades lack tilt-adjustment shaft 18, cut-out 82 in bracket 80 is not required for use with pleated shades).

Torque Coupling Approach: Rubber Rivets 87A and 87B and Drive shaft 88

Referring now to FIGS. 5A to 5G and the previously shown FIG. 1E, the requirements for, and design of, rubber rivets 87A and 87B and drive shaft 88 are now described in detail.

REQUIREMENTS—FIGS. 5A AND 6B

FIG. 5A shows an isometric view of gearmotor 85, rubber rivets 87A and 87B, drive shaft 88, and bracket 80, in conjunction with small blind 24. FIG. 5B shows these same elements in conjunction with large blind 25.

As evident in FIGS. 5A and 5B, gearmotor 85 is rotatably coupled to tilt-adjustment shaft 18, so that rotation of output sleeve 86 causes shaft 18 to rotate. It can be seen that the torque required for this rotation must be reacted by headrail 16, in order for bracket 80 to remain substantially stationary when gearmotor 85 is in operation. This imposes two requirements on the structure shown in FIGS. 5A and 5B:

the attachment between gearmotor 85 and bracket 80 must constrain the rotation of gearmotor 85 in a plane perpendicular to the axis of rotation of output sleeve 86, and the attachment between bracket 80 and headrail 16 must constrain the rotation of bracket 80 in a plane perpendicular to the axis of rotation of tilt-adjustment shaft 18.

It is also evident in FIGS. 5A and 5B that the variation in the height of headrail 16, and in the length, location, and orientation of tilt-adjustment shaft 18, among blinds 24 and 25 results in a corresponding variation in the displacement between the top edge of front wall 16A of headrail 16 and the exposed end of tilt-adjustment shaft 18. Therefore, since bracket 80 is located in the vertical dimension by the top edge of front wall 16A of headrail 16, there will be a corresponding variation in the displacement between output sleeve 86 of gearmotor 85 and the exposed end of tilt-adjustment shaft 18. In addition, as a result of the variation in the orientation of tilt-adjustment shaft 18 among extant blinds, there will be a corresponding variation in the angular displacements between the axes of rotation of output sleeve 86 and tilt-adjustment shaft 18. Torque must be transferred from output sleeve 86 to tilt-adjustment shaft 18 over these varying linear and angular displacements, in order to ensure compatibility with a wide range of extant blind types.

GENERAL ARRANGEMENT—FIGS. 5A AND 5B

As shown in FIGS. 5A and 5B, these requirements are met in the preferred embodiment by the combination of rubber rivets 87A and 87B, output sleeve 86, and drive shaft 88. As previously stated, rubber rivets 87A and 87B attach gearmotor 85 to bracket 80. Rubber rivets 87A and 87B allow gearmotor 85 to pivot about an axis which is very close to a line connecting rubber rivets 87A and 87B, thus providing a flexible mount for gearmotor 85. This permits a corresponding variation in the inclination of the axis of rotation of output sleeve 86, relative to headrail 16. However, rubber rivets 87A and 87B constrain the rotation of gearmotor 85 in a plane perpendicular to the axis of rotation of output sleeve 86, thus causing the torque produced by gearmotor 85 to be reacted by bracket 80. In addition, since bracket 80 is attached to headrail 16 via lip 103 and thumbscrew 84, rotation of bracket 80 in an axis perpendicular to the axis of rotation of tilt-adjustment shaft 18 is also constrained. Thus, torque produced by gearmotor 85 is reacted by headrail 16.

The relative dimensions of output sleeve 86 and base shaft 89 are such that base shaft 89 is slidably captured within output sleeve 86, so that base shaft 89 may be extended toward, or retracted away from, headrail 16. Thus, output sleeve 86 and base shaft 89 constitute an extensible coupling, enabling torque to be transmitted over a variable distance from output sleeve 86 to tilt-adjustment shaft 18.

It is evident, therefore, that the combination of these two mechanisms (i.e., angular flexibility as a result of rivets 87A and 87B, and linear extensibility as a result of output sleeve 86 and base shaft 89) allow torque to be transferred from output sleeve 86 to any point in a predetermined pie-shaped portion of the plane containing the axes of rotation of tilt-adjustment shaft 18 and output sleeve 86, while causing the torque produced by gearmotor 85 to be reacted by headrail 16. This allows torque to be brought from output sleeve 86 to the exposed end of tilt-adjustment shaft 18 of both small blind 24 and large blind 25.

Flexible coupling 90 allows coupling tube 91 to assume a variable inclination relative to base shaft 89. Coupling tube 91 fits over, and is coupled to, tilt-adjustment shaft 18 (details of the method of coupling will be subsequently described in detail). Therefore, flexible coupling 90 allows torque to be transferred from base shaft 89 to tilt-adjustment shaft 18 in the presence of varying angular displacements between the axes of rotation of base shaft 89 and tilt-adjustment shaft 18.

FIG. 5A shows the operation of these elements in conjunction with headrail 16 of small venetian blind 24, which has a significant angle-of-inclination of tilt-adjustment shaft 18. In this circumstance, rubber rivets 87A and 87B are subject to very little bending, flexible coupling 90 is subject to a modest degree of bending, and base shaft 89 is extended from output sleeve 86 toward headrail 16. However, in FIG. 5B, the operation of these elements is shown in conjunction with headrail 16 of a large venetian blind which has a substantially vertical tilt-adjustment shaft 18. In this circumstance, rubber rivets 87A and 87B and flexible coupling 90 are subject to a relatively large degree of bending, and base shaft 89 is retracted away from headrail 16.

In order to accommodate most extant blinds, rubber rivets 87A and 87B must be capable of allowing inclinations of up to approximately 30 degrees, base shaft 89 must be of sufficient length to allow a range of extension and retraction of approximately 4 cm, and flexible coupling 90 must be capable of operating with up to 30 degrees of angular displacement between its ends. In addition, drive shaft 88 must be capable of transferring up to 0.3 newton-meters of torque (plus an appropriate safety margin) in both directions of rotation at up to approximately 60 RPM, and rubber rivets 87A and 87B must be capable of reacting this magnitude of torque without excessive deformation. A variety of conventional techniques are capable of meeting these requirements.

RUBBER RIVETS 87A AND 87B—FIGS. 5A TO 5C

In the preferred embodiment, rubber rivets 87A and 87B are of natural rubber. As shown in FIGS. 5A and 5B, rubber rivets 87A and 87B are displaced laterally and symmetrically about drive shaft 88. The lateral displacement of rubber rivets 87A and 87B enables them to react the torque developed by gearmotor 85 without undue deflection, while at the same time presenting a relatively small resistance to the desired inclination of gearmotor 85 shown in FIGS. 5A and 5B. As shown in FIG. 5C, rivet 87A is of substantially circular cross-section and has a groove 105 at each end. Bracket 80 has a hole 106 which has an inner diameter which is approximately equal to the outer diameter of rivet 87A at groove 105. Rivet 87A is attached to bracket 80 by insertion into hole 106, so that groove 105 is lodged in hole 106. This method of attachment is similar to that used for the rubber grommets which protect electrical cords emerging from metal cabinets in electronic equipment. Although FIG. 5C does not show rivet 87B, it is identical to rivet 87A and is attached to bracket 80 in the same manner. Also, although FIG. 5C does not show gearmotor 85, rivets 87A and 87B are attached to gearmotor 85 in the same manner as that shown for attachment to bracket 80.

Instead of rubber rivets 87A and 87B, the same objects could be achieved with a single larger rubber rivet of substantially rectangular cross-section, with the long dimension of said cross-section perpendicular to the axis of rotation of output sleeve 86, and the short dimension of said cross-section parallel to the axis of rotation of output sleeve 86. As another alternative to rivets 87A and 87B, a flexible mount for gearmotor 85 could also be achieved with a hinge, such as a one-piece plastic hinge of the type used in low-cost plastic containers. Such a hinge could be attached to bracket 80 and gearmotor 85 with adhesives, such as epoxy, with the hinge axis parallel to a line connecting rivets 87A and 87B.

DRIVESHAFT 88—FIGS. 5D TO 5F

Referring to FIGS. 5D to 5F, a preferred embodiment of drive shaft 88 is now described in detail. As shown in FIG. 5D, drive shaft 88 includes base shaft 89, flexible coupling 90, coupling tube 91, a first adapter 107, and a second adapter 108. Base shaft 89 is joined to flexible coupling 90 via first adapter 107, and flexible coupling 90 is joined to coupling tube 91 via second adapter 108. These elements are now described in turn.

BASE SHAFT 89—FIGS. 5A AND 5D

Requirements—FIG. 5A

As previously stated, sleeve 86 and shaft 89 provide a linearly extensible rotary coupling. There are very many applications for such couplings, and many extensible torque coupling configurations are known in the art. For example, a splined shaft engaging a grooved sleeve provides an extensible rotary coupling in some automotive driveshafts; similarly, base shaft 89 could be splined, with mating spurs or projections in the aperture of sleeve 86. Relative to conventional applications of extensible couplings, however, the requirements of the coupling provided by sleeve 86 and shaft 89 are modest: operating speed and torque are low, and the capability for linear extensibility simultaneous with rotation is not required. Therefore, while any of a variety of well-known configurations could be used, the configuration of base shaft 89 and output sleeve 86 should be made primarily on the basis of cost.

Preferred Embodiment—FIG. 5D

As shown in FIG. 5D, base shaft 89 has a hexagonal cross-section (to fit slidably within the hexagonal aperture of output sleeve 86, as previously shown in FIG. 5A). There are three primary criteria in the selection of material and cross-sectional area of base shaft 89. First, base shaft 89 must be capable of withstanding the desired torque without damage (e.g., rounding of the corners of the hexagonal cross-section) or substantial temporary deformation. Accordingly, the cross-sectional area will depend on the choice of material, with softer and weaker materials (such as plastic) demanding a larger cross-section, while harder and stronger materials (e.g., metal) permit smaller cross-sections. A second criterion is the ease of attachment to flexible coupling 90; thus, the selection of material of base shaft 89 partly depends on the material used in flexible coupling 90. A third criterion is the ease and cost of making the surfaces of base shaft 89 smooth and straight, so that base shaft 89 can slide within output sleeve 86 (previously shown in FIG. 5A) without undue friction. In the preferred embodiment, base shaft 89 is of plastic, with cross-sectional area of 75 $mm^2$. Alternatives include lightweight solid metals (such as aluminum alloys) and hollow tubes of aluminum, brass, or steel.

FLEXIBLE COUPLING 90

Requirements—FIG. 5D

As previously stated, the primary requirement of flexible coupling 90 is that it be capable of withstanding the desired torque—up to approximately 0.3 newton-meters in the preferred embodiment-in both directions of rotation, over operating angles of up to approximately 30 degrees. It is also desirable that the overall length of flexible coupling 90 be minimized in order to minimize the overall length of drive shaft 88 (and, hence, to minimize the overall size of bracket 80). In three important respects, the requirements for flexible coupling 90 are less stringent than those of the flexible couplings used in other applications. First, flexible coupling 90 need be capable of only intermittent, infrequent operation, with a maximum continuous operating duration of less than approximately one minute, and total daily operating time of less than several minutes. Second, in terms of total accumulated operating time, flexible coupling 90 need have only a relatively short lifetime: over five years of typical operations of system 30, flexible coupling 90 can be expected to accumulate less than 100 hours of operating time. Third, flexible coupling 90 need be capable of only relatively low operating speeds, e.g. less than 100 RPM. Many well-known techniques are capable of meeting these requirements. Such techniques include universal joints, elastomeric couplings, and flexible shafts. However, with the exception of some types of flexible shafts, these techniques can be costly. In addition to potentially low cost, flexible shafts offer the advantage of tolerance to linear misalignments. Although not strictly necessary, such tolerance enables relaxation of the requirements associated with rubber rivets 87A and 87B. Therefore, it is expected that typical embodiments of flexible coupling 90 will be based on use of a flexible shaft.

Many types of flexible shafts are known in the art. In applications where torque must be flexibly transmitted over relatively long distances, such as in automotive speedometer drive cables and flexible extensions for rotary power tools, a rotating wire core housed within a fixed casing is frequently used. Such flexible shafts are easily capable of meeting the torque and angular flexibility requirements of flexible coupling 90. However, the primary advantage of this type of shaft (the ability to flexibly transmit torque over relatively long distances) is not required of flexible coupling 90, and adds unnecessarily to the complexity and cost of the shaft design. Many potentially less-expensive types of flexible shaft, capable of only short-distance torque transmission, are also known in the art; these include wire springs, solid rubber tubes, and hollow rubber tubes with wire cores. Any of these may be effectively used in flexible coupling 90, with the choice made in accordance with conventional practice in order to meet the previously stated requirements with minimum cost.

Preferred Embodiment—FIG. 5D

In the preferred embodiment, flexible coupling 90 consists of two concentric coiled wire springs with windings in opposing directions. The opposing windings enable the coupling to withstand torque in both directions of rotation. The design of this type of flexible shaft is well-described in the literature and is available commercially (e.g., as the model A 5Z26-0404 Spring Coupling, which includes a single wire spring, or the model A 5C 5-1804 Uniflex Coupling, which includes three concentric coiled wire springs wound in alternating directions, both models being distributed by the Stock Drive Products Division of Designatronics, Inc.). This type of shaft is also used in some commercial products, such as the flexible extensions used between a handle and a bit in some rotary hand tools. The choice of wire type, wire diameter, coil radius, coil length, and other factors germane to the design of flexible coupling 90 can be made in accordance with conventional practice. In the preferred embodiment, the attachment between flexible coupling 90 and base shaft 89 is made via first adapter 107. First adapter 107 is of metal, and has an upper part which is in the shape of round tube of dimensions such that it can be press-fit over the bottom-most part of flexible coupling 90.

After such press-fitting, flexible coupling 90 and first adapter 107 are secured together by brazing or soldering. First adapter 107 has a bottom part which is in the shape of a tube of hexagonal cross-section, with dimensions such that first adapter 107 can be press-fit on the upper-most end of base shaft 89. After such press-fitting, first adapter 107 and base shaft 89 are secured together by an epoxy or cyanoacrylate adhesive. Optionally, a pin (not shown) can be inserted through first adapter 107 and base shaft 89 to further secure the joint.

COUPLING TUBE 91

Purpose and General Arrangement—FIGS. 5E and 5F

The purpose of coupling tube 91 is to demountably join flexible coupling 90 to tilt-adjustment shaft 18 of the host venetian blind. In the preferred embodiment, shown in FIG. 5E, coupling tube 91 is a metal tube with a slot 109A and a slot 109B, such that a line passing through the center of slots 109A and 109B also passes through, and is perpendicular to, the long axis of coupling tube 91, and such that the long axes of slots 109A and 109B are parallel to the long axis of coupling tube 91. The bottom part of coupling tube 91 is attached to flexible coupling 90 via second adapter 108. Second adapter 108 is of metal and has an upper end of circular cross-section, with outer diameter such that it can be press-fit over the lower end of coupling tube 91. Second adapter 108 has a lower-end of circular cross-section, with inner diameter such that it can be press-fit over the top-most part of flexible coupling 90. After such press-fitting, second adapter 108 is joined to flexible coupling 90 and coupling tube 91 by brazing or soldering.

The preferred embodiment of coupling tube 91 also includes a D-clip 110, which includes pin 111 and strip 112. Pin 111 is a solid rod of relatively strong metal, such as steel, and has a length slightly greater than the outer diameter of coupling tube 91. Strip 112 is of metal which has been formed into a resilient, approximately semi-circular arc of inner radius approximately equal to the outer radius of coupling tube 91. Then, in order to attach coupling tube 91 to tilt-adjustment shaft 18, the exposed end of tilt-adjustment shaft 18 is inserted into the upper end of coupling tube 91, and tilt-adjustment shaft 18 is rotated so that hole 23 is aligned with slots 109A and 109B. Finally, pin 111 of D-clip 110 is inserted through slot 109A, hole 23 of tilt-adjustment shaft 18, and slot 109B, so that metal strip 112 is snapped into place around coupling tube 91, as shown in FIG. 5F.

Dimensions—FIGS. 1E and 5E

The design of coupling tube 91 and D-clip 110 must accommodate the variation in length and diameter of tilt-adjustment shaft 18 among extant blinds. It must also accommodate the variation in the location and diameter of hole 23. Accordingly, the inner diameter of coupling tube 91 must be slightly greater than the maximum expected diameter of tilt-adjustment shaft 18, and the diameter of pin 111 must be slightly smaller than the minimum expected diameter of hole 23. The width of slots 109A and 109B should be slightly greater than the diameter of pin 111. There are three constraints on the length and vertical location of slots 109A and 109B. First, the vertical distance between the bottom edges of both slots 109A and 109B and the bottom of coupling tube 91 should be slightly greater than the minimum expected distance between hole 23 and the bottom of tilt-adjustment shaft 18. Second, the vertical distance between the top edges of both slots 109A and 109B and the bottom of coupling tube 91 should be slightly greater than the maximum expected distance between hole 23 and the bottom of tilt-adjustment shaft 18. Third, the vertical distance between the top edges of both slots 109A and 109B and the top of coupling tube 91 should be slightly less than the minimum expected distance between hole 23 and the top of the exposed part of tilt-adjustment shaft 18 (i.e., the point at which tilt-adjustment shaft 18 emerges from headrail 16, as was shown in FIG. 1E). In the preferred embodiment, coupling tube 91 has an inner diameter of 7 millimeters and a length of 34 millimeters, pin 111 has a diameter of 1.5 millimeters, the bottom edges of slots 109A and 109B are 4 millimeters from the bottom of coupling tube 91, and the top edges of slots 109A and 109B are 4 millimeters from the top edge of coupling tube 91, for an overall slot length of 26 millimeters. These dimensions enable coupling tube 91 to fit tilt-adjustment shaft 18 of a wide variety of extant blind types.

Alternative, Advantageous Torque Coupling Approaches

As previously shown in FIGS. 5A to 5C, drive shaft 88, in conjunction with bracket 80 and rivets 87A and 87B, enables torque to be transferred from gearmotor 85 to tilt-adjustment shaft 18 over the varying linear and angular displacements resulting from variations in the design of extant blinds, while causing this torque to be reacted by headrail 16. The same object can also be accomplished with other approaches.

In order for headrail 16 to react the torque produced by gearmotor 85, these alternative approaches—like the preferred approach shown in FIGS. 5A to 5C—must:

- constrain the rotation of gearmotor 85, with respect to bracket 80, in a plane perpendicular to the axis of rotation of output sleeve 86, and
- constrain the rotation of bracket 80, with respect to headrail 16, in a plane perpendicular to the axis of rotation of tilt-adjustment shaft 18.

In addition, in order to rotatably couple gearmotor 85 to tilt-adjustment shaft 18 in the presence of a range of dimensions of headrail 16, and of lengths, locations, and orientations of tilt-adjustment shaft 18, these alternative approaches must include, at a minimum:

- at least one element providing angular variability, either in the mounting of gearmotor 85, or in the coupling between gearmotor 85 and tilt-adjustment shaft 18, at the time of installation on the host blind; and
- at least one element providing linear variability, in at least one axis, either in the mounting of gearmotor 85, or in the coupling between gearmotor 85 and tilt-adjustment shaft 18, at the time of installation on the host blind.

In addition, the sum of the number of elements providing angular variability and the number of axes of linear variability must be at least three, at the time of installation on the host blind. After installation, this criterion does not apply. Thus, viable approaches must initially (i.e., at the time of installation on the host blind) provide either:

- two elements or degrees of angular variability, and one axis of linear variability, or
- one element or degree of angular variability, and two axes of linear variability.

The preferred approach shown in FIGS. 5A to 5F falls in the former category. However, other embodiments in both categories are possible, and may be preferable to that shown in FIGS. 5A to 5F in certain applications.

TELESCOPING DRIVESHAFT WITH TWO FLEXIBLE SECTIONS—FIGS. 6A TO 6C

One alternative approach is shown in FIGS. 6A to 6C. In this approach, a telescoping, flexible shaft section, comprising a second flexible coupling 113, a hexagonal tube 114, an input tube 115, and a third adapter 116, is added to the previously described drive shaft 88. This provides two elements of angular variability and one axis of linear variability. Input tube 115 is of metal, e.g. steel, has a circular cross-section, and has a threaded hole (not shown) to accept a metal set-screw (not shown) of conventional design. Second flexible coupling 113 is similar to the previously described flexible coupling 90. Input tube 115 and second flexible coupling 113 are joined by an appropriate conventional technique, such as brazing or soldering. Hexagonal tube 114 is of metal, such as brass, aluminum, or steel, and has a cross-section large enough so that it telescopes on base shaft 89 of drive shaft 88. Third adapter 116 is of metal and has a lower end of substantially circular cross-section of dimensions such that third adapter 116 can be press-fit on the upper end of second flexible coupling 113. Third adapter 116 has an upper end of hexagonal cross-section with dimensions such that it can be press-fit on the lower end of hexagonal tube 114. Second flexible coupling 113 and third adapter 116 are joined by an appropriate conventional technique, such as brazing or soldering. Third adapter 116 and hexagonal tube 114 are also joined by an appropriate conventional technique, such as brazing, soldering, or epoxy adhesives.

As shown in FIG. 6C, gearmotor 85 is equipped, in this alternative approach, with an output shaft 117 (instead of the previously shown output sleeve 86). Output shaft 117 is of metal (e.g., steel), has a circular cross-section, and has a flattened upper-end of dimensions such that it can be inserted into the lower end of input tube 115. The flattened upper-end of output shaft 117 provides a surface on which the aforementioned set-screw (not shown) of input tube 115 can bear, securing input tube 115 to output shaft 117. No rubber rivets or hinges are required in this approach; gearmotor 85 is rigidly mounted to bracket 80 (not shown) via conventional means, so that torque produced by gearmotor 85 is reacted by bracket 80 and, hence, by headrail 16.

FIG. 6A shows drive shaft 88 relatively retracted from hexagonal tube 114, while FIG. 6B shows drive shaft 88 relatively extended from hexagonal tube 114.

Thus, it can be seen that that the telescoping action of base shaft 89 and hexagonal tube 114, in conjunction with the angular flexibility provided by flexible coupling 90 and second flexible coupling 113, enable torque to be transferred from gearmotor 85 to coupling tube 91 over varying linear and angular displacements. The advantage of this approach over that shown in FIGS. 5A to 5C is that it permits rigid mounting of gearmotor 85 to bracket 80 (not shown); no rubber rivets or hinges are required. This could result in a reduction in the size of system 30, since no clearance need be provided around gearmotor 85 to accommodate its movement. However, the approach shown in FIGS. 6A to 6C will likely prove more costly than that shown in FIGS. 5A to 5C, since the cost of second flexible coupling 113, hexagonal tube 114, input tube 115, and adapter 116 (shown in FIGS. 6A to 6B) will be substantially greater than the cost of rubber rivets 87A and 87B (shown in FIGS. 5A to 5C.

MOVEABLE/FLEXIBLE GEARMOTOR MOUNT WITH FLEXIBLE COUPLING

GENERAL ARRANGEMENT—FIG. 6D

A third potentially-advantageous approach is shown in FIG. 6D. In this approach, the designs of previously shown bracket 80, gearmotor 85, and drive shaft 88 are modified. Bracket 80 is modified to include flanges 118A and 118B which extend perpendicularly from the major surface of bracket 80. Flanges 118A and 118B are identical, and can be conveniently formed by making an H-shaped cut in bracket 80 (with the two parallel cuts perpendicular to the centerline of bracket 80, and the center cut along the major axis of bracket 80), and then bending the two resulting ears of metal outward. This will have the effect of enlarging cut-out 82 and changing its shape from the substantially rectangular shape shown previously, to that shown in FIG. 6D. Flange 118A has a locating slot 119A, and flange 118B has a locating slot 119B. Gearmotor 85 has a side plate 120A and a side plate 120B. Side plates 120A and 120B are identical and can be of any convenient material. Side plate 120A has a guide pin 121A, and slide plate 120B has a guide pin 121B (not shown). Guide pins 121A and 121B are of metal and are removably threaded into side plates 120A and 120B. The distance between the inner surfaces of flanges 118A and 118B is slightly greater than the distance between the outer surfaces of side plates 120A and 120B, so that gearmotor 85 can slide between flanges 118A and 118B, with side plate 120A in proximity to flange 118A and side plate 120B in proximity to flange 118B. The dimensions of guide pins 121A and 121B are such that, when gearmotor 85 is placed in the aforementioned position between flanges 118A and 118B, guide pin 121A projects through locating slot 119A and guide pin 121B (not shown) projects through locating slot 119B. Gearmotor 85 is further modified to directly drive flexible coupling 90, second adapter 108, and coupling tube 91. Flexible coupling 90 is attached to the output shaft (not shown) of gearmotor 85 via conventional means. The design of flexible coupling 90, adapter 108, and coupling tube 91, and the attachments therebetween, are as have been previously described.

USE WITH CONVENTIONAL VENETIAN BLINDS—FIGS. 6E AND 6F

FIG. 6E shows the aforementioned elements in conjunction with large conventional venetian blind 25, while FIG. 6F shows the elements in conjunction with small conventional venetian blind 24. The attachment between coupling tube 91 and tilt-adjustment shaft 18 is has been previously shown in FIGS. 5E and 5F.

It can be seen that flanges 118A and 118B, together with side plates 120A and 120B, allow gearmotor 85 to move linearly in a plane parallel to flanges 118A and 118B, with such movement limited by guide pins 121A and 121B (not shown) and locating slots 119A and 119B. Thus, these elements constitute a moveable mount for gearmotor 85, which provides two axes of linear variability in the position of gearmotor 85. It can also be seen that gearmotor 85 is free to rotate about an axis parallel to a line connecting guide pins 121A and 121B. Thus, these elements constitute a flexible mount for gearmotor 85, which provides one degree of angular variability in the orientation of the axis of rotation of gearmotor 85.

It is evident, therefore, that gearmotor 85 can be easily moved into such a position that coupling tube 91 can be placed over tilt-adjustment shaft 18 of large venetian blind 25 (as shown in FIG. 6E) or small venetian blind 24 (as shown in FIG. 6F). However, due to the presence of flanges 118A and 118B, gearmotor 85 cannot move from side-to-side, and cannot rotate about an axis parallel to its output shaft (not shown). Thus, gearmotor 85 is positively located in the lateral dimension, and is constrained from rotating in a plane perpendicular to the axis of rotation of the lower part of coupling 90. Thus, the operating torque of gearmotor 85 is reacted by flanges 118A and 118B (and, hence, by headrail 16).

In FIG. 6E, gearmotor 85 is at a relatively low position on bracket 80, with guide pin 121A near the bottom of slot 119A. This is necessary because tilt-adjustment shaft 18 extends downward for a relatively long distance from the top of headrail 16. Also, gearmotor 85 is relatively close to louvers 17, so that guide pin 121A is against the vertical edge of slot 119A which is nearest to louvers 17. In addition, gearmotor 85 is rotated about an axis parallel to headrail 16, so that the gearmotor 85 is inclined toward louvers 17. This is necessary because of the substantially vertical orientation of tilt-adjustment shaft 18 of blind 25, and also because of the fact that shaft 18 projects from the bottom, and not the front, surface of headrail 16.

However, in FIG. 6F, gearmotor 85 is at a relatively high position on bracket 80, with guide pin 121A near the top of slot 119A This is necessary because tilt-adjustment shaft 18 extends downward for a relatively short distance from the top of headrail 16. Also, gearmotor 85 is relatively far from louvers 17, so that guide pin 121A is against the vertical edge of slot 119A which is farthest to louvers 17. This is necessary because of the inclined orientation of tilt-adjustment shaft 18, which causes shaft 18 to project a substantial distance from the front of headrail 16 in a direction away from louvers 17.

DIMENSIONS—FIGS. 6D TO 6F

Thus, it can be seen that gearmotor 85 can be rotatably coupled tilt-adjustment shaft 18, and that the torque produced by gearmotor 85 can be reacted by headrail 16, over a wide range of dimensions of headrail 16 and of lengths and orientations of tilt-adjustment shaft 18. The extent of this range is established by the dimensions of slots 119A and 119B. The height (i.e., long dimension) of slots 119A and 119B should be slightly larger than the maximum expected variation in the vertical projection of the displacement between the top edge of the front wall of headrail 16 and the bottom of tilt-adjustment shaft 18. The width (i.e., short dimension) of slots 119A and 119B should be slightly larger than the maximum expected variation in the horizontal projection of the displacement between the top edge of the front wall of headrail 16 and the bottom of tilt-adjustment shaft 18. In the preferred embodiment of the approach shown in FIGS. 6D to 6F, slots 119A and 119B are 45 millimeters high, and 20 millimeters wide. Flanges 118A and 118B should be made as small as possible while still allowing enough metal around slots 119A and 119B to ensure structural rigidity; this will depend on the type and thickness of the metal used in bracket 80. A perimeter of approximately 4 millimeters of metal will be sufficient in typical embodiments. The location of slots 119A and 119B (and, hence, the locations of flanges 118A and 118B) relative to the top of bracket 80 will depend on factors such as the dimensions of gearmotor 85 and the lengths of flexible coupling 90, adapter 108, and coupling tube 91.

In general, the positions of slots 119A and 119B should satisfy two constraints. First, referring to FIG. 6F, the top edges the top edges of slots 119A and 119B should be located so that, when guide pin 121A is against the top edge of slot 119A, the distance between the top of bracket 80 and the bottom of coupling tube 91 should be approximately equal to the minimum expected distance between the top edge of headrail 16 and the bottom of tilt-adjustment shaft 18. Second, the vertical edges of slots 119A and 119B which are farthest from louvers 17 should be located so that, when guide pin 121A is against said vertical edge of slot 119A, the horizontal projection of the distance between the main surface of bracket 80 and the bottom of coupling tube 91 should be approximately equal to the maximum expected horizontal projection of the distance between the front surface of headrail 16 and the bottom of tilt-adjustment shaft 18.

VARIANT WITHOUT FLEXIBLE COUPLING 90—FIGS. 6D TO 6F

The embodiment shown in FIGS. 6D to 6F provides two mechanisms for angular variability (i.e. via flexible mounting of gearmotor 85 and flexible coupling 90) and two axes of linear variability (via movable mounting of gearmotor 85), for a total of four degrees of freedom. As previously stated, however, only three degrees of freedom are necessary to couple gearmotor 85 to shaft 18. Accordingly, referring again to FIG. 6F, it is evident that flexible coupling 90 is not absolutely necessary, and can be eliminated if the area (and particularly the width) of locating slots 119A and 119B is made sufficiently large. This would permit the output shaft (not shown) of gearmotor 85 to be aligned with tilt-adjustment shaft 18. However, while elimination of flexible coupling 90 would provide a significant cost savings, this approach has two disadvantages. First, the increase in the required area of slots 119A and 119B would result in a substantial increase in the overall size of system 30, which would be undesirable in some applications. Second, when used with blinds which have a near-vertical orientation of tilt-adjustment shaft 18 (as shown in FIG. 6E), there would be a high probability of interference between gearmotor 85 and louvers 17. Despite these disadvantages, this approach may be desirable in applications which are especially cost-sensitive.

FLOATING ATTACHMENT BETWEEN BRACKET 80 AND HEADRAIL 16

The approach previously shown in FIGS. 6D to 6F includes a moveable and flexible mount for gearmotor 85 to provide two axes of linear in the position of gearmotor 85, and one axis of variability in the orientation of gearmotor 85 (relative to headrail 16), while enabling the torque produced by gearmotor 85 to be reacted by headrail 16. In the approach of FIGS. 6D to 6F, bracket 80 is rigidly attached to headrail 16; the variation in the position and orientation of gearmotor 85 occurs in the mounting of gearmotor 85 to bracket 80. However, a variable position and orientation of gearmotor 85 (relative to headrail 16) can also be obtained by rigidly attaching gearmotor 85 to bracket 80, and incorporating the required moveability and flexibility into the attachment or contact between bracket 80 and headrail 16.

BRACKET 80 BEARING AGAINST FRONT WALL 16A, WITH DIRECT COUPLING OF GEARMOTOR 85 TO SHAFT 18

General Arrangement and Use With Conventional Blinds—FIGS. 6G and 6H

One such approach is shown in FIGS. 6G and 6H. FIG. 6G shows the approach in conjunction with small conventional venetian blind 24, while FIG. 6H shows the approach in conjunction with large conventional venetian blind 25.

In this approach, bracket 80 has no lip 103; instead, cutout 82 forms a notch in the upper part of bracket 80, so that the upper part of bracket 80 forms two metal fingers, each of which bears against front wall 16A. Further, bracket 80 is made of a resilient metal, such as spring steel. Gearmotor 85 is rigidly mounted to bracket 80 and directly drives coupling tube 91 via adapter 108. The design of gearmotor 85, adapter 108, and coupling tube 91 are as have been previously described for the embodiment of FIG. 6D. Not shown is the method of attachment between coupling tube 91 and tilt-adjustment shaft 18; this attachment is as was previously shown in FIGS. 5E and 5F.

It can be seen that the primary attachment between bracket 80 and headrail 16 is via the coupling between gearmotor 85 and tilt-adjustment shaft 18; there is no direct, fixed attachment between bracket 80 and headrail 16;

instead, contact between front wall 16A and bracket 80 serves only to resist the rotation of gearmotor 85 about its axis of rotation (and thus enable headrail 16 to react the torque produced by gearmotor 85).

Since bracket 80 is not rigidly attached to headrail 16 but only bears against front wall 16A, bracket 80 is free to assume any height relative to headrail 16 that is required to mate coupling tube 91 with tilt-adjustment shaft 18. Also, it is apparent that resiliency in the metal fingers of bracket 80 provide a mechanism for variation in distance between bracket 80 and the plane containing louvers 17. Thus, bracket 80 provides two axes of linear variability in the position of gearmotor 85 with respect to headrail 16. Also, it can be seen that the lower part of bracket 80 does not necessarily have a vertical orientation, but instead assumes an angle of inclination which is determined by that of tilt-adjustment shaft 18. Thus, bracket 80 provides one axis of angular variability in the orientation of gearmotor 85 relative to headrail 16. Therefore, this embodiment effectively provides two axes of variability in the position, and one axis of angular variability in the orientation, of gearmotor 85 relative to headrail 16, enabling gearmotor 85 to be coupled to shaft 18 in the presence of a variation in the dimensions of headrail 16, and of the length, location, and orientation of shaft 18.

FIG. 6H shows these elements mounted on small conventional venetian blind 24. Since tilt-adjustment shaft 18 is inclined from the vertical, bracket 80 is also inclined. However, FIG. 61 shows these elements mounted on large conventional blind 25; in this case, both shaft 18 and bracket 80 have an approximately vertical orientation.

Dimensions and Miscellaneous Considerations—FIGS. 6G and 6H

The dimensions of coupling tube 91 are as have been previously described. Other dimensions are noncritical, but some care must be taken in establishing the distance between the upper end of bracket 80 and the upper end of coupling tube 91. This distance should be established according to two criteria:

- the top of bracket 80 must be below the upper edge of front wall 16A for the shortest expected height of front wall 16A and the shortest expected length of the exposed portion of tilt-adjustment shaft 18, and
- the top of bracket 80 must be above the lower edge of front wall 16A for the longest expected length of the exposed portion of tilt-adjustment shaft 18.

These criteria cannot be met for all extant blind types, and some compromise is required. A distance of approximately 4 cm between the top of bracket 80 and the upper-end of coupling tube 91 will be sufficient for most small blinds.

The shape of the metal fingers at the top of bracket 80 is non-critical, but the bearing surfaces of bracket 80 (i.e., the portions of bracket 80 which bear against front wall 16A) should preferably be slightly convex (to provide good contact with front wall 16A over a range of orientations of bracket 80) and covered with a paint or other material having a high static coefficient of friction (to minimize slipping of the bearing surfaces due to twisting forces on bracket 80 caused by the torque produced by gearmotor 85).

Limitations—FIGS. 6G and 6H

While the arrangement shown in FIGS. 6G and 6H is potentially the simplest and least expensive of the alternatives shown, it is less advantageous than the other embodiments in some significant respects. First, it can accommodate only a relatively narrow range of blind sizes and types. Second, it requires that tilt-adjustment shaft 18 support the entire weight of the system, while simultaneously reacting the contact force between front wall 16A and the metal fingers at the top of bracket 80. This can cause binding and premature wear of the tilt-adjustment mechanism (not shown) inside headrail 16. Third, it imposes significant bending loads on the attachment between tilt-adjustment shaft 18 and coupling tube 91, which can result in jerky operation unless shaft 18 is a relatively tight fit within tube 91. Fourth, due to the resilience of the upper part of bracket 80, there will be a tendency for bracket 80 to twist about the axis of rotation of shaft 18—and for the lower part of bracket 80 to shift laterally and the bearing surfaces of bracket 80 to slip against front wall 16A—when gearmotor 85 is delivering a relatively high torque. Fifth, the lower part of bracket 80 will protrude outward from louvers 17 to a relatively great extent when tilt-adjustment shaft 18 is substantially inclined from the vertical (as shown, for example, in FIG. 6G).

However, the aforementioned limitations of this embodiment may be overcome by the potential cost advantages in some applications. For example, the aforementioned limitations will be quite tolerable if the embodiment is to be used only with high-quality micro-blinds (which require relatively little torque for tilt adjustment, and which have a relatively small range of dimensions of headrail 16 and tilt-adjustment shaft 18).

Variant Using Hinge—FIGS. 6G and 6H

Some of the disadvantages of the embodiment shown in FIGS. 6G and 6H can be overcome with the addition of a hinge (not shown), having an axis of flexibility which is parallel to the long dimension of said headrail, and an adhesive attachment (or other conventional attachment, such as magnets or self-tapping screws). One side of the hinge is attached to the upper part of bracket 80, and the other side adhesively attached to front wall 16A. After such adhesive attachment, this configuration provides one axis of angular variability (via flexing of the hinge) and one (horizontal) axis of linear variability (via flexing of the springable upper portion of bracket 80, which permits bracket 80 to move toward or away from the plane containing louvers 17). However, prior to the adhesive attachment between the hinge and front wall 16A, there is another, vertical, axis of linear variability, since the hinge can be attached at an arbitrary height on front wall 16A. These three axes of variability are sufficient to couple gearmotor 85 to tilt-adjustment shaft 18 over a modest range of dimensions of headrail 16 and of lengths, locations, and orientations of shaft 18.

The use of a hinge provides two significant benefits over the hingeless embodiment shown in FIGS. 6G and 6H. First, a portion of the weight of bracket 80 and the elements thereon can be borne by headrail 16, reducing the load on shaft 18. Second, the adhesive (or other conventional) attachment between bracket 80 and front wall 16A reduces the risk of slippage, and increases the torque-reacting ability of the embodiment. However, the use of an adhesive attachment is also potentially a disadvantage, since it could be difficult or impossible to remove, and could result in marring of the surface of front wall 16A.

USE OF MEMBER 99 TO ATTACH BRACKET 80 TO FRONT WALL 16A—FIGS. 6I AND 6J

Figure 6J:
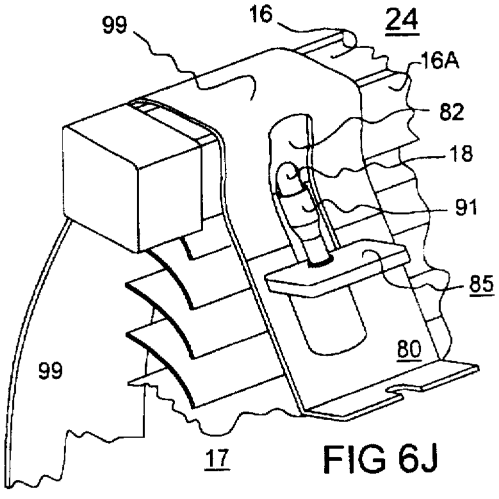

General Arrangement and Use With Conventional Blinds—FIGS. 61 and 6J

FIGS. 6I and 6J show another approach which uses incorporates two axes of linear variability and one axis of angular variability in the attachment of bracket 80 to headrail 16. FIG. 6I shows the approach in conjunction with large conventional venetian blind 25, while FIG. 6J shows the approach in conjunction with small conventional venetian blind 24. Although not shown in FIGS. 6I or 6J, the attachment between coupling tube 91 and tilt-adjustment shaft 18 is as was previously shown in FIGS. 5E and 5F.

The approach of FIGS. 6I and 6J is similar to that shown in FIGS. 6G and 6H, except that bracket 80 is indirectly attached to headrail 16 via member 99. Member 99 is a long, thin member of flexible construction, such that it is capable of bending about a plurality of axes which are parallel to the long dimension of headrail 16. Member 99 will be described in detail subsequently. The combination of member 99 and bracket 80 includes cut-out 82. Bracket 80 and member 99 are joined conventionally (for example, with an adhesive). A portion of the undersurface of member 99 bears against front wall 16A, and this surface of member 99 is attached to front wall 16A with an adhesive. This enables the torque produced by gearmotor 85 to be reacted by headrail 16, and—in contrast to the approach of FIGS. 6G and 6H—enables headrail 16 to support a portion of the weight of bracket 80 and the elements thereon.

Thus, bracket 80 is flexibly mounted to headrail 16, with the plurality of axes of flexibility inherent in member 99 providing at least two axes of variability in the orientation of gearmotor 85 relative to headrail 16.

In addition, although the distance between gearmotor 85 and headrail 16 is fixed after the bearing surface of member 99 is adhesively joined to front wall 16A, this distance can be varied arbitrarily (within predetermined limits) prior to the adhesive attachment of member 99 to front wall 16A, by varying the vertical position of bracket 80 with respect to headrail 16 until the desired position is reached. Thus, the embodiment of FIGS. 61 and 6J provides one axis of linear variability in the initial mounting of gearmotor 85 relative to headrail 16.

Thus, vertical movement prior of bracket 80 prior to adhesive attachment of member 99 to front wall 16A, together with the multiple axes of flexibility inherent in member 99, provides three degrees of freedom in the mounting between gearmotor 85 and headrail 16, and enables gearmotor 85 to be coupled to tilt-adjustment shaft 18, over a wide range in dimensions of headrail 16, and in the length, location, and orientation of tilt-adjustment shaft 18.

FIG. 6I shows these elements mounted on large conventional blind 25. Since tilt-adjustment shaft 18 is substantially vertical, bracket 80 also has an approximately vertical orientation, and since headrail 16 is large and shaft 18 is long, gearmotor 85 is relatively far from the top edge of front wall 16A. Also, the need for multiple axes of flexibility in member 99 is evident in FIG. 6I: member 99 must bend at a point close to the bottom of headrail 16, and again near the top of bracket 80, in order to position gearmotor 85 close enough to louvers 17 so that coupling tube 91 can mate with shaft 18.

However, FIG. 6J shows these elements mounted on small conventional venetian blind 24; in this case, both shaft 18 and bracket 80 are inclined from the vertical, while gearmotor 85 is relatively close to the top edge of front wall 16A.

Dimensions—FIGS. 6I and 6J

The dimensions of coupling tube 91 are as have been previously described. The dimensions of cut-out 82 are as previously have been previously described for the embodiment shown in FIGS. 4A to 4C.

Limitations—FIGS. 6I and 6J

Although only slightly more expensive than the embodiment shown in FIGS. 6G and 6H, this embodiment avoids the significant limitations associated with the former's use of tilt-adjustment shaft 18 to support the entire weight of bracket 80 and the elements mounted thereon. However, since member 99 is joined to front wall 16A with an adhesive, subsequent removal of member 99 will be difficult or impossible, and could mar the surface of front wall 16A. However, this will not be a problem in most applications. Since the adhesive attachment between the bearing surface of member 99 and front wall 16A is required to react the torque produced by gearmotor 85, a relatively strong adhesive must be used, but this requirement can be met by many modern adhesives. Like bracket 80 of the embodiment shown in FIGS. 6G and 6H, bracket 80 of the embodiment of FIGS. 6I and 6J will be subject to some twisting during operation, but this will only be objectionable in the context of low-quality blinds which require a relatively high torque to rotate shaft 18.

Another limitation is the potential for interference between bracket 80 and louvers 17, when tilt-adjustment shaft 18 is substantially vertical. This can be seen in FIG. 6I: bracket 80 must be very close to louvers 17 to align coupling tube 91 with shaft 18. This limitation can be mitigated by minimizing the lateral offset between the axis of rotation of coupling tube 91 and the undersurface of bracket 80. However, the minimum possible offset—which, in general, will be established by the radius of the output drive gear (not shown) within gearmotor 85—could still result in interference with louvers 17, when shaft 18 is substantially vertical. This will typically not be a serious problem, since most extant blinds have a significant inclination of shaft 18, as shown in FIG. 6J. This limitation can be eliminated (at some increase in cost) by adding a flexible coupling between gearmotor 85 and coupling tube 91, which would permit bracket 80 to be disposed sufficiently far from louvers 17 to avoid interference.

OTHER ALTERNATIVES

It is evident that extensible couplings and flexible couplings between gearmotor 85 and tilt-adjustment shaft 18, and flexible and moveable mountings of gearmotor 85 and bracket 80, can be combined in a variety of combinations to provide the required coupling between gearmotor 85 and tilt-adjustment shaft 18, while enabling headrail 16 to react the torque produced by gearmotor 85. While several advantageous combinations have been shown, other combinations are also possible. Referring to FIGS. 6A and 6B, for example, the need for the extensible coupling provided by the combination of base shaft 89 and hexagonal tube 114 could be eliminated by slidably mounting gearmotor 85 in vertical slots in bracket 80 (not shown), providing one dimension or axis of linear variability in the position of gearmotor 85 relative to bracket 80.

Many other viable and potentially advantageous embodiments will be apparent from the preceding discussion.

SELECTION OF OPTIMUM TORQUE COUPLING APPROACH—FIGS. 5A TO 5C, 6A TO 6C, AND 6D TO 6J

Several approaches have been shown for rotatably coupling gearmotor 85 to tilt-adjustment shaft 18 over a wide range of dimensions and configurations of the host blind, while enabling headrail 16 to react the torque produced by gearmotor 85. None of these approaches will be optimal in all applications.

The two approaches shown in FIGS. 6G to 6J use direct couplings of gearmotor 85 to tilt-adjustment shaft 18, and include means for varying the initial position (in two dimensions) and orientation of bracket 80 relative to headrail 16. These two approaches offer the potential for the lowest cost (since no flexible or extensible couplings are required) and the smallest system size, but could result in some twisting of bracket 80 while gearmotor 85 is in operation. Moreover, they are poorly suited for blinds in which rotation of tilt-adjustment shaft 18 requires a relatively high torque. Of these two approaches, that shown in FIGS. 6G and 6H is potentially less expensive, but imposes bending loads on tilt-adjustment shaft 18 which could lead to jerky operation and premature wear. Moreover, the approach of FIGS. 6G and 6H will have a relatively limited compatibility with the wide range of extant blind sizes and configurations, and slippage between the bearing surfaces of bracket 80 and front wall 16A at high torques could result in significant lateral movement of the lower portion of bracket 80. On the other hand, the approach of FIGS. 6I and 6J overcomes most of these limitations via adhesive attachment between the bearing surfaces of member 99 and front wall 16A, but involves a permanent attachment to host blind (or, at the least, one which could mar the surface of the headrail after removal). Both approaches shown in FIGS. 6G to 6J carry the risk of interference between bracket 80 and louvers 17 when shaft 18 is substantially vertical, but this limitation can be mitigated in the approach of FIGS. 6I and 6J by addition of a flexible coupling.

The other approaches shown involve a fixed position and orientation of bracket 80 relative to headrail 16. These other approaches are more expensive than that of FIGS. 6G to 6J, but—due to the use of lip 103 at the top of bracket 80—are capable of reacting a higher torque.

Of these other approaches, that shown in FIGS. 6D to 6F is potentially the least expensive, due to the absence of an extensible coupling and the need for only one flexible coupling. However, this approach will result in the largest overall size of the subject invention, since no components other than gearmotor 85 can be located in the space between flanges 118A and 118B—and this empty space will be a substantial fraction of the overall size of the system.

The approach shown in FIGS. 6A to 6C is potentially the most expensive of those shown, since it requires two flexible couplings as well as an extensible coupling. However, it offers the potential for a relatively small system size (although not as small as that of the approach shown in FIG. 6G to 6I).

Finally, the preferred approach shown in FIGS. 5A to 5C will have a cost and size which are intermediate to those of the approaches shown in FIGS. 6A to 6F.

In general, the approach shown in FIGS. 6I and 6J will be the optimal approach when a removable attachment to the host headrail is not required, and when a relatively high operating torques is not required. Otherwise, the approach shown in FIGS. 6D to 6F will be best when minimum cost is required, the approach shown in FIGS. 6A to 6C will be best when minimum size is required, and the approach shown in FIGS. 5A to 5C will be best when minimization of cost and size are more or less equally important.

Switch Assembly Comprising Actuating Body 94 And Switches 38 to 41—FIG. 7A The structure and operation of the switch assembly comprising actuating body 94 and related elements are now described in detail.

As shown in FIG. 7A, actuating body 94 comprises yoke 95, rod 96, and stem 97; rod 96 is inserted through bushing 98.

YOKE 95 AND ROD 96—FIG. 7A

In the preferred embodiment, yoke 95 and rod 96 are formed from a single piece of spring wire: rod 96 consists of a straight portion of wire, while yoke 95 consists of a portion of the same wire which has been bent into the appropriate shape. This shape has the following characteristics. First, the shape is symmetric about the centerline of rod 96. Second, the shape includes vertical legs 122A and 122B, which are laterally separated by a distance equal to the lateral displacement between the centers of the actuating buttons of switches 38 and 40. The length of vertical legs 122A and 122B is slightly greater than the height of switch 41 (which switch is identical to switch 39), plus a distance equal to the maximum displacement of the actuating button of switch 41. In establishing the length of vertical legs 122A and 122B, the height of switch 41 should be taken as the height of the smallest rectangular area which encloses the projection of switch 41 on a plane containing the surface of circuit board 92. The shape of yoke 95 also includes a horizontal leg 123, which connects the tops of vertical legs 122A and 122B. The thickness of the spring wire used to form yoke 95 and rod 96 is slightly less than the vertical separation between the proximal surfaces of the actuating buttons of switches 39 and 41.

STEM 97 AND BUSHING 98—FIG. 7A

Stem 97 is a plastic cylinder of outer diameter larger than that of rod 96. Stem 97 includes a vertical hole 124 in its top surface, coaxial with the centerline of stem 97, and of inner diameter equal to the outer diameter of rod 96. The depth of vertical hole 124 is approximately equal to one-third the height of stem 97. Stem 97 also includes a horizontal hole 125, which passes diametrically through stem 97 at a vertical position lower than the bottom of vertical hole 124. The diameter of horizontal hole 125 will be discussed subsequently.

Bushing 98 is a nylon bushing having the shape of a cylinder with a larger-diameter donut-like structure at each end. Bushing 98 is pierced with a vertical hole along its centerline, said hole having a diameter slightly larger than that of rod 96. The length of the tube-like portion of bushing 98, between the inner surfaces of the donut-like structures, is approximately equal to the thickness of the metal used to form bracket 80.

ATTACHMENTS BETWEEN ROD 96, STEM 97, AND BUSHING 98—FIGS. 7A AND 7B

FIG. 7A shows rod 96, stem 97, and bushing 98 unattached, while FIG. 7B shows these items attached together, with bushing 98 secured in slot 83 of bracket 80. The attachments between yoke 95, rod 96, stem 97, and bushing 98 are made by first inserting rod 96 through bushing 98, and then into vertical hole 124 in the top of stem 97. Rod 96 is secured in stem 97 with an adhesive, such as an epoxy or cyanoacrylate glue. Then the center, cylindrical, portion of bushing 98 is inserted in slot 83 of bracket 80, and secured with an adhesive, such as an epoxy or cyanoacrylate glue.

ARRANGEMENT OF ACTUATING BODY 94 RELATIVE TO SWITCHES 38 TO 41—FIG. 7B

FIG. 7B shows yoke 95, rod 96, and stem 97 attached as previously described to form actuating body 94, and shows the placement of actuating body 94 in relation to bushing 98, switches 38 to 41, circuit board 92, and bracket 80. In this position, vertical leg 122A of yoke 95 is in contact with the actuating button of switch 38, vertical leg 122B is in contact with the actuating button of switch 40, and horizontal leg 123 is in contact with the actuating button of switch 41. Thus, it can be seen that rotation of stem 97 in a clockwise direction (looking upward toward the bottom of stem 97) will depress the actuating button of switch 40, counterclockwise rotation of stem 97 will depress the actuating button of switch 38, upward movement of stem 97 will depress the actuating button of switch 39, and downward movement of stem 97 will depress the actuating button of switch 41.

RETAINING SLEEVE 126 AND METAL CLIP 127—FIGS. 7C TO 7E

As shown in FIGS. 7C to 7E, a retaining sleeve 126 and metal clip 127 enable control wand 19 of a standard venetian blind to be removably attached to stem 97, in the same manner that retaining sleeve 22 and metal clip 21 enable the attachment of control wand 19 to tilt-adjustment shaft 18 of a standard Venetian blind (as previously shown in FIGS. 1B to 1D).

As best seen in FIG. 7C, clip 127 has an approximately ninety-degree bend at its upper end, and a hook-like bend at its lower end. Sleeve 126, of resilient material such as vinyl or plastic, has an inside diameter slightly larger than the outside diameter of stem 97, so that sleeve 126 has a loose fit on stem 97 and can be moved along 97 by hand. As shown in FIG. 7D, attachment of wand 19 to stem 97 begins with insertion of the upper end of clip 127 into hole 125. Then, the ring-like structure at the top of wand 19 is passed over the terminus of the hook-like bend of clip 127, so that wand 19 is suspended from clip 127. Finally, as shown in FIG. 7E, sleeve 126 is pushed down over hole 125, securing clip 127 to stem 97. Thereafter, vertical axial displacements, as well as axial rotations, of wand 19 are coupled to stem 97.

The required dimensions of the hook-like bend at the lower end of clip 127 will depend on the dimensions of the ring-like structure at the top of wand 19. In general, the diameter of the hook-like bend of clip 127 must be slightly larger than the diameter of the ring-like structure of wand 19. The gap in the hook-like bend of clip 127 must be slightly larger than the greater of the section width or section height of the ring-like structure of wand 19. Since there is considerable variation in the design of control wand 19 among extant venetian blinds, no single design of clip 127 will be compatible with all extant designs of wand 19. However, since clip 127 represents a relatively low cost, it will be practical to provide two or more versions of clip 127 to accommodate a wider range of configurations of wand 19. It is expected that two versions, one small and one large, of clip 127 will be sufficient for this purpose. In the preferred embodiment, the small version of clip 127 has a hook-like bend with diameter of 6 millimeters and gap of 3 millimeters, while the large version of clip 127 has a hook-like bend with diameter of 10 millimeters and gap of 5 millimeters.

ACTUATING FORCE REQUIREMENTS FOR SWITCHES 38 TO 41—FIGS. 7B AND 7E

From FIGS. 7B and 7E, it is evident that switches 38 to 41 can be actuated by rotation or vertical axial movements of control wand 19. It is also evident that the actuating button of switch 41 bears the combined weight of actuating body 94 and control wand 19. Therefore, the force required to actuate switch 41 must be greater than the combined weight of actuating body 94 and control wand 19; otherwise, switch 41 will be continuously actuated after attachment of wand 19. For most extant venetian blinds, the weight of wand 19 is less than 75 grams, while actuating body 94 will typically have a weight of less than 10 grams. Therefore, switch 41 must have an actuating force of not less than approximately 100 grams. In the preferred embodiment, each of switches 38 to 41 has an actuating force of 160 grams. Ideally, each of switches 38 to 41 should also provide tactile feedback via snap-action response. These requirements are readily met with commercially available switches.

ONE-PIECE, MOLDED VARIANT OF ACTUATING BODY 94—FIG. 7F

Many other configurations and constructions of actuating body 94 are possible. FIG. 7F shows one such alternative construction, in which actuating body 94 is of one-piece, molded plastic construction. If molding equipment is available, this alternative construction may be preferable to the spring-wire approach described previously.

ALTERNATIVE CONFIGURATION OF SWITCHES 38 TO 41—FIGS. 7A, 7B, AND 7G TO 7I

Many other embodiments and configurations of switches 38 to 41 are possible. In the preferred embodiment previously shown in FIGS. 7A and 7B, switches 39 and 41 are of the right-angle-mounted type, in which the displacement of the actuating button is parallel to the surface of circuit board 92. This type of switch is not currently available in a surface-mount package; through-hole mounting must be used. In the event that surface-mounting is desired, the alternative configuration shown in FIGS. 7G to 7I may be used.

The configuration shown in FIGS. 7G to 7I is similar to that shown previously in FIGS. 7A to 7B, except that in FIGS. 7G to 7I, switches 39 and 41 are of the standard-mount type, like switches 38 and 40. Also, the alternative configuration shown in FIGS. 7G to 7I includes a metal strip 128 and an alternative construction of actuating body 94. Metal strip 128 is of spring metal bent into an M-shaped configuration, with a hole at the center of the M-shape. Actuating body 94 is of substantially the same shape as that previously shown, but is of molded plastic in one-piece construction. As shown in FIG. 7H, metal strip 128 is attached to circuit board 92 via a rivet of conventional design, so that one terminus of the M-shape of metal strip 128 is in contact with the actuating button of switch 39, and the other terminus of the M-shape is in contact with the actuating button of switch 41. Then, as shown in FIG. 7I, actuating body is located so that vertical leg 122A is in contact with the actuating button of switch 38, vertical leg 122B is in contact with the actuating button of switch 40, and horizontal leg 123 is between the two V-shaped portions of the M-shape of metal strip 128. Thus, it can be seen that upward movement of actuating body 94 causes the upper terminus of the M-shape of metal strip 128 to depress the button of switch 39, while downward movement causes the lower terminus of the M-shape to depress the button of switch 41.

ADDITIONAL ALTERNATIVE EMBODIMENTS

NON-CONTACT SWITCHING MECHANISMS—FIG. 7B

As previously shown in FIG. 7B, the combination of actuating body 94 and switches 38 to 41 is responsive to both vertical (axial) and rotary (twisting) displacements of stem 97. In the embodiments shown, actuation of switches 38 to 41 occurs via physical contact between yoke 95 and the actuating buttons of switches 38 to 41. However, as will be evident to practitioners in the art, many non-contact switching arrangements are also possible to achieve the same object. For example, switches 38 to 41 could be Hall-effect magnetic sensors, while yoke 95 could be replaced with at least one suitably-configured magnet. Alternatively, switches 38 to 41 could be photoelectric sensors, with yoke 95 replaced by an optical shutter. However, without some increase in complexity, neither of these non-contact alternatives is capable of providing tactile feedback to the user, which would be a significant disadvantage in many applications. Moreover, each of these non-contact approaches is likely to be more expensive than the preferred embodiment.

FORCE-SENSITIVE SWITCHING MECHANISMS—FIG. 7B

Practitioners in the art will also recognize that—while the embodiment shown in FIG. 7B requires a finite, readily perceptible displacement of stem 97 to actuate switches 38 to 41—many alternative switching arrangements are possible which do not require a perceptible displacement, but are instead are primarily sensitive to applied force. For example, switches 38 and 40 could be replaced with a piezoelectric load cell, and switches 39 and 41 replaced by a second load cell, with yoke 95 physically attached to each load cell; then, the bipolar electric potential in each load cell induced by axial forces or rotary torques on stem 97 could be sensed by appropriate electronic circuits connected to each load cell. This approach has the potential for simplifying the mechanical arrangement shown in FIG. 7B (for example, bushing 98 would not be required, and the overall number of parts could be reduced substantially), at some expense in electrical complexity. However, such a force-sensitive arrangement would provide essentially no tactile feedback to the user, which would be a significant disadvantage in many applications.

VARIATION IN NUMBER OF ELECTRICAL SIGNALS—FIG. 7B

The preferred embodiment shown in FIG. 7B provides four electrical signals, corresponding to the outputs of switches 38 to 41, in response to vertical and rotary movements of stem 97. As will be subsequently described, these four signals enable complete control of all key functions of system 30. Of course, if used with a simpler system (in which fewer signals are required), up to three of switches 38 to 41 could be deleted. For example, switches 39 and 41 could be deleted if only two signals are required; the embodiment would then be responsive to only rotary movements of stem 97. As another example, switches 38, 39, and 40 could be eliminated, leaving switch 41; the embodiment would then provide only one signal, responsive to only downward movement of stem 97 (such a configuration would be functionally identical to the switch shown by Webb). Such deletion of switches would only slightly reduce the overall cost of system 30, at the expense of a severe reduction in the degree of control provided by the switch assembly. As will be evident after consideration of the operation of the subject invention, the four switches of the preferred embodiment enables complete, convenient control of an automatic window covering, at relatively low cost.

SENSITIVITY TO OTHER MOVEMENTS OF STEM 97—FIG. 7B

While the embodiment of FIG. 7B is responsive to axial and rotary movements of stem 97, arrangements are possible which are responsive to other types of movement of stem 97. For example, an arrangement sensitive to horizontal movements of the lower end of stem 97 is possible; such an arrangement would be similar to that of the joystick-type controllers used in certain video and computer games. However, such an arrangement would provide no significant cost benefit over the preferred embodiment, and could be more difficult to use.

It is also possible to combine the approach shown in FIG. 7B with the approaches taken in conventional joystick-type controllers to provide up to eight output signals (instead of the four provided by the preferred embodiment). However, this would significantly increase the mechanical complexity and cost of the switching assembly (and hence, the complexity and cost of system 30). Moreover, as will be subsequently described, four signals are sufficient for operation of system 30, and a greater number of signals could be confusing to many users.

USE OF SPECIALLY-CONFIGURED WAND 19—FIGS. 7C TO 7E

Although the preferred embodiment of the switching assembly shown in FIGS. 7C to 7E is intended for use with control wands of conventional venetian blinds, it is also possible—and will be advantageous in some applications—to include or supply a specially-configured control wand with stem 97. This would be advantageous, for example, when the switch assembly is used to control a motorized window covering (such as a pleated shade) which does not normally include a control wand. The inclusion of such a specially-configured control wand will only result in a slight increase in cost, since the wand is a simple plastic structure.

ALTERNATIVE COUPLING APPROACHES—FIGS. 7C TO 7E

It will be recognized that, although the coupling approach between wand 19 and stem 97 of the preferred embodiment comprises sleeve 126 and clip 127, any other coupling method which transfers rotary and axial movements of wand 19 to stem 97 could be used. However, the selected method should ideally tolerate lateral movement of the lower part of wand 19, since otherwise the mechanism will be subject to damage due to the long lever arm formed by wand 19. Also, if these elements are to be used in a retrofit application with control wand 19 of conventional venetian blinds, then the coupling approach should be compatible a wide range of designs of extant control wands. The method shown in FIGS. 7C to 7E is the lowest-cost method which satisfies these constraints. However, this latter constraint is not applicable to systems in which a specially-configured control wand 19 is included or supplied with stem 97. In such a system, a flexible coupling or a U-joint could be used, for example, instead of the preferred method shown.

Support Member 99 and PV Source 31

As previously shown (e.g., in FIG. 2A), system 30 includes PV source 31, and electrical aspects of PV source 31 have been previously described. Also, as previously stated, source 31—as well as certain other electronic components of system 30—are attached to member 99. Member 99 and salient physical aspects of source 31 are now be described in detail.

REQUIRED LOCATION AND ORIENTATION OF SOURCE 31 AND PHOTOSENSOR 36—FIGS. 2A AND 2B

As previously shown in FIG. 2A, the purpose of PV source 31 is to convert incident solar radiation into electrical power to operate system 30. Therefore, PV source 31 should be oriented to maximize the solar irradiance incident on its active surface. As previously shown in FIG. 2B, the purpose of photoresistor 46 is to sense the level of external ambient illumination in order to detect the presence of dawn and dusk. Therefore, photoresistor 46 should be oriented to maximize the solar illumination, and minimize the illumination due to artificial interior lighting, incident on its active surface. Therefore, in most embodiments of system 30, PV source 31 and photoresistor 46 will be located between the host blind and the window glass, with their active surfaces generally facing the window glass, while the balance of system 30 will be located primarily on the opposite (indoor) side of the host venetian blind.

In conventional solar-powered window coverings, such as the Solartronics SD-1000 motorized pleated shade, the typical approach is to orient a separate, flat, rectangular PV source so that its active surface is parallel to—and against—the window glass, and to secure it in this position by a bracket screwed to the window frame. A cable then connects the PV source with the convention the system, often located within the headrail. This conventional practice suffers from two disadvantages: first, the need to mount the separate PV source, and attach the associated cable, increases the difficulty of the installation and the cost of the system. Second, the active surface of the PV source is constrained to be substantially parallel to the surface of the glass, which is typically vertical. However, as is well-known in the art, the optimum orientation for PV sources is typically not vertical, but is rather inclined from the vertical by an amount approximately equal to the prevailing latitude. In some latitudes, a vertical orientation of the PV source can reduce the daily energy output by a substantial amount. Therefore, if a vertically-oriented PV source is used, the source size must be increased to reflect the reduced collection efficiency. This increases the cost and the overall size of the source.

GENERAL ARRANGEMENT OF PREFERRED EMBODIMENT—FIG. 8A

However, a completely different approach is used in the subject invention. FIG. 8A shows a basic embodiment of this approach, in which support member 99, indirectly attached to headrail 16, provides physical support for PV source 31 and photoresistor 46, as well as for the electrical connections between these elements and the balance of system 30. Support member 99 is a long, thin, tongue-shaped member of width no greater than that of bracket 80. In the preferred embodiment, member 99 is a resilient, flexible member capable of being bent or folded, with no more than light hand pressure, along a plurality of axes or fold lines parallel to its width, as shown in FIG. 8A. For these types of bend, member 99 must be capable of a minimum bend radius of no greater than approximately 0.25 cm without permanent deformation. However, as will be subsequently described, a non-resilient variant is possible, in which the aforementioned bends remain after removal of the bending pressure. Another possible variant is a rigid member, formed in a pre-determined shape at the time of manufacture.

A significant portion of the weight of support member 99 and the elements mounted thereon is borne by headrail 16, via bracket 80 and circuit board 92 (not shown). The distal end of support member 99 is attached to circuit board 92; circuit board 92, in turn, is attached to bracket 80 in a conventional manner, while the attachment between bracket 80 and headrail 16 is as has been previously described. Details of the attachment between member 99 and board 92 will be given subsequently. A suction cup 130, of conventional design, is demountably attached near the lower end of support member 99 by conventional means (which will be described subsequently in more detail). A plurality of electrical conductors 129 are supported by member 99. Conductors 129 electrically connect circuit board 92 (not shown) to PV source 31 and photoresistor 46.

In the preferred embodiment, member 99, conductors 129, PV source 31, and photoresistor 46 are coated with a transparent, protective film (not shown). This film can be either laminated to, or sprayed on, the surface of member 99 in a conventional manner. Such films are also used in commercially available flexible PV sources.

PREFERRED CONSTRUCTION OF MEMBER 99 AND SOURCE 31—FIG. 8A

Member 99 must be as thin as possible; in particular, it must be substantially thinner than the material used for bracket 80. However, member 99 must have adequate tensile strength to support its own weight, as well as that of PV source 31 and photoresistor 46. These structural requirements can be met by a wide variety of materials, including metal, vinyl, mylar, TEFZEL, or Kapton. In general, however, the optimum material for member 99 will depend on the selected embodiment of conductors 129 and PV source 31. In the preferred embodiment, PV source 31 is formed by direct deposition of photovoltaic material, such as amorphous or polycrystalline silicon, directly on the surface of member 99, to form a flexible PV source. Several established processes are capable of producing such flexible PV sources, and such sources are commercially available. Similarly, conductors 129 consist of conductive traces on the surface of member 99, which can be formed conventionally via either an additive or subtractive process. In the preferred embodiment, member 99 is of Kapton, which can withstand the relatively high temperatures and harsh materials associated with the processes used to form PV source 31 and conductors 129. This material also provides good resistance to high temperatures encountered during soldering operations.

PREFERRED EMBODIMENT OF PHOTORESISTOR 46—FIGS. 2C AND 8A

In the embodiment shown in FIG. 8A, photoresistor 46 is a conventional surface-mount device which is attached to conductors 129 by conventional means, such as by soldering, conductive adhesives, or ultrasonic welding. Also, as previously stated, photoresistor 46 will not be required in all applications; for example, the ambient light level could be sensed by PV source 31 (as previously shown in FIG. 2C), eliminating the need for photoresistor 46.

SUCTION CUP 130—FIGS. 5C AND 8A

Suction cup 130 is of rubber or other conventional material. Suction cup 130 should be demountable from member 99, and the attachment between suction cup 130 and member 99 should be such that it does not substantially increase the thickness of member 99 when suction cup 130 is not attached. In addition, the attachment should be capable of withstanding temperature and humidity extremes consistent with a window location. In the preferred embodiment, suction cup 130 is secured to member 99 via a self-adhesive material affixed to the back of suction cup 130. This approach is inexpensive, but provides an attachment which may weaken over repeated mountings and demountings. This is not a significant disadvantage, since only a few mountings and demountings of suction cup 130 will typically occur over the lifetime of system 30.

If a greater frequency of mountings and demountings is expected, suction cup 130 can be attached to member 99 using the same conventional approach previously shown in FIG. 5C to attach rubber rivet 87A to bracket 80, with a hole in member 99 engaging a groove in the base of suction cup 130.

USE WITH CONVENTIONAL VENETIAN BLINDS—FIGS. 8B AND 8C

The use of member 99, PV source 31, and suction cup 130 with conventional venetian blinds is shown in FIGS. 8B and 8C. FIG. 8B shows these elements in conjunction with a small venetian blind 24 installed in an "outside mount" configuration, in which headrail 16 is mounted above head jamb 27. Also, head jamb 27 is relatively narrow, so that louvers 17 are relatively close to glazing 26. However, FIG. 8C shows a large venetian blind 25 installed in an "inside mount" configuration, in which headrail 16 is mounted below head jamb 27; also, head jamb 27 is relatively wide, so that louvers 17 are relatively far from glazing 26. A small portion of bracket 80 is also visible in both figures.

In both cases, member 99 supports PV source 31 and locates it between the planes formed by louvers 17 and glazing 26, with the upper end of member 99 indirectly supported by the top edges of headrail 16, and the lower end of member 99 demountably attached to glazing 26 by suction cup 130. It is also evident that the active surface of PV source 31 is inclined from vertical in an upward direction; this degree of inclination is greater in FIG. 8C than in FIG. 8B due to the increased distance between headrail 16 and glazing 12 shown in FIG. 8C. This inclination in an upward direction significantly improves the solar collection efficiency of PV source 31. The flexibility inherent in member 99 allows PV source to assume the maximum possible degree of upward inclination, given the available space between louvers 17 and glazing 26.

It is evident that member 99 is capable of maintaining PV source 31 in this position when used with small venetian blinds (as shown in FIG. 8B) or large venetian blinds (as shown in FIG. 8C), for outside mounting of the headrail (as shown in FIG. 8B) or inside mounting (as shown in FIG. 8C), and for a relatively small separation between louvers 17 and glazing 26 (as shown in FIG. 8B) or a relatively large separation (as shown in FIG. 8C). Thus, member 99 can accommodate a wide range in the sizes of headrail 16, in the mounting arrangements of the host blind, and in the dimensions of the window frame. Also, it can be seen that, since member 99 and PV source 31 are integrated into a single physical assembly, no separate cables or connectors are required. Also, the limited thickness of member 99, the ability of member 99 to be bent with a relatively small bend radius, and the demountable attachment of suction cup 130 allow member 99 to pass between headrail 16 and head jamb 27, so that member 99 and PV source 31 can be installed in the aforementioned configuration without need to remove headrail 16.

USE WITH OTHER WINDOW COVERINGS—FIGS. 8B AND 8C

Although FIGS. 8B and 8C show the use of member 99, PV source 31, and suction cup 130 with conventional venetian blinds, it is evident that these elements may be advantageously used in the exactly same manner with any window covering which has a shading material suspended from a headrail (such as, for example, a pleated shade).

REQUIRED LENGTH OF MEMBER 99—FIGS. 8A AND 8B

A key factor in the design of member 99 is its length. Referring to FIG. 8B, the portion of member 99 between the top of bracket 80 and the top of source 31 must be sufficiently great to ensure that the upper edge of source 31 is positioned low enough in the host window to minimize shading from the top part of the window frame, and from the sash or surround (not shown) in which the glazing is mounted. The length required to meet this requirement is a function of five major variables:

- the depth of headrail 16,
- the height of headrail 16 with respect to head jamb 27,
- the lateral separation between headrail 16 and glazing 26,
- the height of the sash (or surround) in which the glazing is mounted, and
- the prevailing latitude.

The maximum required length of member 99 will result when headrail 16 is especially deep, headrail 16 is mounted at a considerable height above head jamb 27 (i.e., in an outside-mount configuration), head jamb 27 is relatively wide (resulting in a relatively great lateral separation between headrail 16 and glazing 26), the sash or surround above the glazing is relatively tall, and the host window is located at an equatorial latitude. On the other hand, the overall length of member 99 (including source 31) must not be so great that suction cup 130 reaches the bottom of glazing 26 for the minimum expected headrail depth, the minimum expected lateral separation between headrail 16 and glazing 26, and the minimum expected height of glazing 26, when the host blind is installed in an inside-mount configuration.

Member 99 should generally be as long as possible, consistent with the above criteria, for compatibility with the widest possible range of existing venetian blind sizes and installation configurations. In the preferred embodiment, member 99 has an overall length of 60 cm, with 50 cm between the top of bracket 80 and the upper edge of source 31. These dimensions will position the top of source 31 at least 20 cm below the bottom of headrail 16, and 10 cm below the bottom edge of head jamb 27, in approximately 90 percent of the extant venetian blind installations. This will be sufficient to hold shading of source 31 to acceptable levels for most window configurations and venetian blind installations, and for average North American latitudes.

Of course, the aforementioned dimensions are not critical; they represent a compromise arising from the constraints described above. The dimensions can be varied to suit the particulars of each embodiment and application. For example, if a particularly efficient or inexpensive embodiment of source 31 is used, then shading may not be of concern, and the length of member 99 could be reduced accordingly. As another example, if member 99 is to be used only with a particular size of headrail and only with blinds which are in an inside-mount configuration, then the length of member 99 could be reduced substantially. Even in the latter case, member 99 must still be sufficiently long to locate the top of source 31 at least 5 cm below the bottom of headrail 16, to avoid shading from even narrow widths of top jamb 27 and short heights of the sash or surround in which the glazing is mounted.

Finally, if compatibility with an even wider range of venetian blind sizes and installation configurations is desired, member 99 could be made considerably longer, and a special connector provided so that member 99 could be cut to the appropriate length for each application. This option will be subsequently described in detail.

SPECIAL CONSIDERATIONS REGARDING SUCTION CUP 130—FIG. 8A

When used with smooth surfaces such as window glazings, even small suction cups are capable of relatively strong attachments, but these attachments often weaken over time. However, in the subject invention, member 99 and suction cup 130 can be easily arranged so that most of the weight of member 99 (and all the elements attached thereto) is borne by headrail 16, improving the reliability of the attachment of suction cup 130 to glazing 26. This is accomplished by attaching suction cup 130 to glazing 26 as low as possible, causing the lower portion of member 99 to be nearly straight, with only a slight bow. In this condition, most of the weight will be borne by headrail 16; suction up 130 will only be required to bear a proportion of the weight approximately equal to the sine of the angle of inclination (with respect to the vertical) of member 99. This will generally be a very small force, and will be in a direction substantially normal to the plane of glazing 26. Under these conditions, suction cup 130 can be expected to provide a very reliable attachment to glazing 26.

ALTERNATIVE EMBODIMENTS OF MEMBER 99

NON-RESILIENT, FLEXIBLE EMBODIMENT—FIGS. 8B AND 8C

Suction cup 130 is not required if member 99 is a deformable, non-resilient member, instead of the flexible, resilient member of the preferred embodiment. In that case, member 99 could be bent into the shapes shown in FIGS. 8B and 8C at the time of installation, and these shapes would be retained indefinitely. Although this approach avoids the need for suction cup 130, it could increase the thickness of member 99.

RIGID EMBODIMENT—FIGS. 4F, 8B AND 8C

As another alternative, member 99 could be made rigid, and could be formed into a predetermined shape (such as that shown in FIG. 8B, or that shown in FIG. 8C) at the time of manufacture. Such a rigid member would also eliminate the need for a suction cup, and could be manufactured at relatively low cost. It would also be possible to form such a rigid member in one piece with bracket 80 (for example, by making member 99 an extension of the outward-facing vertical leg of the variant of bracket 80 previously shown in FIG. 4F). However, such a member would be compatible with only a specific venetian blind size and mounting arrangement. Also, installation of such a rigid member would typically require temporary removal and subsequent reinstallation of the host blind.

HINGED EMBODIMENT—FIGS. 4F, 8A, AND 8C

As a third alternative, member 99 could be substantially rigid, but with a flexible element or hinge-capable of flexing along an axis parallel to the long dimensions of headrail 16-at some point above the top of source 31. With reference to FIG. 8C, for example, member 99 could be substantially rigid with the exception of a hinge located near the upper, outboard edge of headrail 16. Such a hinge would permit the lower portion of member 99 to assume the maximum inclination permitted by the prevailing louver-to-glazing distance, thereby increasing the solar collection efficiency.

Such a hinge need not necessarily be a part of member 99, but could instead be included somewhere above member 99. If, for example, the variant of bracket 80 previously shown in FIG. 4F were used, member 99 could be attached to the outward-facing vertical leg of bracket 80 (partially visible in FIG. 4F) with such a hinge, enabling member 99 to assume a variable inclination.

However, although such a configuration would offer greater solar collection efficiency than a vertical flat-plate collector, it would be only slightly less expensive than the fully flexible, preferred embodiment of FIG. 8A, while being substantially less compatible with the broad range of possible headrail dimensions and blind mounting arrangements. Moreover, installation of such a hinged, rigid embodiment of member 99 could require temporary removal and subsequent reinstallation of the host blind. Some of these disadvantages could be partially overcome by adding additional hinges, or points of flexibility, along member 99; however, this would erode much of the cost advantage of this approach relative to the preferred embodiment of FIG. 8A.

CONSIDERATIONS IN SELECTION OF OPTIMUM EMBODIMENT

Each of the alternative embodiments of member 99 described above offers the potential for lower cost than the preferred, flexible embodiment shown in FIG. 8A. Of the alternatives shown, the rigid embodiment is potentially the least expensive, due to the elimination of suction cup 130 and possibility of forming member 99 and bracket 80 from a single piece of metal. The hinged embodiment and the non-resilient flexible embodiments have a comparable potential cost which is between that of the rigid embodiment and that of the preferred, flexible embodiment. However, the preferred, flexible embodiment shown in FIG. 8A provides the greatest number of benefits in use.

The preferred, flexible embodiment of member 99 shown in FIG. 8A provides six major benefits:

A. It eliminates the need to physically install source 31 to the window frame;

B. it locates source 31 at a substantially lower position than the bottom of the headrail, reducing the probability of shading from the top of the window frame;

C. it eliminates the need for power wiring;

D. it enables source 31 to be oriented for maximum solar collection efficiency consistent with the prevailing louver-to-glazing distance;

E. it ensures compatibility with the broad range of possible headrail dimensions and blind installation configurations; and F. it eliminates the need to remove or detach the host headrail during installation of member 99 and source 31 on the host blind.

However, not all of these benefits may be required in a particular application. In that case, one of the previously described alternative embodiments of member 99 could be used to realize a modest cost savings. All of the alternative embodiments, including the least-expensive rigid embodiment, provide benefits A, B, and C listed above. The hinged embodiment further provides benefit D. The non-resilient, flexible embodiment further provides both benefits D and E. Given these considerations, the optimum embodiment can be selected for lowest cost in a particular application.

For example, in some applications, member 99 will not be retrofitted to an existing blind, but will instead be installed on a new blind during the blind's manufacture. In that case, benefit F and part of benefit E would be irrelevant. In such an application, the rigid, hinged variant of member 99 would be most cost-effective. If, further, a relatively inexpensive or efficient embodiment of source 31 is used, then benefit D is not critical, and the rigid (non-hinged) variant of member 99 will be most cost-effective. In most applications, however, the preferred, flexible embodiment of FIG. 8A will be the best choice.

ALTERNATIVE EMBODIMENTS OF SOURCE 31

As previously shown in FIG. 8A, the preferred embodiment of PV source 31 is formed by direct deposition of photovoltaic material on member 99. This approach can be used with resilient and non-resilient flexible embodiments of member 99, as well as with rigid embodiments of member 99, and offers the potential for minimum cost and thickness of member 99; however, it requires significant manufacturing investment.

SEPARATE, FLEXIBLE PV SOURCE 31 LAMINATED TO MEMBER 99—FIG. 8A

Alternatively, PV source 31 could consist of a commercially available flexible PV source laminated to member 99. A conventional adhesive could be used for this lamination, and electrical connections between PV source 31 and member 99 could be made via solder or conductive adhesive. In such a variant, member 99 could be fabricated using the same materials and processes as those used for the thin flexible ribbon cables found in some commercial electronic products. This alternative embodiment of PV source 31 would result in a greater recurring cost (due to the labor required to attach PV source 31 to member 99), but significantly less manufacturing investment would be necessary.

SEPARATE, RIGID PV CELLS ATTACHED TO MEMBER 99—FIG. 8D

FIG. 8D shows another alternative embodiment of PV source 31 using several conventional, separate, rigid PV cells. These cells are electrically connected to conductors 129 by solder, conductive adhesive, ultrasonic welds, or other conventional attachments. They are physically secured to member 99 via the aforementioned electrical attachments; optionally, additional adhesives could also be used for a more secure physical attachment. A single, larger, rigid source could be used instead of several separate PV cells; however, the plurality of smaller cells enables member 99 to withstand a degree of bending without damage to PV source 31.

In general, the embodiment of PV source 31 shown in FIG. 8D will be less desirable than the previously described embodiments involving a flexible source 31, because it will entail substantially greater manufacturing labor and will result in a thicker, less-flexible assembly after attachment to member 99. This thickness and reduced flexibility could necessitate the removal and subsequent reinstallation of the host venetian blind in some applications. However, the advantage of the embodiment shown in FIG. 8D is that rigid PV cells are currently available in a wider range of sizes, at lower costs, and with higher efficiencies, than are flexible sources.

PLACEMENT OF SECOND IR DETECTOR 77—FIG. 8D

FIG. 8D shows second IR detector 77. Like source 31 and photoresistor 46, second IR detector 77 is oriented so that its active surface faces the host window. This enables system 30 to be controlled by infrared signals transmitted from outside the building in which system 30 is installed, without need for additional cables or physical assemblies.

ATTACHMENTS BETWEEN MEMBER 99 AND CIRCUIT BOARD 92

As previously stated, member 99 is electrically and physically attached to circuit board 92. The attachments between member 99 and circuit board 92 are now described in detail.

PREFERRED EMBODIMENT: BOARD 92 AND MEMBER 99 IN ONE PIECE—FIG. 8E

The preferred embodiment is shown in FIG. 8E. In this embodiment, circuit board 92 and member 99 are portions of the same, flat, one-piece member. The well-established commercial fabrication processes used to manufacture flexible circuits can be used to fabricate such a one-piece member. Surface-mounting is used to attach the electrical components (not shown) to circuit board 92, and all electrical elements of system 30, including the aforementioned electrical components, circuit traces (not shown), conductors 129, PV source 31, photoresistor 46, and second IR detector 77, are mounted on the same side of this flat one-piece member. A stiffening support 131, laminated to the bottom of circuit board 92, stiffens circuit board 92 so that it can properly react the actuating forces for switches 38 to 41 (not shown). This embodiment offers the potential for minimum assembly labor, but may require a more complex fabrication process than the alternatives described below.

FIXED ATTACHMENT—FIG. 8F

In the alternative embodiment shown in FIG. 8F, circuit board 92 is a separate, rigid circuit board which is electrically connected to conductors 129 of member 99 by a conventional process such as soldering, use of a conductive adhesive, or ultrasonic welding. Additional adhesive or mechanical fasteners could be used to further physically secure board 92 to member 99.

REMOVABLE ATTACHMENT—FIG. 8G

As previously discussed, it may be advantageous to have the capability to cut member 99 to the appropriate length for each installation. This is facilitated by the embodiment shown in FIG. 8G, in which member 99 is electrically and physically connected to circuit board 92 by a ribbon connector 132 of conventional design. Ribbon connector 132 includes internal contacts (not shown) to mate with conductors 129. Connector 132 also includes a clamping mechanism of conventional design (not shown) so that member 99 can be physically secured to connector 132 by squeezing the top and bottom portions of connector 132 together. Ribbon connector 132 is similar to the ribbon connectors used for the thin ribbon cables attached to the keyboards of some commercially available calculators and laptop computers. This embodiment provides two advantages over the embodiments shown in FIGS. 8E or 8F. First, it permits the upper part of member 99 to be trimmed to the proper length during installation, so that member 99 can be manufactured with a greater initial length. This will provide compatibility with a wider range of blind sizes and installation arrangements. However, this is not a major advantage, since a fixed length of member 99 will provide adequate compatibility for most applications. Second, it offers the potential to simplify installation of the subject invention on the host blind, particularly if member 99 includes some elements (such as photoresistor 46 or second IR detector 77, shown in FIG. 8D) which protrude from the surface of member 99. Referring again to FIG. 8B, such protruding elements may not be able to pass between headrail 16 and head jamb 27 of the host window, so that installation of the subject invention could require detachment and subsequent reattachment of headrail 16 to jamb 27. However, ribbon connector 132 eliminates this difficulty, since it allows member 99 to be temporarily detached from circuit board 92 so that its upper-end can pass between headrail 16 and jamb 27. The disadvantage of this embodiment is the increased cost due to the addition of ribbon connector 132. Due to its greater cost, the embodiment shown in FIG. 8G will be more advantageous than those shown in FIGS. 8E or 8F only if the aggregate thickness of member 99 and the parts mounted thereon (except demountable suction cup 130) is greater than a few millimeters at any point along the length of member 99. This would be the case, for example, if second IR detector 77 were included, as shown in FIG. 8D.

ALTERNATIVE ATTACHMENTS BETWEEN MEMBER 99 AND HEADRAIL 16

As previously described, member 99 is not directly attached to headrail 16 or bracket 80, but is indirectly supported by headrail 16 via attachment to circuit board 92 (which, in turn, is attached to bracket 80, which is, in turn, attached to headrail 16). However, it is evident that the method of attachment between member 99 and headrail 16 is incidental to the subject invention, and many other methods could be used to physically support member 99 on headrail 16. For example, member 99 could be directly attached to headrail 16 by an adhesive (as previously shown in FIGS. 6I and 6J). Alternatively, member 99 could be manufactured as part of headrail 16.

ALTERNATIVE, HIGH-EFFICIENCY, FOLDED EMBODIMENT OF SOURCE 31

REQUIRED UPWARD INCLINATION OF SOURCE 31—FIGS. 8A TO 8C

It is well-known in the art that the year-round average solar collection efficiency of a flat-plate collector (such as a photovoltaic cell) is maximized if the collector is inclined so that its photoactive surface faces upward, with the angle of inclination (with respect to the horizontal) approximately equal to the prevailing latitude. Thus, near-vertical orientations are best for extreme northern latitudes, while near-horizontal orientations are best for equatorial latitudes. As previously shown in FIGS. 8A to 8C, one advantage of the embodiment of member 99 shown therein is that it allows the active surface of PV source 31 to be inclined away from the vertical so that its active surface faces partially upward, increasing the solar collection efficiency. This is seen best in FIGS. 8B and 8C. The amount of upward inclination is determined by the distance between louvers 17 and glazing 26, as well as the free length of the bottom-most portion of member 99. If the louver-to-glazing distance is small and the free length of member 99 great, then the upward inclination of the active surface of PV source 31 may be considerably less than optimum, especially for southern latitudes.

HIGH-EFFICIENCY, FLEXIBLE, FOLDED CONFIGURATION OF SOURCE 31—FIGS. 8H AND 8I

FIGS. 8H and 8I show an alternate embodiment of PV source 31 and member 99 which considerably increases the achievable inclination angle for a given louver-to-glazing distance, independent of the free length of the bottom-most portion of member 99. Referring now to FIG. 8H, PV source 31 is formed by deposition of photovoltaic material directly on member 99 to form a one-piece flexible source (as was previously shown in FIG. 8A). However, unlike the previously shown embodiment, PV source 31 is not configured as one single contiguous photovoltaic area, but is broken up into a plurality of identical photovoltaic regions 133 on the surface of member 99. A plurality of identical reflective patches 134 are also located on the surface of member 99. Reflective patches 134 are positioned so that they alternate, in the vertical dimension, with photovoltaic regions 133. Reflective patches 134 are formed of a material that exhibits good reflectivity to solar radiation, and are applied directly to member 99 using a conventional additive chemical process. Alternatively, they can consist of separate foil or paper pieces which are attached to member 99 with an adhesive. A second suction-cup 135 is located above the top-most reflective patch 134. Second suction cup 135 is similar to suction cup 130, and is attached to member 99 in the same manner as suction cup 130. Conductors 129 (not shown), and optionally photoresistor 46 (not shown) and second IR detector 77 (not shown), are also located on member 99 as previously described.

Referring now to FIG. 8I, after photovoltaic regions 133 and reflective patches 134 are placed on member 99, a plurality of horizontal bends or folds are formed in member 99. These folds are made using a conventional process which leaves the folds more flexible than the straight (non-folded) segments of member 99. Such a process could include the cutting of grooves in the back of member 99 at the location of each fold, followed by low-temperature thermoforming, using appropriately-shaped die, to form the folds. These folds cause member 99 to assume a shape with the following characteristics. First, each photovoltaic region 133 is inclined upward from the vertical, so that its photoactive surface faces upward as well as outward. Second, the top edges of all photovoltaic regions 133 lie in the same substantially vertical plane. Third, the bottom edges of all photovoltaic regions 133, as well as the portions of member 99 to which suction cups 130 and 135 attach, lie in the same substantially vertical plane. Fourth, the proximal horizontal edges of adjacent photovoltaic regions 133 are separated by a vertical distance which is no less than approximately the height of each photovoltaic region 133.

As a result of the inclination of photovoltaic regions 133, the solar collection efficiency at moderate latitudes is greater than that of a purely-vertical source. It can also be seen that reflective patches 134 further increase the solar collection efficiency by reflecting a portion of the direct or indirect solar radiation toward the active surfaces of photovoltaic regions 133 (the use of an L-shaped reflective member for the same purpose, in conjunction with a conventional flat-plate solar panel, is shown in U.S. Pat. No. 5,040,585 to Hiraki, 1991). The increase in collection efficiency due to reflective patches 134 will be modest but cost-effective, given the very small added cost represented by reflective patches 134 (however, the inclusion of reflective patches 134 is optional and not absolutely necessary according to the subject invention). It is also evident that the vertical separation of the proximal edges of adjacent photovoltaic regions 133 will tend to prevent each photovoltaic region 133 from casting shadows on other photovoltaic regions 133.

USE OF HIGH-EFFICIENCY SOURCE 31 WITH CONVENTIONAL VENETIAN BLINDS—FIGS. 8J AND 8K

FIGS. 8J and 8K show the use of this alternative embodiment of member 99, PV source 31, and suction cups 130 and 135 with conventional venetian blinds. Both FIGS. 8J and 8K show conventional venetian blind 15 installed in an inside-mount configuration, so that headrail 16 is suspended from head jamb 27. FIG. 8J shows a relatively narrow head jamb 27, so that louvers 17 are relatively close to glazing 26, while FIG. 8K shows a relatively wide head jamb 27, so that louvers 17 are relatively far from glazing 26. A small portion of the previously described bracket 80 is also visible in both figures.

As shown in FIGS. 8J and 8K, the aforementioned flexible folds in member 99 allow it to be extended or contracted in accordion-like fashion, with a corresponding variation in angle of inclination of photovoltaic regions 133 (and also in the louver-to-glazing distance required to accommodate the folded portion of member 99). In FIG. 8J, there is relatively little space between louvers 17 and glazing 26, so member 99 is in a substantially extended position, with photovoltaic regions 133 inclined upward away from vertical to a relatively small degree. However, in FIG. 8K there is a greater distance between louvers 17 and glazing 26, so that member 99 can be placed in a substantially contracted position, so that photovoltaic regions 133 are inclined upward away from vertical to a relatively great degree. Thus, it can be seen that the folded portion of member 99 can be extended or contracted during installation, to adjust the angle of inclination of the photoactive surfaces of photovoltaic regions 133. If sufficient louver-to-glazing distance is available, this permits the angle of inclination of photovoltaic regions 133 to be optimized for the prevailing latitude. If desired, the inclination can also be optimized for the prevailing season.

Even if sufficient louver-to-glazing distance is not available to achieve the optimum inclination, the embodiment of member 99 and PV source 31 shown in FIGS. 8H to 8K will allow a greater inclination (and hence, more efficient solar collection) than the non-folded embodiment shown in FIGS. 8A to 8C. This is best seen by comparing FIG. 8C to FIG. 8K: the angle of inclination of photovoltaic regions 133 in FIG. 8K is considerably greater than that of PV source 31 in FIG. 8C, for the same distance between louvers 17 and glazing 26.

USE OF HIGH-EFFICIENCY SOURCE 31 WITH OTHER WINDOW COVERINGS

It will be evident to practitioners in the art that—although FIGS. 8J and 8K show the use of the high-efficiency embodiment of member 99, PV source 31, and suction cups 130 and 135 with conventional venetian blinds—these elements could also be advantageously used in the same manner with other types of window coverings which include a headrail, such as pleated shades.

Moreover, these elements could also be used advantageously in any application in which electric power is obtained from a window via photovoltaic power conversion, regardless of the presence or type of window covering (or presence of a headrail). For example, these elements could be used to supply power to operate an electronic security system. If no headrail is present (or if the device to be powered is located below source 31), the weight of source 31 could be borne completely by suction cups 130 and 135, member 99 could be considerably shortened, and conventional wires could be used to electrically connect source 31 with the device to be powered.

SELECTION BETWEEN HIGH-EFFICIENCY (FOLDED) AND NON-FOLDED EMBODIMENTS—FIGS. 8A TO 8K

While the flexible folded embodiment of member 99 and PV source 31 shown in FIGS. 8H to 8K offers the potential for maximum solar collection efficiency, it is more costly than the non-folded embodiment shown in FIGS. 8A to 8C. The increased solar collection efficiency may or may not justify the increased cost, depending on factors such as the specific cost (dollars per watt) of PV source 31 and the average power consumption of system 30. If PV source 31 is relatively inexpensive and the average power consumption of system 30 is relatively low, then the non-folded embodiment of FIGS. 8A to 8C will be most cost-effective. On the other hand, if PV source 31 is relatively expensive and the average power consumption of system 30 is high, then the folded embodiment of FIGS. 8H to 8K will be most cost-effective.

ALTERNATIVE, HIGH-EFFICIENCY FOLDED CONFIGURATIONS OF SOURCE 31

Flexible Configuration Using Hinges—FIG. 8I

Although the preferred embodiment of FIG. 8I provides a variable angle of inclination of each of photovoltaic regions 133 by means of flexibility in member 99, this object could also be achieved via use of hinges (such as the continuous plastic hinges used in packaging of certain consumer goods). In such an embodiment, photovoltaic regions 133 could be located on the surface of separate, rigid, photovoltaic modules, while reflective patches 133 could be located on the surface of separate, rigid, backing pieces; the modules and backing pieces could then be attached to the hinges via a conventional attachment (such as an adhesive).

Rigid Configuration Using Plastic Strip—FIGS. 8H to 8K

Since a considerable portion of the increased cost of the flexible folded embodiment of member 99 shown in FIGS. 8H to 8K (relative to the flat (non-folded) embodiment of FIG. 8A) is due to the need to keep the folds flexible, a folded embodiment of member 99 with rigid, non-flexible folds (but retaining flexibility in the portion of member 99 above the upper-most fold) may offer the best combination of cost and solar collection efficiency. Such a rigid embodiment would have the general shape shown in FIG. 8I, with the angle of inclination of photovoltaic regions 133 fixed at the time of manufacture to optimize the solar collection efficiency over the range of latitudes in which member 99 is expected to be used. The height of each photovoltaic region 133 (and hence, the number of photovoltaic regions 133, given a fixed total photoactive area) should then be selected to achieve the desired angle of inclination within the smallest expected louver-to-glazing distance. Referring to FIG. 8H, such a rigid, folded member could be achieved by any of several conventional methods, including the laminating of a plastic strip (not shown), thermoformed with the appropriate folds, to the back of member 99. Such a rigid folded embodiment would provide significantly greater solar collection efficiency (at latitudes typical of North American installations) than the flat embodiment of FIG. 8A, at relatively little increase in cost.

Rigid Configuration Using Transparent Resin—FIG. 8I

As another alternative, the desired folded configuration of source 31 could be formed by casting separate photovoltaic elements (each containing one of photovoltaic regions 133 and each positioned and oriented as previously described) in a transparent resin to form a solid, rigid photovoltaic source. U.S. Pat. No. 5,040,585 to Hiraki (1991) shows the use of such a resin in conjunction with a conventional flat-pate solar panel.

Disadvantage Of Rigid Embodiments—FIGS. 8J and 8K

Referring now to FIGS. 8J and 8K, the rigid folded embodiments of member 99 described above have one significant disadvantage not shared by the flat embodiment shown in FIG. 8A: during installation on host Venetian blind 15, the rigid folded shape of member 99 may not be capable of passing through the narrow space between headrail 16 and head jamb 27. If clearance between headrail 16 and head jamb 27 is limited, the installation of member 99 on host blind 15 could require that headrail 16 be detached from hanger 20A, pulled forward to allow the passage of the folded portion of member 99, and then reattached to hanger 20A. Alternatively, this disadvantage can be eliminated through use of the ribbon connector approach of FIG. 8G for attachment of member 99 to circuit board 92. This would enable temporary detachment of member 99 from circuit board 92, allowing the flat, upper portion of member 99 to be passed between headrail 16 and head jamb 27.

Software

In general, the software implementation for the subject venetian blind controller will be very similar to that used in various consumer electronic appliances, such as the programmable power seats and mirrors used in luxury automobiles. Details of the software will depend on the desired operating functions, as well as on details of its electrical configuration. Based on the previously described operating functions and electrical configuration, those skilled in the art will be able to develop the software in accordance with conventional practice. Therefore, only a brief description of a basic embodiment of the software is presented.

Operating Modes—FIGS. 2A and 5A

As previously shown in FIG. 2A, system 30 is essentially a microcontroller-based digital servo-positioning system which is capable of rotating the output shaft of motor 43 to arbitrary or predetermined angular positions, in response to inputs from switches 38 to 41, photosensor 36, and IR receiver 37. As shown in FIG. 5A, gearmotor 85 (which includes motor 43) and drive shaft 88 replace wand 19 as the source of torque to tilt-adjustment shaft 18 of host blind 15. Thus, system 30 is capable of digital servo control of the tilt angle of the louvers of the host blind.

The preferred embodiment of system 30 is capable of adjusting the louver tilt in three modes of operation: a Manual mode, an Automatic Mode, and a Preset mode.

In Manual mode, servo control is not used; instead, system 30 operates in open-loop fashion under the user's supervision to rotate tilt-adjustment shaft 18 to an arbitrary angular displacement. Thus, in Manual mode, the operation of system 30 is similar to that of a conventional venetian blind (except that the torque to rotate shaft 18 is provided by motor 43, and not by wand 19).

In Automatic mode, system 30 operates in closed-loop servo fashion to automatically rotate tilt-adjustment shaft 18 to a predetermined angular position. Operation of system 30 in Automatic mode can be initiated by the user (for example, by sending an appropriate IR command which is detected by IR receiver 37), or by another stimulus (such as the arrival of dawn or dusk, as detected by photosensor 36).

In contrast to Manual mode and Automatic mode, Preset mode involves no operation of Motor 43. In Preset mode, a value corresponding to the current angular position of tilt-adjustment shaft 18 is stored in one of several predetermined memory locations, or registers, within microcontroller 35. The purpose of Preset mode is to preset, or program, System 30 for subsequent Automatic mode operations. Preset mode is initiated by the user (for example, by pressing a predetermined one of switches 38 to 41 for a predetermined duration).

User-to-System Interface—FIG. 2A

Still referring to FIG. 2A, switches 38 to 41 and IR receiver 37 are the means by which the operation of system 30 is controlled by the user. However, in many applications of system 30, an IR transmitter will not be cost-effective and hence will not be included. Also, even if such a transmitter is present, it may not be close-at-hand. Therefore, system 30 includes the capability for control of all essential Manual, Automatic, and Preset mode operations via just closures of switches 38 to 41.

Together, switches 38 to 41 are capable of encoding 15 distinct codes (4 bits) of digital information. However, eleven of these codes require that more than one of switches 38 to 41 be simultaneously closed. Use of these codes is undesirable, because users will have difficulty remembering combinations which require closure of more than one, switch. However, the four codes which can be encoded via closure of just one of switches 38 to 41 are insufficient to fully control the operation of system 30. In the preferred software embodiment, the amount of information which can be encoded by closure of switch 39 or switch 41 is increased by evaluating the duration of closure, as well as the identity of the switch which is closed. Each closure of either switch 39 or switch 41 is capable of encoding three codes, depending on the duration of closure: one code corresponds to durations of closure of less than two seconds, a second code corresponds to durations of between two and eight seconds, and a third code corresponds to durations of greater than eight seconds. Thus, a closure of a single one of any of switches 38 to 41 is capable of encoding eight codes (three each for switches 39 and 41, and one each for switches 38 and 40).

IR Code Scheme—FIG. 2A

In the preferred embodiment, the software operation associated with the evaluation of user inputs is simplified by using an IR code of at least four bits, and associating each of four of these bits with closure of one of switches 38 to 41. Thus, in executing the software operations, microcontroller 35 can evaluate the output of IR receiver 37 in the same manner as closures of switches 30 to 41.

In addition to these four IR codes corresponding to closure of switches 38 to 41, other IR codes can also be defined. In the preferred embodiment of system 30, IR codes are also defined for Automatic operation of system 30 to produce an arbitrary angular displacement of tilt-adjustment shaft 18. In these codes, the desired value of angular displacement is included as part of the transmitted code; upon receipt of this code, shaft 18 is automatically rotated to the desired position, without need for supervision by the user.

Interrupt Vs Polling Architecture—FIG. 2A

Still referring to FIG. 2A, my Venetian blind controller requires that microcontroller 35 periodically measure the ambient light level via photosensor 36, and that power be periodically applied to IR receiver 37. In addition to these periodic operations, which occur at substantially regular intervals, microcontroller 35 must also detect closures of switches 38 to 41, which could occur at any time. Also, microcontroller 35 must detect the presence of valid IR codes at the output of IR receiver 37, which could occur at any time during the interval over which power is applied to IR receiver 37. These aperiodic events could be detected either by frequent polling of the outputs of switches 38 to 41 and IR receiver 37, or by means of a hardware interrupt scheme. The latter approach is used in the preferred embodiment, but those skilled in the art will recognize that the software may easily be modified to employ a polling scheme. The following discussion assumes that the outputs of switches 38 to 41 and IR receiver 37 are logically OR'ed together, with the result sensed by a hardware interrupt port (not shown) of microcontroller 35.

Overall Software Structure—FIG. 9A

FIG. 9A shows the overall structure of the software. It comprises four modules: a module MAIN 140, a module MOVE 150, a module EVAL 160, and a module MANUAL 170. Module MAIN 140 performs the periodic operations described above: it applies power to IR receiver 37 at regular intervals, it periodically measures the level of ambient illumination via photosensor 36, and it detects the presence of dawn and dusk, based on the measured illumination. Module MAIN 140 is executed repeatedly until the detection of dusk or dawn, or until an interrupt is generated by the outputs of switches 38 to 41 or IR receiver 37.

Such an interrupt causes the software operation to be transferred to module EVAL 160, which evaluates the stimulus of the interrupt to decide if the asserted function involves an automatic mode, manual mode, or preset mode operation. If a preset mode operation is requested, EVAL 160 performs the operation and returns control to MAIN 140; if an automatic mode operation, EVAL 160 transfers control to module MOVE 150; and if a manual mode operation, EVAL 160 transfers control to MANUAL 170.

Module MOVE 150 operates motor 43 under servo control to achieve a predetermined angular displacement of its output shaft, after which control is transferred back to MAIN 140. MOVE 150 can also be entered directly from MAIN 140, if the latter detects the presence of dusk or dawn.

Module MANUAL 170 operates motor 43 continuously as long as the manual mode operation is asserted, after which control is again transferred back to MAIN 140.

Memory Registers—FIG. 9B

FIG. 9B depicts a set of memory registers addressed by microcontroller 35 (not shown in FIG. 9B), which represent variables used in the preferred embodiment of the software. These need not be actual hardware registers within microcontroller 35; rather, they may be virtual registers implemented in software. Lines are drawn to show the data flow between these registers. A current position register 171 stores a value corresponding to the current angular displacement of the output shaft of motor 43. The data in current position register 171 comes from a hardware counter 172, which is clocked by sensor 44. Hardware counter 172 is capable of bi-directional (up/down) counting, with the direction of count under software control. As previously described, sensor 44 generates a logic-level pulse train with a repetition rate proportional to the speed of motor 43. The count direction of hardware counter 172 is set under software control to correspond to the direction of motor rotation. Thus, the count maintained by hardware counter 172 is proportional to the angular displacement of the motor output shaft.

A desired position register 173 is also included. As will be subsequently described, the software compares the value contained in desired position register 173 with that contained in current position register 171, to derive the motor drive commands. The value stored in desired position register 173 can come from any one of four sources: an up limit register 174, a down limit register 175, an open preset register 176, and a closed preset register 177. In addition, microcontroller 35 can load arbitrary, software-derived values into desired position register 173, as will be subsequently described. Up limit register 174 holds a value corresponding to the motor shaft angular displacement associated with the maximum upward louver tilt angle of the host venetian blind. On the other hand, down limit register 175 holds a value corresponding to the motor shaft angular displacement associated with the maximum downward louver tilt angle of the host venetian blind. Open preset register 176 and closed preset register 177 hold values corresponding to the motor shaft angular displacements associated with arbitrary, user-defined louver tilt angles. The values stored in registers 174 to 177 come from current position register 171.

As previously stated, microcontroller 35 can load an arbitrary, software-derived value into desired position register 173. Such a value could be derived, for example, from information contained in an IR code received by IR receiver 37, as well as the values stored in registers 174 and 175. For instance, if an IR code representing a desired percentage of louver tilt is received by IR receiver 37, microcontroller 35 could derive the value to be loaded into desired position register 173 by multiplying the desired percentage by the difference between the values stored in up limit register 174 and down limit register 175, and summing the product with the smaller of the values stored in registers 174 and 175.

Software Modules

Software modules 140 to 170, which compose the software for the preferred embodiment of my venetian blind controller, are now described. Although the following discussions reference drawing figures which show software flowcharts, the previously shown FIG. 2A-which shows an electrical block diagram of system 30—may also be of assistance in understanding the software operation.

MODULE MAIN 140—FIG. 9C

Figure 9C:
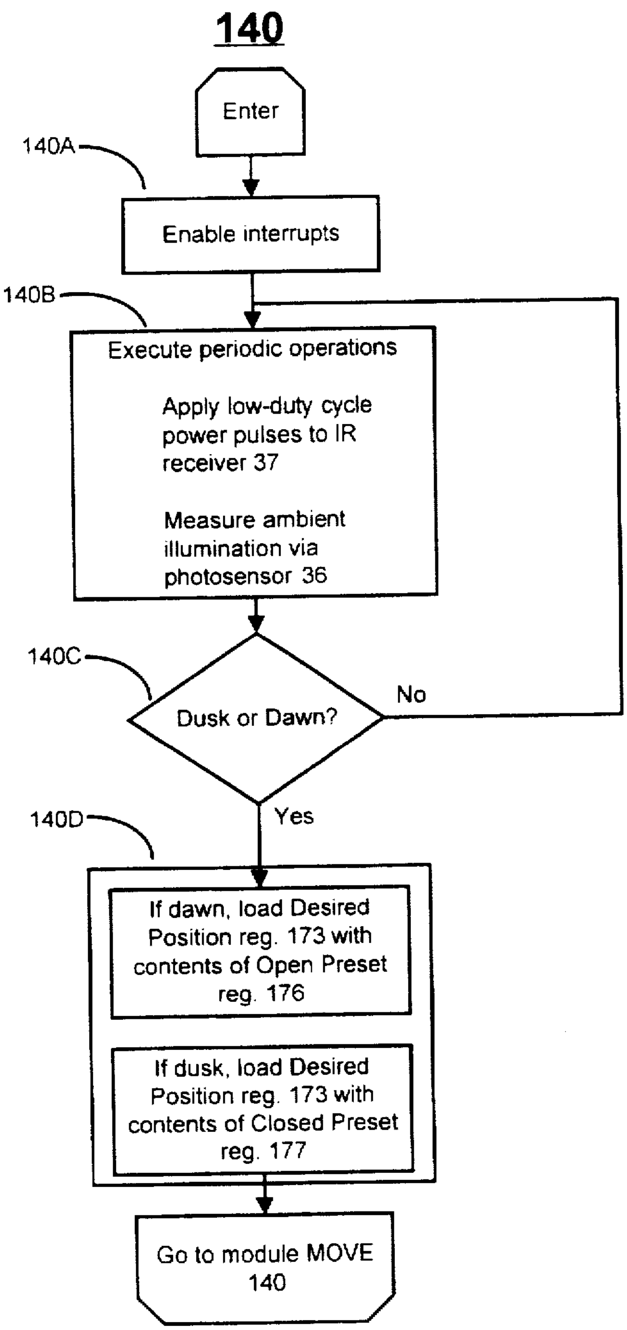

FIG. 9C shows a flowchart of module MAIN 140. As previously stated, MAIN 140 periodically applies power pulses to IR receiver 37 and measures the ambient illumination level via photosensor 36, and this sequence is repeated until an interrupt is registered or the presence of dusk or dawn is detected. As was previously shown in FIG. 9A, Main 140 is entered upon initial application of power to system 30 (via closure of switch 34), and can also be entered from any of other modules 150, 160, or 170.

In a software step 140A, Main 140 enables interrupt capability so that closure of switches 38 to 41, or a signal at the output of IR receiver 37, will interrupt the subsequent sequence of software execution (as previously stated, such interrupts will transfer operation to module EVAL 160). Then, in a software step 140B, a sequence of low-duty-cycle power pulses are applied to IR receiver 37 (as was previously shown in FIG. 2E). Following this sequence of power pulses, the level of ambient illumination is measured via photosensor 36 (as was previously shown in FIGS. 2B and 2C).

Then, in a step 140C, a decision is made regarding the presence of dusk or dawn. Many algorithms are known in the art for making such a decision. In a typical algorithm, the presence of dusk or dawn is declared when the ambient illumination level is relatively low, and the rate-of-change of the illumination level is within predetermined limits. A similar approach is used in the preferred embodiment: a moving average of several temporally-spaced illumination measurements is formed, and the change in the moving average due to the most recent measurement is compared with a predetermined threshold. If the threshold is exceeded, and if the absolute level of illumination is relatively low, then dusk or dawn is declared. If neither dusk nor dawn is present, then step 140C transfers control back to step 140B. Thus, steps 140B and 140C are repeatedly executed until dusk or dawn is detected in step 140C, or until an interrupt occurs.

In step 140B, IR receiver 37 can be continuously powered while the illumination measurement is taking place, or can be left unpowered during the illumination measurement. The former approach minimizes the average response time of system 30 to transmitted IR commands, while the latter approach minimizes average power consumption. The preferred embodiment uses the latter approach. The number of power pulses applied to IR receiver 37 in step 140B determines the average period of illumination measurements, relative to that of the power pulses. In the preferred embodiment, 255 power pulses are applied in step 140B prior to the illumination measurement; thus, as steps 140B and 140C are iteratively executed, there will be 255 power pulses for each illumination measurement. This number is non-critical, but generally should be made as large as possible while still ensuring adequate temporal sampling of the ambient illumination level (this will depend on the particular algorithm chosen for the dusk/dawn detection). It is desirable to maximize the number of IR power pulses for each illumination measurement in order to reduce the probability that IR signals will be missed while the illumination measurement is occurring (if IR receiver 37 is unpowered during the illumination measurement), or to reduce overall power consumption (if IR receiver 37 is continuously powered during the illumination measurement).

If, in step 140C, the presence of dusk or dawn is detected, a step 140D is executed. In step 140D, desired position register 173 is loaded with the contents of either open preset register 176 (if dawn is detected) or closed preset register 177 (if dusk is detected). Following step 140D, control is transferred to module MOVE 150.

MODULE EVAL 160—FIG. 9D

Figure 9D:
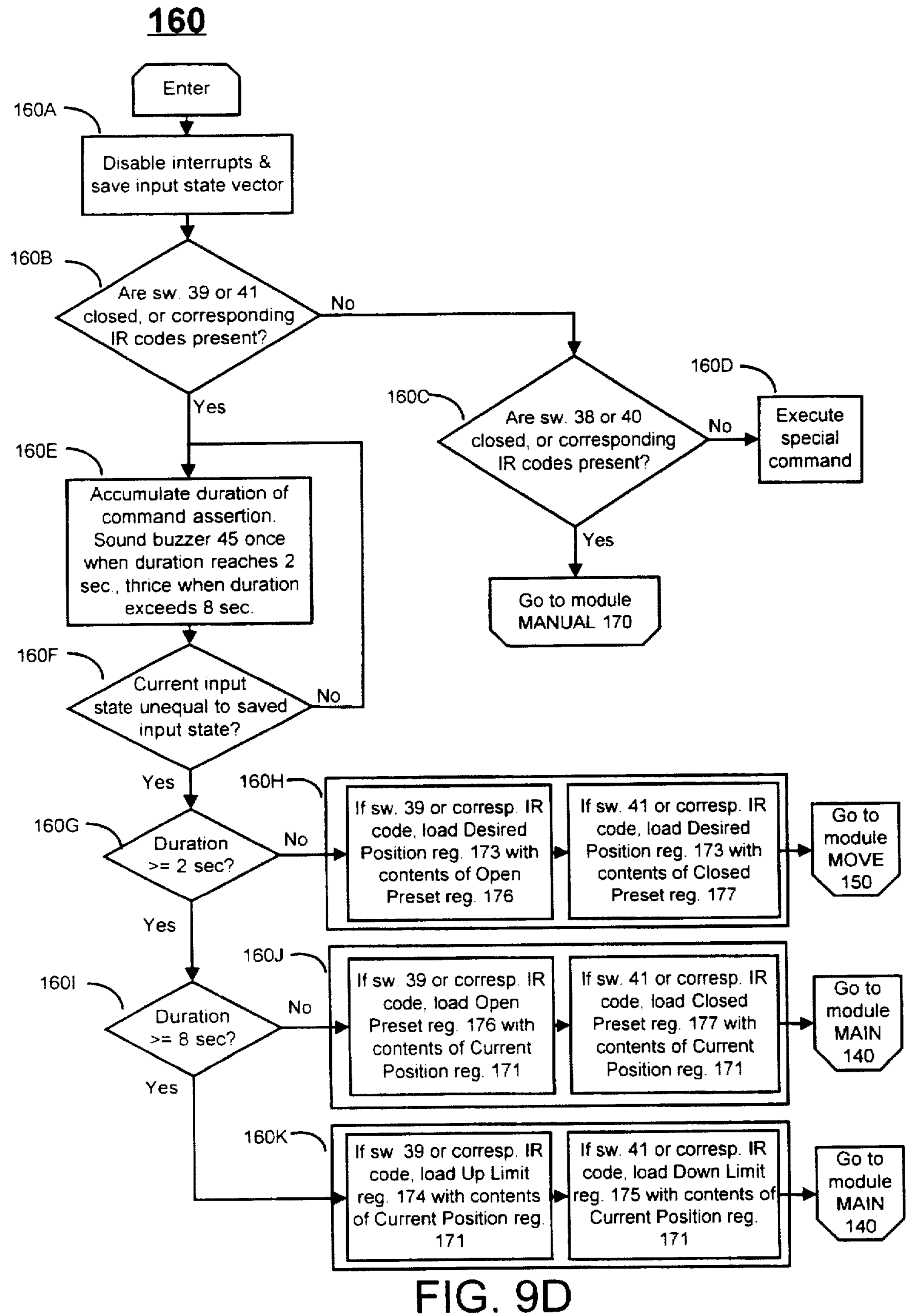

FIG. 9D shows a flowchart of module EVAL 160. The purpose of module EVAL 160 is to evaluate and process interrupts, which (as previously described) can be generated by closures of switches 38 to 41, as well as by detection of a valid IR code by IR receiver 37. As was previously shown in FIG. 9A, module EVAL 160 is entered only when such an interrupt occurs. After entry, in a software step 160A, EVAL 160 first disables interrupt capability, so that subsequent closures of switches 38 to 41, or IR codes received by IR receiver 37, do not interrupt the subsequent software flow. Then, also in step 160A, the states of switches 38 through 41 and the IR code (if present) at the output of IR receiver 37 are saved in a memory location as an initial input state vector.

Next, in a software step 160B, the initial input state vector is examined to determine if switches 39 or 41 have been closed, or if the corresponding IR codes have been received. As was previously described, such inputs indicate either an Automatic mode or Preset mode operation. If such an input has not been registered, then operation is transferred to a software step 160C, in which the initial input state vector is examined to determine if switches 38 or 40 have been closed, or if the corresponding IR codes have been received. As was previously described, such inputs indicate a Manual mode operation. If such an input has been registered, then control is transferred to module MANUAL 170. Otherwise, control is transferred to a software step 160D. The purpose of step 160D is to respond to special IR codes which do not correspond to closures of switches 38 through 41. For example, step 160D could include the software operations necessary to extract an arbitrary value of desired louver tilt from the received IR code, and transfer that value into Desired Position register 173. Step 160D could also include the software operations necessary to trap invalid codes or combinations of switch closures.

If, in step 160B, it is determined that switches 39 or 41 have been closed or that the corresponding IR codes were received, then a step 160E and a step 160F are executed. Steps 160E and 160F measure the duration of the input (that is, the duration of switch closure or IR code assertion). In step 160E, the duration of the input is accumulated: each time step 160E is executed, a predetermined value is added to a time counter. When the duration exceeds 2 seconds, buzzer 45 is sounded once; when the duration exceeds 8 seconds, buzzer 45 is sounded three times. In step 160F, the current input state is compared to the initial input state vector. If no change has occurred, step 160E is repeated, and this sequence of steps 160E and 160F continues until a change in the input state is detected in step 160F. When such a change is detected, control is transferred to a step 160G.

Step 160G compares the total input duration (as measured in steps 160E and 160F) to a threshold value of 2 seconds. A duration of less than 2 seconds indicates an Automatic mode operation; if this is the case, control is transferred to a step 160H. Step 160H transfers the contents of either Open Preset register 176 or Closed Preset register 177 (depending on which switch was closed or which IR code was received) to Desired Position register 173. If switch 39 was closed (or the corresponding IR code received), the contents of Open Preset register 176 is transferred; if switch 41 was closed (or the corresponding IR code received), the contents of Closed Preset register 177 is transferred. Thereafter, control is transferred to module MOVE 150.

If, however, the input duration was measured to be equal to or greater than 2 seconds, then step 160G transfers control to a step 160I. An input duration equal to or greater than 2 seconds indicates a Preset mode operation; the purpose of step 160I is to determine which type of Preset operation is being requested. Step 160I compares the total input duration (as measured in steps 160E and 160F) to a threshold value of 8 seconds. A duration of less than 8 seconds indicates that either Open Preset register 176 or Closed Preset register 177 are to be preset with the current louver tilt value. If this is the case, control is transferred to a step 160J. Step 160J transfers the contents of Current Position register 171 to Open Preset register 176 if switch 39 was closed (or the corresponding IR code was received), or to Closed Preset register 177 if switch 41 was closed (or the corresponding IR code was received). Thereafter, control is transferred back to module MAIN 140.

However, if the input duration was measured to be equal to or greater than 8 seconds, then step 160I transfers control to a step 160K. An input duration equal to or greater than 8 seconds indicates that either Up Limit register 174 or Down Limit register 175 are to be preset with the current louver tilt value. Step 160K transfers the contents of Current Position register 171 to Open Preset register 176 if switch 39 was closed (or the corresponding IR code was received), or to Closed Preset register 177 if switch 41 was closed (or the corresponding IR code was received). Thereafter, control is transferred back to module MAIN 140.

MODULE MOVE 150—FIG. 9E

Figure 9E:
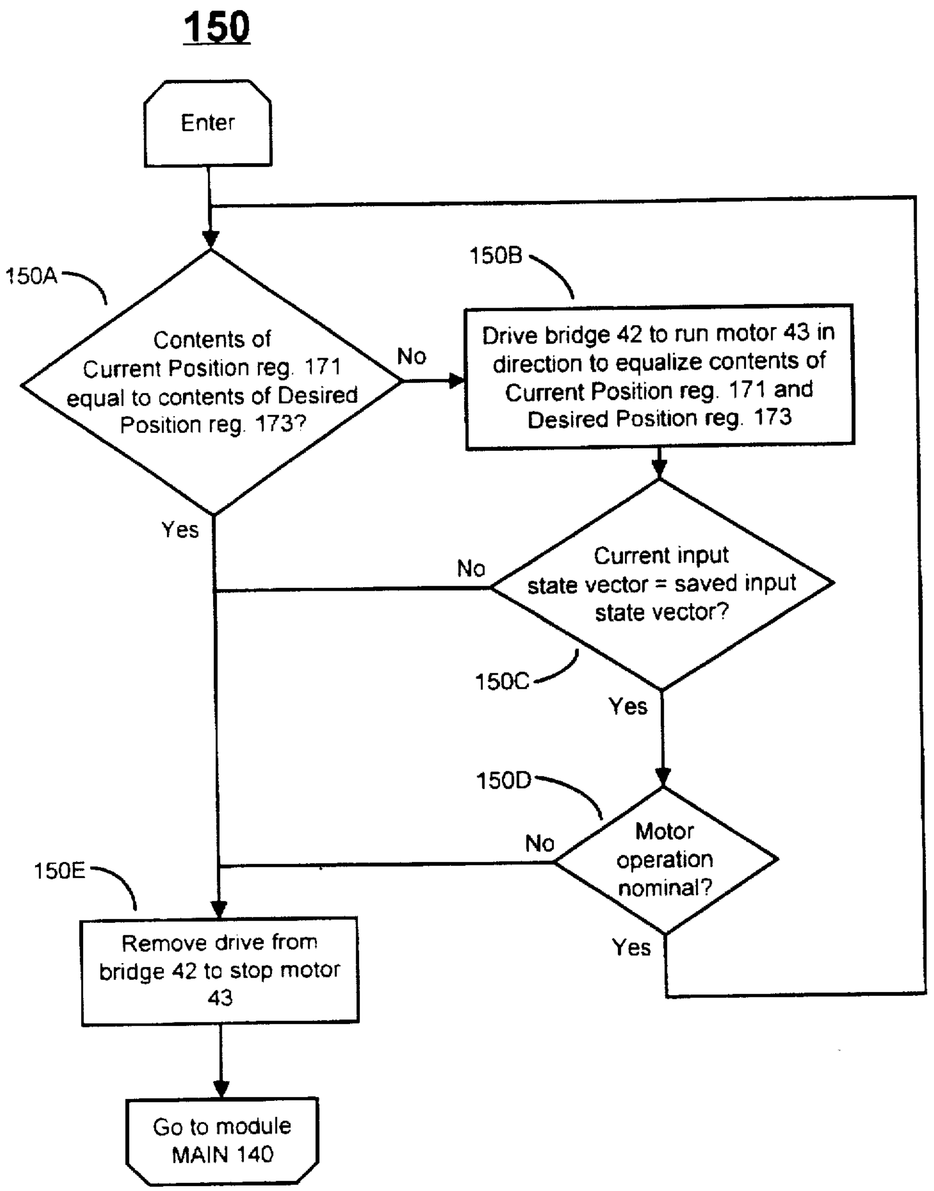

FIG. 9E shows a software flowchart of module MOVE 150. The purpose of MOVE 150 is to operate motor 43 in the appropriate direction until the value in Current Position register 171 is equal to that stored in Desired Position register 173. As was previously shown in FIG. 9A, MOVE 150 can be entered from MAIN 140 (if dusk or dawn is detected), or from EVAL 160 (if an Automatic mode operation is asserted).

After entry into MOVE 150, a software step 150A is executed. Step 150A compares the contents of Current Position register 171 and Desired Position register 173. If unequal (indicating that motor operation is required), a step 150B is executed. Step 150B finds the sign of the difference between the contents of Current Position register 171 and Desired Position register 173, and, based on the sign of the difference, applies signals to bridge 42 to operate motor 43 in the direction which will reduce the absolute value of the difference. Thereafter, a step 150C is executed. Step 150C compares the current input state vector (that is, the states of switches 38 to 41 and the IR code, if any, at the output of IR receiver 37) with the initial input state vector. If these two vectors are equal (indicating that no inputs have been registered since entry to MOVE 150), then a software step 150D is executed, which determines whether or not motor 43 is stalled or being subjected to an unusually heavy load (e.g., as would occur if louvers 17, not shown, are obstructed by a foreign object). Many techniques are known in the art for making such a determination. A typical strategy for detecting anomalous motor operation is to simply measure the motor speed and compare it with a predetermined threshold; if the speed drops below the threshold, the motor is assumed to be stalled or under excessive load. Another, more sophisticated strategy is to compare the motor deceleration to a predetermined threshold; if the deceleration exceeds the threshold, the motor is assumed to be stalled or under excessive load. Either technique can be used in step 150D. The motor speed can be determined by calculating the period of the pulses at the output of sensor 44 (not shown), while the motor deceleration can be determined by measuring the rate of change of this pulse period. If the motor speed is nominal, then step 150D transfers operation back to step 150A, and the contents of Current Position register 171 is again compared with that of Desired Position register 173. If unequal, the sequence of step 150B, 150C, and 150D is repeated again. However, if the contents of register 171 and 173 are equal, then step 150A causes a step 150E to be executed, in which drive signals are removed from bridge 42, causing motor 43 to stop. Thereafter, operation is transferred to module MAIN 140. Step 150E can also be executed from either step 150C (if a change is detected in the input state vector) or step 150D (if anomalous motor operation is detected). Step 150C serves as a safety feature to enable quick manual override (by closing any one of switches 38 to 41 or by transmitting any valid IR code) of Automatic mode operations, while step 150D provides a further safety measure (and helps to conserve power and prevent overheating of motor 43) in the event that a foreign object impedes the motor operation.

MODULE MANUAL 170—FIG. 9F

Figure 9F:
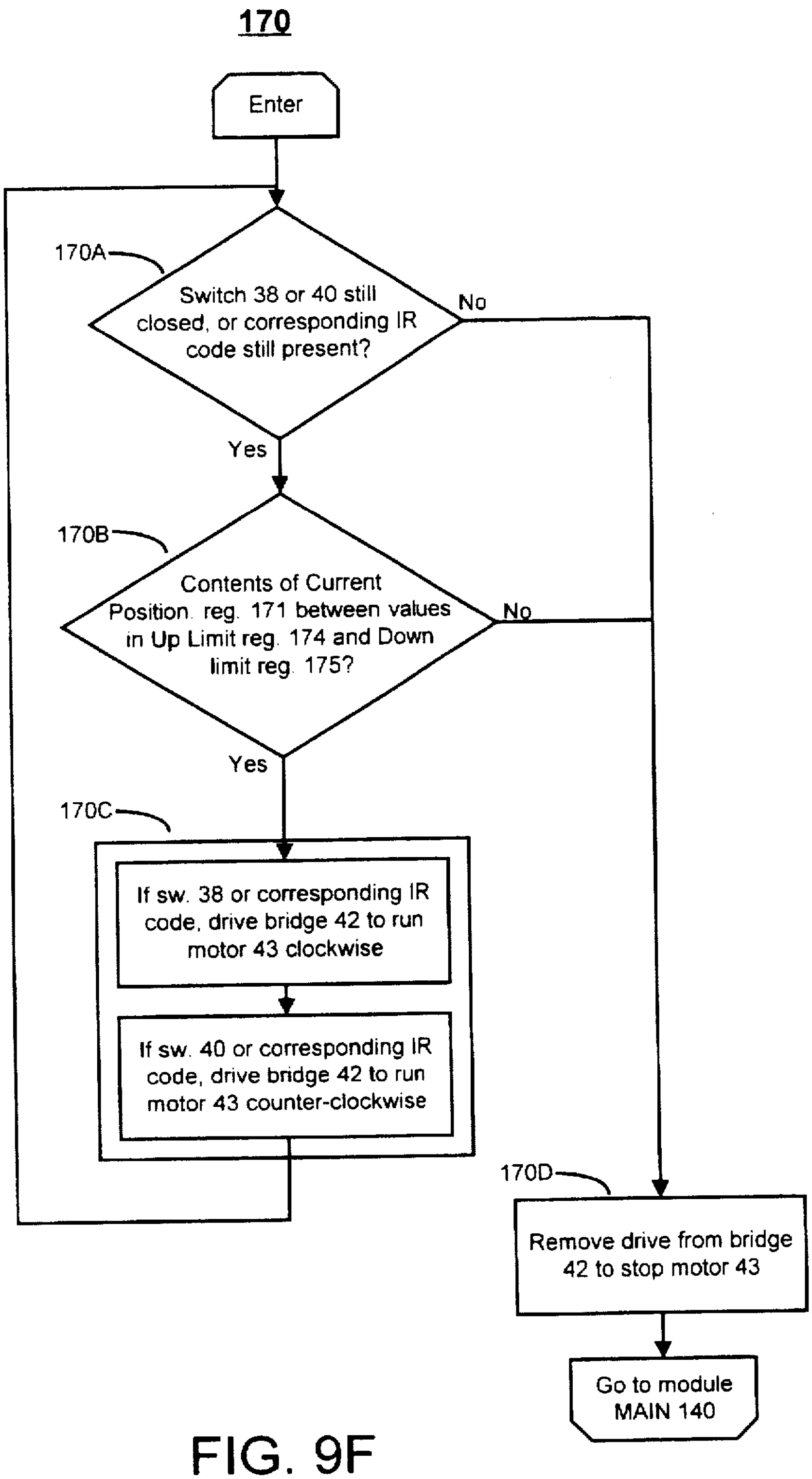

FIG. 9F shows a flowchart of module MANUAL 170. The purpose of MANUAL 170 is to operate motor 43 in response to closures of either switch 38 or switch 40 (or receipt of the corresponding IR codes by IR receiver 37). As shown in FIG. 9A, MANUAL 170 can be called only from module EVAL 160.

Upon entry to MANUAL 170, a step 170A is executed, in which the current input state vector is examined to determine if either of switches 30 and 40 is still closed, or a corresponding IR code still present at the output of IR receiver 37. If so, then a step 170B is executed, in which the contents of Current Position register 171 is compared to that of Up Limit register 174 and Down Limit register 175. If the contents of Current Position register 171 is between the values stored in registers 174 and 175, then a step 170C is executed. Step 170C applies drive signals to bridge 42 to operate motor 43. If switch 38 is closed or the corresponding IR code present, then motor 43 is operated in the clockwise direction; if switch 40 is closed or the corresponding IR code present, then motor 43 is operated in the counter-clockwise direction. Thereafter, step 170A is repeated.

If, in step 170A, it is determined that neither switch 38 nor switch 40 is closed, and that neither of the corresponding IR codes is present, then control is transferred to a step 170D, in which drive signals are removed from bridge 42 to stop motor 43. Control is then transferred to module MAIN 140.

Step 170D can also be entered from step 170B, if the latter determines that the value stored in Current Position register 171 is no longer between the values stored in Up Limit register 174 and Down Limit register 175.

OPERATION OF PREFERRED EMBODIMENT

Physical Installation of System 30

The physical installation of system 30 on a host venetian blind is now described.

General Arrangement After Installation—FIGS. 10A and 10B

FIG. 10A shows system 30 mounted on standard venetian blind 15; cover 100 is shown removed to expose certain key features. It can be seen that system 30 is attached to headrail 16 of host blind 15 via bracket 80. Bracket 80 is supported by the front wall of headrail 16, and is secured to headrail 16 by thumbscrew 84. Gearmotor 85 replaces wand 19 as the source of torque to rotate tilt-adjustment shaft 18 (not shown) via drive shaft 88, while wand 19 serves, in effect, as an extension of stem 97, allowing both twisting and axial (up or down) movements at the bottom end of wand 19 to be transmitted to stem 97. Member 99 passes over the top of headrail 16, and then behind headrail 16 and louvers 17.

FIG. 10B shows system 30 mounted on standard venetian blind 15, which is itself mounted in a window frame which includes glazing 26, head jamb 27, and side jamb 28. Portions of glazing 26, head jamb 27, and side jamb 28 are shown cut-away so that the positioning of member 99 is more clearly evident. Also, louvers 17 are shown drawn-up toward headrail 16. It can be seen that system 30 straddles headrail 16, with the bulk of member 99 on the glazing-side of headrail 16, and the balance of system 30 on the other side of headrail 16. The lower end of member 99 is in close proximity to glazing 26, allowing suction cup 130 (not shown) to secure the lower end of member 99 to glazing 26. It is also evident that louvers 17 can be drawn up to headrail 16 without interference from system 30.

Installation Sequence—FIGS. 10A and 10B

The following nine-step sequence is required to mount system 30 on host blind 30 as shown in FIGS. 10A and 10B. First, referring to FIG. 10B, cover 100 is removed from system 30 and louvers 17 are drawn up toward headrail 16. Second, suction cup 130 (not shown) is removed from member 99. Third, referring to FIGS. 1A to 1D, wand 19 is then removed from tilt-adjustment shaft 18 of host blind 15. Fourth, referring again to FIG. 10B, the free end of member 99 is passed between the top of headrail 16 and the bottom of head jamb 27, and then pulled down behind louvers 17. Fifth, referring to FIG. 4C, the lip 103 of bracket 80 is then positioned over the top edge of front wall 16A of headrail 16, so that tilt-adjustment shaft 18 is substantially centered in cut-out 82, and secured by tightening thumbscrew 84. Sixth, as shown in FIGS. 5E and 5F, coupling tube 91 is pulled upward to fit over tilt-adjustment shaft 18, and secured with clip 110. Seventh, as shown in FIG. 8C, suction cup 130 is attached to member 99, and pressure is applied to secure it to glazing 26. Eighth, as shown in FIGS. 7C to 7E, wand 19 is attached to stem 97. Ninth, referring again to FIG. 10A, cover 100 is attached to bracket 80.

From the foregoing discussion, it is evident that the operations required to install system 30 are relatively simple and can be completed in short order. In particular, there is no need to dismount the host venetian blind or to modify it in any way, and no tools are necessary.

Use of System 30

As previously described, System 30 provides motorized adjustment of the louver tilt of the host blind. In Manual mode operation, system 30 adjusts the louver tilt, under supervision of the user, to an arbitrary angle. In Automatic mode operation, system 30 automatically adjusts the louver tilt to a predetermined angle. In Preset mode operation, the current louver position is stored in one of registers 174 to 177, to prepare system 30 for subsequent Automatic mode operations.

Manual Mode Operation via Wand 19—FIG. 10A

Manual mode operation can be initiated by twisting wand 19. Twisting wand 19 counter-clockwise, closing switch 38, causes motor 43 to operate to tilt the room-facing edges of louvers 17 upward. On the other hand, twisting wand 19 clockwise, closing switch 40, causes motor 43 to operate to tilt the room facing edges downward. Operation of motor 43 ceases when pressure on wand 19 is released. Thus, via manual mode operation, the user can adjust the tilt of louvers 17 to any desired position by twisting, and holding, wand 19 until the desired angle is reached.

Automatic Mode Operation via Wand 19—FIG. 10A

Automatic mode operation can be initiated by a quick movement of wand 19 upward or downward—so that switch 39 or 41 is briefly closed and then opened-with a duration of closure of less than two seconds. Tapping wand 19 upward causes louvers 17 to be automatically tilted to the value stored in Open Preset register 176 (previously shown in FIG. 9B), while tugging wand 19 downward causes louvers 17 to be automatically tilted to the value stored in Closed Preset register 177 (previously shown in FIG. 9B). In either case, motor 43 begins to operate as soon as wand 19 is released, and continues to operate until the desired louver tilt is reached.

Preset Mode Operation via Wand 19—FIG. 10A

Preset mode operation can also be initiated by upward or downward movement of wand 19. However, to initiate preset mode operation, wand 19 must be held in the upward or downward position—closing switch 39 or 41—for more than two seconds. Holding wand 19 upward or downward for between two and eight seconds causes Open Preset register 176 or Closed Preset register 177, respectively, to be loaded with the contents of Current Position register 171 (registers 171, 176, and 177 were previously shown in FIG. 9B). This type of preset operation is used to preset, or program, system 30 with the predetermined louver tilt angles for the aforementioned automatic mode operations.

However, holding wand 19 in the upward or downward position for more than eight seconds causes Up Limit register 174 or Down Limit register 175, respectively, to be loaded with the contents of Current Position register 171 (registers 171, 174, and 175 were previously shown in FIG. 9B). This type of preset mode operation is used to program system 30 with the maximum louver tilt angle limits of host blind 15. This type of preset mode operation will typically be performed only once, immediately after physical installation of system 30 on host blind 15.

In order to provide feedback to the user in Preset mode operations, buzzer 45 (previously shown in FIG. 2A) emits an acoustic signal when the duration of closure of switch 39 or switch 41 reaches certain values. When the duration of closure of either switch 39 or 41 reaches 2 seconds, buzzer 45 emits a single, short beep. When the duration of closure of either switch 39 or 41 reaches 8 seconds, buzzer 45 emits a series of three short beeps.

Operation via IR Codes—FIG. 10A

Each of the aforementioned operations can also be initiated via IR codes detected by IR detector 51. For example, Manual mode operation to tilt louvers 17 upward could be initiated by repetitively transmitting an IR code corresponding to closure of switch 38. Similarly, Preset mode operation to preset Closed Preset register 177 could be initiated by repetitively transmitting an IR code corresponding to closure of switch 41, with the total duration of transmission greater than 2 seconds but less than 8 seconds.

Automatic Mode Operation Initiated by Photosensor 36—FIG. 10A

Automatic operation of system 30 can also be initiated by photosensor 36 (previously shown in FIG. 2A). As previously described, photosensor 36 is used to detect the presence of dawn and dusk. In the preferred embodiment of system 30, the presence of dawn, as sensed by photosensor 36, is interpreted in the same manner as momentary closure of switch 39. Thus, when dawn is sensed, Automatic operation of system 30 is initiated to adjust the louver tilt to the value stored in Open Preset register 176. Similarly, the presence of dusk is interpreted in the same manner as momentary closure of switch 41. Thus, when dusk is sensed, Automatic operation of system 30 is initiated to adjust the louver tilt to the value stored in Closed Preset register 177. Using Preset mode, therefore, system 30 can be made to thereafter automatically tilt louvers 17 to arbitrary, predetermined angles at dawn and at dusk.

In a, typical application in a residential building, Open Preset register 176 might be preset with a value corresponding to an approximately horizontal tilt of louvers 17, while Closed Preset register 177 might be preset with a value corresponding to a nearly vertical tilt of louvers 17. This would be accomplished by twisting wand 19 (initiating Manual mode operation) until louvers 17 reach the desired horizontal tilt, and then pushing wand 19 upward and holding it in this position for at least two (but not more than eight) seconds, presetting Open Preset register 176. Then, in a similar fashion, wand 19 would be twisted again until louvers 17 reach the desired vertical position, and then pulled downward for at least two (but not more than eight) seconds, presetting Closed Preset register 177. Thereafter, each dawn, louvers 17 would be automatically moved to a near-horizontal tilt; each dusk, louvers 17 would be automatically moved to a near-vertical tilt. Such automatic operation would provide ample illumination through the window during the day, but ensure privacy at night. If it is desired to open louvers 17 at night, this could be easily accomplished by tapping wand 19 upward, engaging Automatic mode operation. Similarly, if it is desired to close lovers 17 during daylight hours, this could be accomplished by briefly tugging wand 19 downward. At any time, if fine adjustment of louvers 17 is required, it could easily be accomplished by twisting wand 19, engaging Manual operation. Each of these operations could also be performed remotely, via IR signals detected by IR detector 51.

Operation via Second Photosensor 76 and Second IR Receiver 77—FIGS. 2L, 8C, and 10A As shown in FIG. 2L, second photosensor 76 and second IR receiver 77 can also be provided to control the operation of system 30. Second photosensor 76 could be mounted facing inside, like IR detector 51 (shown in FIG. 10A), to detect the ambient illumination inside the room in which system 30 is mounted. Then system 30 could automatically adjust the louver tilt as a function of the ambient interior illumination. Many workers in the art have described how such interior-facing sensors could be advantageously used, in conjunction with motorized window coverings, to reduce lighting costs in commercial buildings.

Second IR receiver 77 could be mounted facing outside (as shown in FIG. 8C), so that system 30 could be controlled from outside as well as inside. This would allow, for example, a night watchman or security guard to operate system 30 to open louvers 17 (allowing easy inspection of the room interior), without having to actually enter the building. In a large commercial office building, second IR receiver 77 would also permit a large number of installations of system 30 to be controlled from a single high-power IR transmitter (using, for example, a semiconductor diode laser) outside the building. Such a transmitter could be mounted at the top of pole located near the front of the building, or could be hand-carried by authorized personnel. Such a transmitter could be used, for instance, to open or close all blinds at night or during the daytime, for energy-management purposes.

Use of Other Sensors—FIGS. 2L and 10A

As previously discussed, other sensors could also be connected to system 30. For example, interior-facing UV-sensitive fire sensors, smoke sensors, or temperature sensors could be connected to system 30 in the same manner as photosensors 36 and 76, and IR receivers 37 and 77, shown in FIG. 2L. System 30 could then repetitively cycle louvers 17 from the open to closed positions if fire or smoke is detected, providing an easily visible signal to fire department personnel to help identify the location of a fire within a large building.

As shown in FIG. 2L, IR transmitter 78 could also be connected to system 30. IR transmitter 78 could be used to convey information regarding the status of system 30 (such as the total accumulated run time of motor 43, or the approximate level of charge of battery 33) or the ambient environment (such as the level of external illumination or the average number of daylight hours, as sensed by photosensor 36), to an IR receiver mounted in the room. Such an IR receiver could be connected to a home-automation or building-automation system.

ALTERNATIVE EMBODIMENTS

According to my invention, bracket 80, drive shaft 88, actuating body 94, member 99, and the other aforementioned features of system 30 contribute synergistically to provide substantial benefits. However, these features need not all be present to realize significant benefits. For example, just actuating body 94 (and the other elements associated with it, such as switches 38 to 40, as previously described) can be used with prior-art self-contained motorized window coverings, eliminating the need for control wiring (thus reducing installation costs by a significant margin).

In addition, as subsequently described, other useful embodiments are possible according to my invention.

Controller for Motorized Headrails—FIG. 11A

As an example of a useful alternative embodiment, FIG. 11A shows a controller 178, according to my invention, which is used with a commercially available motorized venetian blind (such as the Solartronics MB-1000). In both structure and operation, controller 178 is identical to the previously described system 30, except that controller 178 requires no motor 43; instead, it provides drive current (via a pair of wires 179) to a motor (not shown) located within the host blind. Accordingly, controller 178 does not require drive shaft 88. Bracket 80 is also considerably simplified (cut-out 82 is not required, and the overall size of bracket 80 can be reduced substantially), but other aspects of bracket 80 are as previously described for system 30. Bracket 80 and thumbscrew 84 enable controller 178 to be easily and quickly attached to the headrail (not shown) of the host blind. Actuating body 94 enables controller 178 to be operated by wand 19 (not shown), eliminating the need for control wires. As in the previously described system 30, member 99 optimally positions PV source 31 (not shown) to receive solar illumination, eliminating the need for power wiring (except wires 179, which connect to the motor located within the host blind). As a result, controller 178 can considerably simplify the installation process for prior-art motorized venetian blinds, and can significantly improve the utility of these blinds by providing the capability for automatic and remote operation.

Retrofittable, Automatic Control System for Pleated Shades—FIGS. 11B and 11C As another example of a useful alternative embodiment, FIG. 11B shows a retrofittable, automatic, pleated-shade controller 180 according to my invention, installed on a pleated shade 181 of conventional design. Pleated shade 181 includes headrail 16, a shading material 182, and a lift cord 183. In pleated shade 181, shading material 182 can be lifted up toward headrail 16, exposing the host window (not shown), by pulling lift cord 183. A cord lock (not shown) within headrail 16 holds lift cord 183 (and hence shading material 182) in this position. Shading material 182 can be lowered away from headrail 16 by releasing the cord lock and allowing lift cord 183 to be retracted into headrail 16. The cord lock is typically released by briefly pulling lift cord 183 at an angle, so that the lower end of lift cord 183 is closer to the distal end of headrail 16.

The electrical and physical structure of controller 180 is similar to the previously described system 30, except that controller 180 includes a drive spool 184 (instead of drive-shaft 88) which has an axis of rotation perpendicular to the major surface of bracket 80. Drive spool 184 is driven by a gearmotor 185 of conventional design. Gearmotor 185 includes an electric motor (not shown).

FIG. 11C shows drive spool 184 in more detail. Drive spool 184 is of plastic, and comprises a short spool tube 186 with flanges at either end. Drive spool 184 has a cord slot 187 which runs along the surface of tube 186 (parallel to the tube axis) and radially along one of the end flanges. Thus, the general shape of drive spool 184 is similar to that of the spools used in fishing reels. Controller 180 also includes a cover 188, of plastic, which comprises a cover tube 189 attached to a disc, the disc having a slightly larger diameter than cover tube 189. The dimensions of tube 189 are such that it can be inserted, with firm hand pressure, into spool tube 186. Lift cord 183 of pleated shade 181 (not shown in FIG. 11C) includes a handle 190. The inner diameter of spool tube 186 is larger than the longest dimension of handle 190, so that handle 190 can fit inside tube 186. In the preferred embodiment, spool tube 186 has an inner diameter of 4 cm. The width of cord slot 187 is considerably greater than the thickness of lift cord 183, so that lift cord 183 can easily pass through cord slot 187. In the preferred embodiment, cord slot 187 has a width of 0.25 cm. Thus, it can be seen that handle 190 can be placed inside spool tube 186, with lift cord 183 passing through cord slot 187, and that cover 188 can then be press-fit on drive spool 184, securing handle 190 within drive spool 184. With handle 190 so secured, rotation of drive spool 184 will cause cord 183 to be wound or unwound along the outer diameter of spool tube 186.

Referring again to FIG. 11B, gearmotor 185 provides an output torque of between 1 and 5 newton-meters, with an output speed of between 10 and 60 RPM. The preferred embodiment of gearmotor 185 includes a worm-gear drive to rotate drive spool 184. The worm-gear drive provides three advantages. First, it enables the axis of the armature of the electric motor (not shown) of gearmotor 185 to be oriented parallel to the plane of bracket 80, while still keeping the axis of rotation of drive spool 184 perpendicular to the major surface of bracket 80. This minimizes the overall size of controller 180. Second, the worm-gear drive allows a relatively high gear reduction ratio to be obtained with relatively few mechanical parts, thus minimizing the cost of controller 80. Third, due to the inherent nature of the worm drive, drive spool 184 is effectively locked in place when drive current is removed from electric motor of gearmotor 185; thus, even with heavy tension in lift cord 183, drive spool 184 will not turn unless power is applied to gearmotor 185. This preferred worm-drive configuration of gearmotor 185 is very similar to that of the gearmotors used in the power window assemblies of some automobiles, except that the required output torque of gearmotor 185 is much less than that typically required in automotive applications.

As shown in FIG. 11B, controller 180 is attached to headrail 16; this attachment (via bracket 80 and thumbscrew 84) is made in the same manner as previously described in connection with venetian blinds. The lateral placement of controller 180 along headrail 16 is such that the angle between lift cord 183 and the long dimension of headrail 16 is sufficiently acute to disengage the cord lock (not shown) of headrail 16. Thus, operation of gearmotor 185 causes lift cord 183 to be wound on, or unwound from, drive spool 184 (with winding or unwinding dependent on the direction of motor rotation), causing shading material 182 to be raised or lowered.

The operation of controller 180 is similar to that of the previously described system 30 (with the distinction that controller 180 raises and lowers shading material 182, while system 30 adjusts the louver tilt of the host venetian blind). Software operation is also similar, with the same distinction.

It is evident, therefore, that controller 180 can be easily retrofitted to conventional pleated shade 181, to provide automatic and remote operation of pleated shade 181 without need for power or control wires.

CONCLUSIONS, RAMIFICATIONS, AND SCOPE

It will be evident from the foregoing description that system 30 replaces wand 19 as the source of torque to rotate tilt-adjustment shaft 18 of host blind 15, enabling motorized control of the louver tilt of blind 15. It is clear that bracket 80 enables my controller to be used with blinds or pleated shades which have a wide range of headrail dimensions, and that drive shaft 88 enables my controller to be used with blinds which have a wide range of lengths and orientations of tilt-adjustment shaft 18. It is also evident that wand 19 can be used to conveniently operate actuating body 94 (even when blind 15 is mounted beyond arm's reach), providing a means of fully controlling all the functions of my venetian blind controller without need for external switches and wires. It is also evident that member 99 provides physical support for (and electrical connections to) PV source 31, and enables PV source 31 to be located and oriented in the host window frame to efficiently receive solar illumination (regardless of the mounting arrangement of blind 15), without need for power wires. It is also clear that, since my controller is mounted external to the headrail of the host blind or pleated shade, no expensive miniaturized components are required. This characteristic, together with its relatively simple electrical and mechanical configuration, enables my controller to be manufactured at relatively low cost.

It is evident that the features of my venetian blind controller described herein act synergistically, as well as independently, to enable my venetian blind controller to be easily and quickly retrofitted to a wide range of existing blind designs and mounting arrangements, without need for tools, removal or modification of the host blind, or installation of power or control wires.

As a result of these characteristics, the overall cost of my venetian blind controller (including costs of installation) is substantially less than that of prior-art systems which provide motorized or automatic operation of venetian blinds. While prior-art systems are practical only for luxury applications (due to high cost and elaborate installation requirements), my controller can be used in a broad range of new, utilitarian applications, due to its low cost and ease of installation. For example, government studies have shown that automatic operation of venetian blinds can save a considerable fraction of the energy used in heating and cooling of commercial office buildings. It is also well-known that, when used in conjunction with variable-intensity illumination systems, automatic operation of venetian blinds can also save a considerable fraction of the lighting costs in commercial office buildings. However, prior-art systems were impractical for these purposes, due to excessively lengthy payback periods arising from their high overall costs. However, my venetian blind controller can save enough energy to pay for itself in a little as one year of operation. Such a payback period is significantly shorter than that of many other, widely-used, energy-savings devices.

Due to its relatively low cost, my controller can bring the benefits of automatic operation of venetian blinds to physically-challenged individuals who cannot afford the prior-art systems. The low cost of my controller will also make it practical for use in a hospital setting, enabling the patient to adjust the room blinds from the hospital bed.

In addition, the low cost of my controller makes automatic venetian blind operation affordable, for the first time, by the average homeowner. My controller will be especially appealing to homeowners who have a large number of blinds (so that manual operation is relatively time-consuming), or blinds which are mounted in a difficult-to-reach location. My controller can also provide a security benefit, by helping to create a lived-in look (via automatic dusk/dawn operation) in an unoccupied home. The prior-art systems are significantly less practical for this purpose, due to high cost.

It is also evident that the salient features of my venetian blind controller may be advantageously used in other useful embodiments, including controllers for extant motorized blinds and conventional pleated shades. Those skilled in the art will recognize that the construction and function of the elements composing the preferred and alternative embodiments described herein may be modified, eliminated, or augmented to realize many other useful embodiments, without departing from the scope and spirit of the invention as recited in the appended claims.

I claim:

1. A system for motorized operation of a venetian blind, said venetian blind having a headrail and a tilt-adjustment shaft, said headrail having a front wall, said tilt-adjustment shaft protruding from said headrail, said system including:

a) an electromechanical rotary actuator, said actuator having an output member;

b) coupling means for coupling said output member of said actuator to said tilt-adjustment shaft whereby rotation of said output member causes said tilt-adjustment shaft to rotate, said coupling means including an extensible coupling and a flexible coupling, said extensible coupling located between said output member and said tilt-adjustment shaft, said flexible coupling located between said extensible coupling and said tilt-adjustment shaft; and c) attaching means for externally attaching said actuator to said headrail, said attaching means including a flexible mount for said actuator, whereby the orientation of said actuator is variable, over a predetermined angular range, about a horizontal axis parallel to said front wall of said headrail.

2. A system for motorized operation of a venetian blind, said venetian blind having a headrail and a tilt-adjustment shaft, said headrail having a front wall, said tilt-adjustment shaft protruding from said headrail; said system including:

a) an electromechanical rotary actuator, said actuator having an output member;

b) coupling means for coupling said output member of said actuator to said tilt-adjustment shaft so that rotation of said output member causes said tilt-adjustment shaft to rotate; and c) attaching means for externally attaching said actuator to said headrail, said attaching means including:

i) variable orienting means for varying the orientation of said actuator relative to said headrail, over a predetermined angular range, about a horizontal axis parallel to said front wall of said headrail, and ii) variable positioning means for varying the location of said actuator, relative to said headrail, within a predetermined portion of a vertical plane perpendicular to said front wall of said headrail.

3. A switching system to produce signals for control of an automatic window covering, said system for use with a control wand, said control wand having a major axis, said system including:

a) an actuating body;

b) rotary biasing means for rotatably biasing said actuating body, about an axis of rotation, to an initial angular position;

c) first switching means for producing a first switching signal in response to a clockwise rotational displacement of said actuating body, about said axis of rotation, of less than one revolution relative to said initial angular position;

d) second switching means for producing a second switching signal in response to a counterclockwise rotational displacement of said actuating body, about said axis of rotation, of less than one revolution relative to said initial angular position;

e) supporting means for physically supporting said control wand with said major axis oriented vertically;

f) coupling means for rotatably coupling said control wand to said actuating body, whereby:

i) rotations of said control wand about said major axis are coupled to said actuating body;

ii) said first switching signal is produced in response to a clockwise rotation of said control wand, about said major axis, of less than one revolution relative to an initial wand orientation; and iii) said second switching signal is produced in response to a counterclockwise rotation of said control wand, about said major axis, of less than one revolution relative to said initial wand orientation.

4. A switching system to produce signals for control of an automatic window covering, said system for use with a control wand, said control wand having a major axis, said system including:

a) an actuating body, said actuating body including a reference point, the location of said reference point fixed with respect to said actuating body;

b) first switching means for producing a first switching signal in response to rotation of said actuating body about an axis passing through said reference point;

c) second switching means for producing a second switching signal in response to linear displacement of said reference point of said actuating body;

d) supporting means for physically supporting said control wand with said major axis oriented vertically; and e) coupling means for coupling said control wand to said actuating body, whereby rotary and axial movements of said control wand are coupled to said actuating body, so that said first switching signal is produced in response to rotation of said control wand about said major axis, and said second switching signal is produced in response to vertical movement of said control wand along said major axis.

5. The system of claim 4, wherein said first switching means includes a first switch and a second switch, and said second switching means includes a third switch and a fourth switch, said first switch responsive to clockwise rotation of said control wand, said second switch responsive to counterclockwise rotation of said control wand, said third switch responsive to upward movement of said control wand, and said fourth switch responsive to downward movement of said control wand.

6. A solar-electric power supply for use with a window covering, said window covering mounted in proximity to a window, said window covering including a headrail and shading means, said headrail having a long dimension, said shading means suspended from said headrail, said power supply including:

a) an electrical storage battery;

b) a photovoltaic source;

c) a support member, said support member comprising a continuous strip of material, said strip including a bend, said bend dividing said strip into an upper portion and a lower portion, said upper portion physically coupled to said battery, said lower portion physically coupled to said photovoltaic source;

d) an electrical conductor, said conductor attached to said support member, said conductor electrically coupled to said battery and said photovoltaic source; and e) attaching means for attaching said support member to said headrail, with:

i) said upper portion of said support member passing above said headrail, ii) said bend of said support member having an axis parallel to said long dimension of said headrail, said bend located between said headrail and a first plane containing said window, iii) said lower portion of said support member extending substantially downward from said upper portion, said lower portion located between said first plane and a second plane containing said shading means, and iv) said photovoltaic source located between said first plane and said second plane.

7. The power supply of claim 6 wherein said support member includes a flexible portion, said flexible portion capable of bending about a plurality of axes which are parallel to said long dimension of said headrail.

8. The power supply of claim 7 wherein said photovoltaic source is a flexible photovoltaic source, said flexible source capable of bending about a plurality of axes which are parallel to said long dimension of said headrail.

9. A photovoltaic source for use with a window, said source including:

a) a support member, said member comprising a continuous strip of material, said member having a front side and a back side, said member including a first fold, a second fold, and a third fold; each of said folds parallel to a reference axis; said folds dividing said front side of said member into a first substantially planar region, a second substantially planar region, a third substantially planar region, and a fourth substantially planar region; said first fold forming the top of said first region and the bottom of said second region, said second fold forming the top of said second region and the bottom of said third region, and said third fold forming the top of said third region and the bottom of said fourth region; said first region having a first angle of inclination with respect to a reference plane, said second region being substantially parallel to said reference plane, and said fourth region being substantially parallel to said first region;

b) a first photoactive surface, said first photoactive surface located on said first region;

c) a second photoactive surface, said second photoactive surface located on said fourth region;

whereby, when said member is positioned so that said front side of said member faces said window, said reference axis is horizontal, and said reference plane is parallel to said window, then said first photoactive surface and said fourth photoactive surface have said first angle of inclination with respect to said window.

10. The source of claim 9 wherein said member is flexible along a first axis, a second axis, and a third axis, said first axis passing through said first fold, said second axis passing through said second fold, and said third axis passing through said third fold.

11. The source of claim 9 wherein said second region includes a reflective surface.

12. The source of claim 9 wherein said third region includes a reflective surface.

* * * * *